US009002712B2

(12) United States Patent
Alpdemir et al.

(10) Patent No.: US 9,002,712 B2
(45) Date of Patent: Apr. 7, 2015

(54) VOICE-INTERACTIVE MARKETPLACE PROVIDING PROMOTION AND PROMOTION TRACKING, LOYALTY REWARD AND REDEMPTION, AND OTHER FEATURES

(75) Inventors: Ahmet Alpdemir, San Jose, CA (US); Arthur James, San Jose, CA (US)

(73) Assignee: Dialsurf, Inc., San Jose, CA (US)

( * ) Notice: Subject to any disclaimer, the term of this patent is extended or adjusted under 35 U.S.C. 154(b) by 1551 days.

(21) Appl. No.: 11/194,752

(22) Filed: Aug. 1, 2005

(65) Prior Publication Data

US 2013/0282378 A1     Oct. 24, 2013

Related U.S. Application Data

(63) Continuation of application No. 10/346,656, filed on Jan. 17, 2003, now Pat. No. 6,934,684.

(60) Provisional application No. 60/219,079, filed on Jul. 18, 2000, provisional application No. 60/299,369, filed on Jun. 19, 2001.

(51) Int. Cl.
*G10L 15/00* (2013.01)
*G06Q 30/02* (2012.01)
(Continued)

(52) U.S. Cl.
CPC .............. *G06Q 30/02* (2013.01); *G06Q 50/12* (2013.01); *G10L 15/26* (2013.01)

(58) Field of Classification Search
USPC .............. 704/260, 275; 379/88.03; 369/25.01
See application file for complete search history.

(56) References Cited

U.S. PATENT DOCUMENTS

| 4,674,041 A | 6/1987 | Lemon et al. |
| 4,791,281 A | 12/1988 | Johnsen et al. |

(Continued)

FOREIGN PATENT DOCUMENTS

| JP | 2000-69449 A | 3/2000 |
| JP | 2002-140589 A | 5/2002 |
| KR | 2001-011742 A | 2/2001 |

OTHER PUBLICATIONS

Office Action mailed Apr. 24, 2012, in U.S. Appl. No. 10/177,796, Alpdemir et al., filed Jun. 19, 2002 (30 pages).

(Continued)

*Primary Examiner* — Daniel D Abebe
(74) *Attorney, Agent, or Firm* — Sterne, Kessler, Goldstein & Fox P.L.L.C.

(57) ABSTRACT

The invention provides a system, method, and business model for an information system and service having business self-promotion, promotion and promotion tracking, loyalty or frequent participant rewards and redemption, audio coupon, ratings, and other features. A business or organization in which consumers call into a service using ordinary telephone, PC, PDA, or other information appliance, and make requests in plain speech for information on goods and/or services, and the service provides responses to the request in plain speech in real-time. Provides operating model for a telephone-based audio-interfaced goods and services information and referral service having merchant self-promotion features, including database provider storing merchant information; an interface for inputting merchant information into the database and for retrieving and editing the information; and an interface for inputting voice commands and data and for receiving merchant information and processed information from the database in response to the input voice commands and data.

19 Claims, 28 Drawing Sheets

(51) Int. Cl.
G06Q 50/12 (2012.01)
G10L 15/26 (2006.01)

(56) References Cited

U.S. PATENT DOCUMENTS

| | | | |
|---|---|---|---|
| 4,882,675 | A | 11/1989 | Nichtberger et al. |
| 5,117,355 | A | 5/1992 | McCarthy |
| 5,185,695 | A | 2/1993 | Pruchnicki |
| 5,193,056 | A | 3/1993 | Boes |
| 5,202,826 | A | 4/1993 | McCarthy |
| 5,237,499 | A | 8/1993 | Garback |
| 5,249,044 | A | 9/1993 | Von Kohorn |
| 5,287,268 | A | 2/1994 | McCarthy |
| 5,305,195 | A | 4/1994 | Murphy |
| 5,305,197 | A | 4/1994 | Axler et al. |
| 5,353,218 | A | 10/1994 | De Lapa et al. |
| 5,380,991 | A | 1/1995 | Valencia et al. |
| RE34,915 | E | 4/1995 | Nichtberger et al. |
| 5,420,606 | A | 5/1995 | Begum et al. |
| 5,502,636 | A | 3/1996 | Clarke |
| 5,515,098 | A | 5/1996 | Carles |
| 5,557,518 | A | 9/1996 | Rosen |
| 5,583,922 | A | 12/1996 | Davis et al. |
| 5,594,789 | A | 1/1997 | Seazholtz et al. |
| 5,661,787 | A | 8/1997 | Pocock |
| 5,740,425 | A | 4/1998 | Povilus |
| 5,761,648 | A | 6/1998 | Golden et al. |
| 5,799,063 | A | 8/1998 | Krane |
| 5,853,156 | A | 12/1998 | Moore et al. |
| 5,884,262 | A * | 3/1999 | Wise et al. ............... 704/270.1 |
| 5,884,266 | A | 3/1999 | Dvorak |
| 5,903,652 | A | 5/1999 | Mital |
| 5,913,204 | A | 6/1999 | Kelly |
| 5,915,001 | A | 6/1999 | Uppaluru |
| 5,933,827 | A | 8/1999 | Cole et al. |
| 5,948,040 | A | 9/1999 | Delorme et al. |
| 5,951,390 | A | 9/1999 | Kobussen et al. |
| 5,960,409 | A | 9/1999 | Wexler |
| 5,991,739 | A | 11/1999 | Cupps et al. |
| 5,995,155 | A | 11/1999 | Schindler et al. |
| 5,995,826 | A | 11/1999 | Cox et al. |
| 6,014,427 | A | 1/2000 | Hanson et al. |
| 6,055,513 | A | 4/2000 | Katz et al. |
| 6,055,514 | A | 4/2000 | Wren |
| 6,061,660 | A | 5/2000 | Eggleston et al. |
| 6,101,483 | A | 8/2000 | Petrovich et al. |
| 6,115,737 | A | 9/2000 | Ely et al. |
| 6,134,548 | A | 10/2000 | Gottsman et al. |
| 6,263,054 | B1 | 7/2001 | Haefliger |
| 6,360,139 | B1 | 3/2002 | Jacobs |
| 6,398,651 | B1 | 6/2002 | Yamada |
| 6,400,806 | B1 | 6/2002 | Uppaluru |
| 6,446,076 | B1 | 9/2002 | Burkey et al. |
| 6,460,020 | B1 | 10/2002 | Pool et al. |
| 6,470,079 | B1 | 10/2002 | Benson |
| 6,587,547 | B1 | 7/2003 | Zimgibl et al. |
| 6,658,389 | B1 | 12/2003 | Alpdemir |
| 6,934,684 | B2 | 8/2005 | Alpdemir |
| 6,965,868 | B1 | 11/2005 | Bednarek |
| 7,010,263 | B1 | 3/2006 | Patsiokas |
| 7,219,136 | B1 * | 5/2007 | Danner et al. ............ 709/219 |
| 7,454,346 | B1 * | 11/2008 | Dodrill et al. ............ 704/260 |
| 7,516,190 | B2 * | 4/2009 | Kurganov .................. 709/217 |
| 7,822,606 | B2 * | 10/2010 | Lane et al. ................. 704/258 |
| 8,131,267 | B2 * | 3/2012 | Lichorowic et al. ...... 455/412.2 |
| 2002/0035474 | A1 | 3/2002 | Apldemir |
| 2002/0059399 | A1 | 5/2002 | Learmonth |
| 2002/0132575 | A1 | 9/2002 | Kesling et al. |
| 2003/0014754 | A1 | 1/2003 | Chang |
| 2003/0125958 | A1 | 7/2003 | Alpdemir |
| 2003/0182126 | A1 | 9/2003 | Ryoo |
| 2007/0213980 | A1 * | 9/2007 | Danner et al. ............ 704/231 |
| 2009/0286514 | A1 * | 11/2009 | Lichorowic et al. ...... 455/412.2 |

OTHER PUBLICATIONS

International Search Report directed to related International Patent Application No. PCT/US01/09705, mailed Oct. 18, 2001; 2 pages.
Corrected International Preliminary Examination Report directed to related International Patent Application No. PCT/US01/09705, dated Feb. 4, 2003; 4 pages.
Non-Final Rejection mailed Aug. 10, 2001 for U.S. Appl. No. 09/534,700, filed Mar. 24, 2000; 7 pages.
Non-Final Rejection mailed Apr. 23, 2002 for U.S. Appl. No. 09/534,700, filed Mar. 24, 2000; 7 pages.
Non-Final Rejection mailed Jan. 9, 2003 for U.S. Appl. No. 09/534,700, filed Mar. 24, 2000; 9 pages.
Notice of Allowance mailed Jun. 26, 2003 for U.S. Appl. No. 09/534,700, filed Mar. 24, 2000; 6 pages.
Non-Final Rejection mailed Mar. 1, 2004 for U.S. Appl. No. 09/818,258, filed Mar. 26, 2001; 47 pages.
Non-Final Rejection mailed Jul. 16, 2007 for U.S. Appl. No. 10/177,796, filed Jun. 19, 2002; 13 pages.
Non-Final Rejection mailed Apr. 17, 2008 for U.S. Appl. No. 10/177,796, filed Jun. 19, 2002; 19 pages.
Final Rejection mailed Apr. 14, 2010 for U.S. Appl. No. 10/177,796, filed Jun. 19, 2002; 28 pages.
Final Rejection mailed Jul. 18, 2012 for U.S. Appl. No. 10/177,796, filed Jun. 19, 2002; 29 pages.
Non-Final Rejection mailed Aug. 5, 2004 for U.S. Appl. No. 10/346,656, filed Jan. 17, 2003; 7 pages.
Notice of Allowance mailed Mar. 24, 2005 for U.S. Appl. No. 10/346,656, filed Jan. 17, 2003; 6 pages.
Dialogic—Products: Alphabetical Listing, 19 pp. (available @ http://www.dialogic.com; text down loaded Mar. 11, 2000).
Dialogic—ANTARES DSP Platform & Speech Technologies, 4 pp. (available @ http://www.dialogic.com; text downloaded Mar. 11, 2000).
Dialogic—ANTARES Platform Overview, 10 pp. (available @ http://www.dialogic.com; text downloaded Mar. 11, 2000).
Dialogic—Introduction to Speech Technologies, 25 pp. (available @ http://www.dialogic.com; text downloaded Mar. 11, 2000).
Dialogic—Cool Apps, 5 pp. (available @ http://www.dialogic.com; text downloaded Mar. 11, 2000.
Dialogic—ANTARES, 9 pp. (available @ http://www.dialogic.com; text downloaded May 11, 2000).
Dialogic—ANTARES Software Development Kit, 10 pp. (available @ http://www.dialogic.com; text downloaded Mar. 11, 2000).
Dialogic—The Business Case for Telephony-Based Automatic Speech Recognition and Text-To-Speech, 23 pp. (available @ http://www.dialogic.com; text downloaded Mar. 11, 2000).
Dialogic—Who Needs Multiple Speech Technologies? 9 pp. (available @ http://www.dialogic.com; text downloaded Mar. 11, 2000).
Dialogic—Automatic Speech Recognition, 3 pp. (available @ http://www.dialogic.com; text downloaded Mar. 11, 2000).
VoiceXML Forum,"Voice extensible markup language" 101 pp. (Version 1.00, Mar. 7, 2000).
Martin ("The 'Casual Cashmere Diaper Bag': Contraining Speech Recognition Using Examples", Proceedings of the Association of Computational Linguistics, Jul. 1997).
Gifford et al. ("CT for Travel", Communications Convergence Magazine, Apr. 2000.
Hollman ("IVR Systems Talk Back: The Speech Recognition Revolution", Call Center Magazine, Nov. 1999).
Gewitz ("Lip Service", CommWeb magazine, Jul. 5, 2001).
O'Keefe et al. ("Web-Based Customer Decision Support Systems", Communications of the ACM, Mar. 1998).
Muraskin ("Speech Rec Rising?", Communications Convergence Magazine, May 1999).
Speech Works ("Innovations: Speechsite From Speechworks" Communications Convergence Magazine, Dec. 1999).
Jainchigg ("Speechworks Host Goes Dialogic Gold", Communications Convergence Magazine, Dec. 1999).

(56) References Cited

OTHER PUBLICATIONS

EPN ("My Speech does Recognition Over IP" Communications Convergence Magazine, Oct. 1, 1999).

Apldemir, "System, Method, and Business Model for Speech-Interactive Information System Having Business Self-Promotion, Audio Coupon and Rating Features", U.S. Appl. No. 10/723,609, filed Nov. 25, 2003 (now abandoned).

Alpdemir et al., "Voice-Interactive Marketplace Providing Promotion and Promotion Tracking, Loyalty Reward and Redemption, and other Features", U.S. Appl. No. 11/892,548, filed Aug. 23, 2007 (now abandoned).

* cited by examiner

VOICE-INTERACTIVE MARKETPLACE PROVIDING PROMOTION AND PROMOTION TRACKING, LOYALTY REWARD AND REDEMPTION, AND OTHER FEATURES

RELATED APPLICATIONS

This patent application is a continuation of U.S. Non-Provisional patent application Ser. No. 10/346,656, filed Jan. 17, 2003, now U.S. Pat. No. 6,934,684 which claims the benefit of priority under 35 U.S.C. §119(e) and/or 35 U.S.C. §120 to U.S. Utility application Ser. No. 10/177,796 filed 19 Jun. 2002; U.S. Utility application Ser. No. 09/818,258 filed 26 Mar. 2001; U.S. Utility application Ser. No. 09/534,700 filed 24 Mar. 2000; U.S. Provisional Application Ser. No. 60/219,079 filed 18 Jul. 2000; and U.S. Provisional Application Ser. No. 60/299,369 filed 19 Jun. 2001; each of which applications are herewith incorporated by reference in their entirety.

FIELD OF INVENTION

This invention pertains generally to voice-recognition based or speech-recognition-based interactive electronic commerce, and more particularly to systems, methods, and methods of doing business for providing automated interactive directory assistance information from a business or organization to a consumer in need of goods and/or services. The invention pertains even more particularly to systems, methods, and methods of doing business for providing automated speech-recognition driven query and response with business or event self-promotion features relative to businesses and events over ordinary wired or wireless telephone systems, PC systems, Personal Data Assistants (PDAs), and other communication and information appliances and devices.

BACKGROUND

Locating business establishments, such as for example a restaurant satisfying the particular need of a customer, has hereto for generally required access to printed directory listings, or more recently access to the World Wide Web using a personal computer. The availability of such references is frequently quite limited at the time the consumer desires to avail themselves of particular goods or services. For example, an out-of-town visitor driving in their automobile and approaching San Francisco might decide to stop and have dinner in a fine Italian restaurant and more particularly might like to have dinner in a fine Italian restaurant located in the particular area of the city, or to partake of a particular gastronomic delicacy. That visitor would likely not have a printed directory in their automobile or mobile access to the Internet to search for a restaurant satisfying their current need. Therefore, the visitor would likely either have to stop and asked for recommendations or drive around until a restaurant satisfying their needs might be located. Perhaps tens of minutes or hours later than desired. This approach is clearly inefficient, and the visitor may not have the dining experience expected if the restaurant they happen to see while driving turns out to have poor quality food, poor service, or both.

An analogous dilemma arises for other goods and services, whether provided to the local residents or to a visitor from out of the area. Frequently information is not available to a consumer (perspective purchaser) when he or she needs such information, and with the proliferation of a fast mobile lifestyle, there exists and need to provide such consumer information with readily available information appliances, such as conventional telephones, cellular phones, or other pocket or mobile devices that can provide connectivity to a service at minimum cost.

Frequently such device will have only sparse input/output capabilities. For example, a cellular telephone will typically have only a few display lines presenting text or symbolic data to a user, but has substantial audio input and audio output capability that can be used by the consumer.

Heretofore, speech-to-text conversion has generally been limited to word processing and or computer or control applications as the has required fairly substantial processing power and memory within a computer device. For example, speech to text conversion products made by Dragon Systems (Lernout & Hauspie, Speech Products U.S.A., Inc., 52 Third Avenue, Burlington, Mass. 01803) generally require an Intel Pentium II or Pentium III microprocessor, AMD K-6 or Athlon processor, or the like running in excess of 450 MHz and 128 MB of memory. This technology is not available in conventional or mobile telephones at this time. Text-to-speech conversion has been known but has not been utilized to provide an interactive interface between consumers and consumer information from telephone systems. Such continuous speech recognition systems also usually require voice training with the ultimate user to provide satisfactory results.

Furthermore, even for systems which provided some degree of consumer information over the telephone, such systems have either not attempted to generate business revenues through their operation, or have been unsuccessful in generating significant revenue in this manner. In part the lack of revenue success has been due to a low level of business participation in such systems, the inability of a business to control or modify their message in response to short-term business needs or to sell promote their businesses, as well as the lack of a particular incentive for a consumer to par take all of the information offered by the service. In fact, there may frequently have been a cost associated access to conventional information and referral services by consumers, even if only by virtue of the directory assistance by local telephone service providers.

Some conventional systems and methods have been limited to playback of recorded audio or audio playback corresponding to the content of web pages; but such systems have not integrated Internet or web-based interactions with voice or telephone based information provision. They have also frequently provided inferior voice interfaces that have annoyed callers rather than having provided a useful information experience.

Local as well as national businesses (really any business, merchant, marketing, or other organization) and their customers have made significant sacrifices in order to find each other and conduct a transaction for goods or services. These sacrifices result at least in part from the nature of the information resources available to match businesses and their customers, primary among these information sources are the printed Yellow Pages, on-line Yellow Pages, conventional 411 directory assistance, print media coupons, and on-line coupons.

Businesses (particularly local businesses) make sacrifices when relying on printed Yellow Pages because they are expensive, difficult to sort prices and options, cannot be changed once in print, and their effectiveness cannot readily be determined without additional time consuming and expensive surveys. From customers, or potential customers, perspective sacrifices are made because they are too heavy to carry, present too many choices so that it is difficult for a customer to figure out which one to call as they usually lack the information that may effectively provide the decision criteria, the information is usually stale (12-16 months old is typical), and many customers may forget to take advantage of coupon offers even when available. Printed Yellow Pages and related types of large bulky paper directories clearly have other problems and limitations.

Even on-line or Internet Yellow Pages or directories have limitations that present sacrifices for both merchants and their potential customers. From the merchant's perspective, for example, there are many different on-line directory providers and a business must make a decision as to which one or ones to associate with, a personal computer is required to access and update such directories and may not be available when and where needed, updating may require payment to an ISP or programmer, the directory reaches only those with an Internet connection, and additional fees must normally be paid to place ad banners. From a customer's perspective, the information provided is frequently inaccurate and limited, an interne connection is required to access the information, and either a personal computer or WAP enabled device is required to access.

Local directory assistance and more recently national directory assistance through either a 411 type information service is also limited. From a local merchant's perspective, even when a potential customer receives a correct number the connection may not be made because either the customer must redial to get the number or pay an additional fee to be connected. From a customer's perspective, there is relatively easy access but at a cost of between about $0.50 and $1.00 per call. The directory, particularly when using the wireless directory assistance, is notorious for providing wrong numbers and there is no ability to get the correct number without re-dialing and paying an additional fee. Additional charges are also typically billed for requesting address information if available.

Reliance on print media coupons also entail sacrifices. For example, they are static and cannot be changed once in print. It takes a relatively long period of time between developing the coupon promotion and getting feedback as to its success or failure. Redemption dates cannot be changed, and one merchants coupons frequently get lost in the noise of other unrelated or competing coupons. Customers find it difficult to identify relevant coupons, find it a hassle and hardly worth the time or effort to cut them out or save them, and have a difficult time keeping tract of expiration dates. In some social settings, they present a questionable social image, and cannot always be carried with the person so they are not available when an occasion to use them arises.

On-line coupons are somewhat of an improvement however they still present issues. They are expensive to place at high traffic portals for local merchants, and may still be lost in the noise of other promotions. There is low traffic at coupon only sites and their reach is limited due to the need for an Internet connection. The use of coupons may also be favored by groups that may not have ready access to the Internet. Customers also find them hard to locate and a hassle to pint, copy, or cut out. Access by many groups of persons, or by persons at the time they consider making a purchase may be limited.

In addition to the limitations and sacrifices made by merchants and customers relative to establishing a contact for the provision of goods or services, there currently exist additional problems and limitations relative to wireless data communication of advertising information. For example, infrastructure and methods have not been established or are in their infancy and must be developed before true wireless advertising can become widely available and accepted. Data ready telephone handsets exist but are in the minority and typically represent higher-end and more expensive models. Mobile phones in the hands of the majority of consumers do not provide for wireless interaction with merchants or for the receipt of audio advertising, marketing, or promotional information. Nor are they typically used for voice recognition applications. Merchants have been hesitant to participate in wireless data transactions and the lack of consumer interest in marketing messages generally have contributed to lack of development and progress in this area.

Techniques for building speech recognition applications are some what in their early development stage, however, some information is provided in the reference *How to Build a Speech Recognition Application—A Style Guide for Telephony Dialogues*, by Bruce Balentine et al., ISBN 0-9671278-1-5, published in 1999 by Enterprise Integration Group, Inc., 2410 San Ramon Valley Blvd., Suite 225, San Ramone, Calif. 94583; which reference text is hereby incorporated by reference.

Therefore there remains a need for a system, method, and business operating model and method that overcome these and other limitations. More particularly, there remains a need for a method of doing business, an information, directory assistance service and referral service providing easy access by businesses and consumers, as well as providing business self promotion and consumer feedback features that encourage use, generate revenues, and provide incentives for use by both businesses and consumers. Such services should advantageously provide more information than traditional 411 type directory assistance in terms of greater amounts of information, greater accuracy and currency of information, award programs, and other features that encourage businesses to participate and consumers to call and utilize such systems.

SUMMARY

The invention provides a system, method, and business model for an information system and service having business self-promotion features, including voice coupons, discounts, sales promotions or other special deals, ratings, and different categories of sponsorship and visibility to the calling public. In one aspect, the inventive business model is directed to a business in which consumers call into a service using an ordinary telephone, PC, PDA, or other information appliance, and make requests in plain speech for information and positive referrals on goods and/or services, and the service provides responses to the request in plain speech in real-time over the same telephone, PC, PDA, or other information appliance. The business model may further include providing a facility for a business to communicate a self-promotion of the business to the requestor, as well as providing an audio promotional coupon (or other promotional item) to a requestor when the requestor completes a call to a business using the service.

In another aspect the inventive system extends these features to the Internet and inter-operates with the Internet in a web page based embodiment to provide an additional portal and greater interactive capability.

In another aspect, the invention provides an operating model for a telephone-based audio or speech recognition and text to voice interfaced goods and services information, enhanced 411 type directory assistance and referral service having merchant self-promotion features, comprising: an information database provider storing merchant information; a merchant interface for inputting merchant information into the database and for retrieving and editing the information; and a consumer interface for inputting voice commands and data and for receiving merchant information and processed information from the database in response to the input voice commands and data. The operating method may provide that the consumer interface comprises a telephone handset, and/or that the consumer also inputs non-voice commands and data from a keypad on the telephone handset. The operating model may also provide that the telephone handset comprises a mobile telephone.

In another aspect, the invention provides a system comprising: a speech-to-text conversion engine converting speech-based input commands and data received from an external device over a communication link into text-based commands and data; a data base storing a plurality of data items; a database search engine searching the database for a particular data item in response to the text-based command and data; a text-to-speech conversion engine generating a speech-based representation of the particular data item identified in the database search; and a speech server for communicating the speech-based representation of the particular data item to the external device.

In another aspect the invention provides audio coupons that operate as incentives for consumers to use the inventive system.

In still another aspect, the invention provides system and methods for submitting and retrieving ratings for goods and/or services.

In yet another aspect, the inventive system and method assists in providing directory driven wireless commerce.

In yet another aspect, the inventive system and method provide a promotion and advertising channel that has geographical and sociological reach and the speed needed in today's dynamic financial and commercial markets.

In still another aspect, the inventive system and method provide a voice-interactive dynamic market place where individuals (particularly locals) call to save and businesses (particularly local merchants) call to publish sales promotions in real-time or near real-time.

In still another aspect, the inventive system and method communicate information on an as requested basis that goes beyond the telephone number.

In yet another aspect, the inventive system and method provide instant savings with voice coupons published by local merchants.

In still another aspect, the inventive system and method provide an advertising free initial experience where voice or audio coupons are only heard attached to businesses that the caller has requested or searched for.

In even another aspect, the inventive system and method provide for hands-free navigation with voice commands on any telephone or device supporting telephony.

In yet another aspect, the invention provides a low cost 411 directory assistance with added informational features that is easy to access.

In yet another aspect, the invention provides benefits to merchants including but not limited to targeted reach, instant promotion, instant or near-term feedback, and an optional free Internet web presence.

In still another aspect, the invention provides benefits to common carriers and telephone companies who save conventional 411 costs, process higher call volumes, and attract new customers.

In yet another aspect, the invention provides a business model in which voice coupons are sold for distribution, a monthly fee is charged for subscription to the basic service, and additional charges are levied and collected for business category sponsorship.

In still another aspect, the invention provides a business model in which the providing organization partners with a print yellow page or other business directory publisher and/or with direct marketing organizations to subscribe merchants, businesses, individual professionals, or other organizations.

In a further aspect, the invention provides a business model in which the providing organization partners with a yellow page, wireless providers, telephone companies, and conventional 411 call centers to generate call traffic and thereby increase revenue.

In yet another aspect, the invention provides a business model in which conventional 411 directory assistance providers are replaced by the inventive system to save carriers 411 costs and to offer a new shared revenue channel and business model.

In another aspect, the invention provides a business model in which new customers are solicited and provided with value added services.

In still another aspect, the invention provides a business model in which direct marketers are provided with a new coupon or promotion distribution channel.

In still another aspect, the invention provides a business model in which new business is brought to direct marketing organizations through the voice channel of the inventive system.

In still another aspect, the invention provides a business model in which direct marketing organizations are provided with rapid marketing feedback for their clients and customers.

In still another aspect, the invention provides a business model in which print yellow page and print business directory publishers increase their existing revenues by increasing the yellow page or directory ad size sold by virtue of ad space required by a trademark and/or "voice coupon" icon or logo.

In still another aspect, the invention provides a business model in which print yellow page or other print directory publishers are provided with increased usage of the yellow pages or directory to show which vendors provide immediate savings.

In still another aspect, the invention provides a business model in which yellow page or other print directory publishers are provided with an enhancement in their market positioning by virtue of their providing an more complete and compelling offering.

In still another aspect, the invention provides the closest locations for a particular requested category where the location of the caller is known from a caller location input, cellular signal triangulation, GPS position determination, or other position or proximity location means.

In still another aspect, the invention provides means for a merchant to interact with the system using either voice or web interface and select templates for the type of social, economic, political, age, gender, profession, or other image the merchant wants to portray and the type of promotion message the merchant wants to publish with a small number of mouse clicks, key strokes, or voice commands and prompts.

In still another aspect, the invention provides system and method for establishing user groups ("My" . . . group) and communities based on lifestyles, usage patterns, interests and interest levels so that a registered user can subscribe to a group of multiple groups where merchant listings and other relevant information is given a priority. Such group or community may include a bicycling enthusiast who can subscribe to the bicycling group and when he calls, he says "My bike" and will then be offered services that has something to do with biking.

In still another aspect, the invention provides means for obtaining ratings, in which once a caller gets connected to the business through the talk411 service system, after a period of time measured in hours the service calls back the caller to ask for ratings or to collect feedback to improve service, where the caller has either registered to permit this inquiry or does not have caller ID blocked.

In still another aspect, the invention provides system and method for merchants to post customer testimonials so that future callers can hear these messages as a reference that may help make a choice of which merchant they want to be connected with, and optionally, as the service gets used callers can leave testimonial messages which the business can choose to post for other users access.

In still another aspect, the invention provides system and method for merchants to post key words on the voice system or internet site which can be used as a search term by the caller and that will be used as a navigation pointer to the posting merchant. In a further aspect, this key word or phrase based search may be used in connection with a new product or service (new movie, new CD, new restaurant, or any other product or service) so that the caller may speak (or otherwise input) this key word and be matched with one or more merchants offering it. In an even further aspect, priority use of such key word may be auctioned to merchants for priority playback to callers.

In still another aspect, the invention provides system and method allowing merchants to post their promotional message or company information in multiple ways including to record their own, select from a voice talent who would record the text the merchant put in the system using voice, a personal computer, or in any other way; or just type in an let a text-to-speech processor convert it.

In still another aspect, the invention provides a coupon aggregation and translation engine and service allowing aggregation of different formatted coupons from online sites and reformat such coupons to a standard Dialsurf or other format that allows them to be played over the telephone phone.

In still another aspect, the invention provides user call back to remind the user to rate a recently used local merchant service.

In still another aspect, the invention provides means for an over the telephone offer for a user to become an instant member to a community or coupon distribution list using email or other communication means once the user asks for a specific category. In a further aspect, if the user is registered and set up "my411" features, the user gets coupons for this category delivered to his "my411" voice box.

In still another aspect, the invention provides merchants the ability to identify specials in their "additional information" or "coupon message" that is used to find that merchant when those words are used over the phone in the key word search mode In still another aspect, the invention provides system and method for publishing secret words in local newspapers, Internet chat rooms and other community oriented online and offline boards, where they can be used on the phone or on our web site as a password to enter a sweepstake or win a prize, and to thereby provide a beneficial marketing tactic to increase sales of print papers and increase traffic to online portals In still another aspect, the invention provides voice coupon targeting based on area code and prefix, city, geocoded location, GPS location, zip code, cross streets, vicinity of a milestone, major tourist areas, major landmarks, airports, night clubs, entertainment centers, shopping malls, restaurants, and the like.

In still another aspect, the invention provides means and business model for facilitating spread of secret words through the word of mouth initiating from someone in the company to provide access to privileged information, prizes, etc. to enhance the repeat user experience In still another aspect, the invention provides the use of live agent interaction on a random call basis to provide a surprise element to enhance the user experience, where live agents can be celebrities.

In still another aspect, the invention provides user choice or automatic choice of voice of the Talk411 attendant based on gender, age, interest, and other selection criteria.

In still another aspect, the invention provides user choice to select synthesized voice of a celebrity as the automated attendant.

In still another aspect, the invention provides system and method for insertion of trivia questions where correct answer wins a prize from a local merchant.

In still another aspect, the invention provides a business model in which 411 directory assistance call centers are provided with an added revenue stream to improve slim profit margins, to increase call volume by providing a desirable information service, to keep their current carrier customers with value added services, to decrease their operating costs and overhead by reducing the number of human employees, and by overcoming severe local competition on wireless carriers.

The invention also provides further apparatus, system, method, operating model and business method, computer program and software, and computer software program products that interoperate with the inventive systems and methods.

BRIEF DESCRIPTION OF THE DRAWINGS

Additional advantages and features of the invention will become readily apparent upon reading the following detailed description and appended claims when taken in conjunction with reference to the following drawings, in which:

DETAILED DESCRIPTION OF EMBODIMENTS OF THE INVENTION

Figure 1:
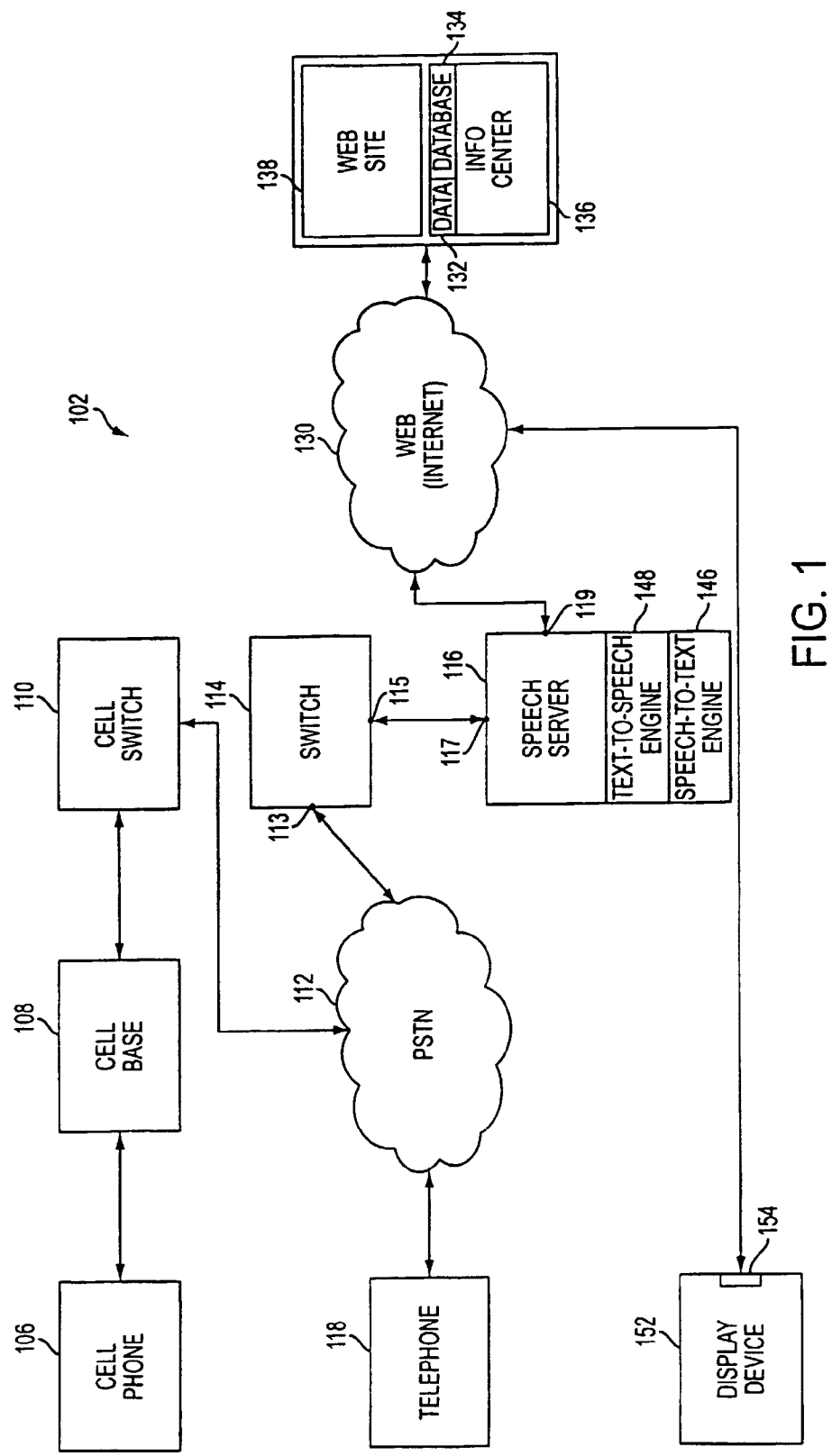
FIG. 1 is a diagrammatic illustration showing an exemplary embodiment of the inventive system.

It will be appreciated that conventional methods and approaches to matching a consumer with a merchant, business, or other individual or organization are unsatisfactory at best, and severely lacking, in many situations. The limitations and sacrifices are described in the Background section of this specification. Even with approaches that are more modern than conventional printed yellow pages or telephone number providing only 411-type directory assistance, the actual improvement measured in terms of merchant, consumer, or industry adoption has been minimal. A combination of technological, philosophical, and psychological needs and forces has conspired against the success of such attempted improvements.

Attention is therefore first directed to an overview of the inventive system, method, computer programs and procedures, and Talk411 service and then to a discussion of certain needs and goals that are desirably satisfied for such an information system to meet the needs of merchants, consumers, and service providers as well. These goals do not rise to the level of requirements, as a system that fails to meet all of the goals may nevertheless provide advantageous utility, but arguably the more goals that are satisfied, the more satisfying the implementation may be. Many of the features described in the following paragraphs are also clearly optional and although they provide great utility and many benefits, would not be required in a basic system or method.

Talk411 is a one-stop fresh information source that offers instant promotion capabilities to local businesses using the telephone or the web. The information service is free for consumers. It is a promotion service for local businesses similar to the Yellow Pages, except it can be accessed with voice interaction on the phone or with display devices equipped with an Internet browser.

The information database (content) may be acquired in any number of ways, including from one or more of the following ways: (i) Purchased from local telephone operators, such as Pacific Bell or other operator, (ii) Input from local businesses who subscribe to the service, or (iii) Content partners who provide local information on the web.

The local businesses can subscribe, access and maintain the information they want to communicate to the consumers in at least the following two ways: (i) Call the Talk411 service and voice navigate/input, and (ii) Browse the Talk411.com and input by typing the information, uploading business information such as logo, etc. The consumers can access the information in several ways as well, including: (i) Call the Talk411 service and voice navigate and speak naturally, and (ii) Browse the Talk411.com web site.

Selected features that a business may user are now described. These are examples to illustrate some interesting aspects of the invention and are not limitations or requirements of any particular embodiment.

Businesses can, for example: (i) Subscribe, register, and input their business information and promotional messages using the telephone or the web site. (ii) Become a member to the standard service, where they pay a low monthly fee in exchange for extended business information prepared specifically for the category they belong. This information is provided upon information request about that specific business. (iii) Become a Category Sponsor, where a message is played/displayed when a caller request businesses in a category, prior to playing the choices. (iv) Purchase Category positions for an additional monthly fee, where they purchase the right to be announced/displayed at a priority level when the callers/browsers request businesses in a specific category. Category Level 2 position for the month will ensure that the promotional message is announced/displayed in second place when the caller requests businesses in that category. If no Category position is purchased, information will be pulled from the database on a random basis. (v) Become a General Sponsor for a larger fee, where their message gets heard as the first message as the call gets answered. (vi) Purchase Audio Coupons, where the callers get a discount on products/services if they call Talk411 service and request information about the specific businesses, upon hearing a prompt from Talk411 or in any of the promotional messages mentioned above. Audio Coupons can be purchased with a credit card on the Talk411.com web site, or on the Talk411 telephone service. (vi) Get reports on access/call patterns in their category. (vii) Get consumer ratings of their businesses upon participation in the "BayHits" discount program. This program allows registered users to get discounts from participating businesses in return for feedback on products/services delivered.

Consumers can, for example: (i) Obtain free of service charges, unlike the 411 directory services which cost about $0.46 to about $0.95 (local phone charges still apply) get local business information. (ii) Have hassle free navigation with voice on the telephone, focused web site with local business information on the Talk411.com web site. (iii) Obtain more information than just the number and address for the local businesses. More relevant information, since the business chooses the type of info they want to communicate. (iv) Locate businesses of interest by speaking naturally and specifying a category. (v) Locate a business by specifying zip code, name, street, phone number or other relevant information. (vi) Get discounts with Audio Coupons from promoting businesses. (vii) Become a Reviewer by registering to the "Bay- Hits" service and get discounts in exchange for rating businesses on the Talk411 service.

From a certain perspective, for a system to be adopted and used by businesses and consumers, the system must not only be technically viable but must also satisfy the needs of the users. In this vain, the inventive system and method are designed to satisfy certain overall philosophical and subjective requirements as well as other more specific telephone service, Internet response, merchandising and marketing needs. In the paragraphs immediately below, some of the concepts and mechanisms that will facilitate providing a high quality of service and acceptance and adoption by the business, organization, and consumer communities are described. These should be interpreted as goals and guidelines rather than requirements of the inventive system or method, as they need not all be adopted or implemented to sustain a successful implementation. Rather they contribute to implementing a commercial system and method, and as such provide options for a commercially successful system, method, and business model.

A caller or user (whether the business or other organization providing talk411 information of a customer making an inquiry) needs to be able to interact with the system with the utmost ease and simplicity. Speed and simplicity should desirably only be compromised for accuracy.

The effectiveness of the system and service may be assessed and measured with the ability of the caller/user getting information with no more than one phone call in most cases. A key benefit for the callers are convenience and savings from local merchants/businesses, hence improving the quality of their lives. Key benefits for the merchant/business/organization are the speed of deploying promotions (or other information) at a low cost, ability to get quick feedback from the marketplace and change their promotion or message dynamically, hence generating quality self-targeted leads. The first impression of the users should desirably be to fun, fast, accurate, and helpful information retrieval.

With these top-level needs in mind, attention is now directed to telephone service preferences. Prompts and menu designs, especially for audio prompts, menus, or other indicators. Sound may desirably be used as an indicator where possible to shorten the amount of words, and a minimum (or reduced) number of questions should be asked to get the answer. Where a response may not be clear, it may typically be beneficial to ask the user to confirm the input, in order to avoid providing incorrect or inappropriate information, and if still not clear, connect to live operator. As consumers are already familiar with U.S. nationwide basic 411 directory assistance, there may be desirability in emulating the basic 411 experience with additional courtesy and information. In some embodiments, limit the registration to phone number and password only, and direct potential member to web site to complete the registration, perhaps offering some incentives for such web based registration. Simple navigation using a limited number of intuitive key words to access information with a special lead phrase are desirably used. As a positive courtesy, a greeting at entry and hang-up may be provided. With respect to response time, it is desirable that the wait not exceed the typical time for operator assisted directory assistance, and a wait time of no longer than about 10 seconds (and preferably less than about 5 seconds) for information.

When a caller makes an inquiry, the phone number is retrieved based on the business (or organization) name and location, and the caller is then asked whether to connect to that phone number. The location can be any designation, for example any or all of an address, a city, a zip code, or major cross streets or other recognizable location. If a location is not specified, then various rules or policies may be used to select, for example, in one embodiment, three possibilities are deliver by city or street names. In the event that there is more than one of the business in the area searched, for example there may be three Radio Shack locations in the search area, then the caller may be presented with three alternatives and locations selected according to any scheme, and asked for a decision with which to connect. In either case, the selection may be made either by the number or by the location.

Embodiments of the inventive system and method provide optional features including "more" information, and a "bayhit" feature. The "more" feature is provided for business or organizations that prefer to provide additional information than standard phone number, address, type of business information. A "bayhit" feature relates to a rating popularity or recommendation feature as described elsewhere herein. Businesses or organization, or specific locations of a business or organization, having more information may be identified using a distinctive sound, tone, word, or other audible indicator to identify them as having "more" information that may be accessed. Use of a distinctive sound reduces the time required to communicate the information and also reduces the computational burden of delivering additional spoken words. The bayhit feature (or equivalent by another name) may be indicated by a different sound, tone, or word than the "more" feature, and businesses or organization that are both more and bayhit may be identified with some third set of audio indicators or hybrid or composite sounds.

Where an audio or voice coupon is involved, the audio coupon may advantageously be played or enunciated at the time the phone number is delivered. Alternatively, the caller may be given an option as to delivery of the audio coupon.

When a caller request or inquiry is processed by the system, the system advantageously retrieves a predetermined number of the closest matches to the requested category and location. In North American culture, three seems to be the appropriate number, however, providing one to 4 of the closest matches might represent the normal range. In some contexts, providing five or more or the closest matches might be appropriate with due consideration given to the brevity of delivering so many alternatives.

Advantageously, the names of the matches are delivered along with the availability of any coupons (when the coupon feature is implemented) and optionally the content of the coupon. Relevancy may be based on a user location input, this location input may be expected to optionally be provided automatically by caller identification based location determining mechanisms, cell phone base station triangulation mechanisms, or phone based Global Positioning System (GPS) location determining mechanisms. When such caller location information is available by whatever method, the search and relevancy may be a location sensitive search.

Upon delivering the predetermined number of matching (or most nearly matching businesses or organizations), the caller is requested to chose from these or to request delivery of additional matches. Either a predetermined number of additional matches may be delivered or the system may request the caller specify how many additional matches, with an optional limit imposed by the system to reduce the burden on system resources and the total connect time. In one embodiment, the number of matches delivered at each stage is three matches, and the total number of additional requests that can be made is four. More generally, the number of matches delivered for each request and the number of requests for additional matches for the same call may be limited to suit local markets and customs.

The system desirably recognize the caller's choice by business name or by either a vocalized queue number or phone keypad press corresponding to the number. IF one of the matches has more than one location in the relevant search area the caller may be presented with the alternative locations or address information when that business is selected. In this regard, the system may filter a business that has multiple locations so that the predetermined number of matches are to different businesses rather than to multiple locations of the same business entity. If the caller is interested in that business entity, then the caller is provided with information as to the multiple locations and asked to select or choose the desired location.

The phone number for the selected business or organization (and location) is then delivered and the caller is optionally but advantageously asked whether the caller wishes to be connected. The ability to be connected is particularly advantageous for a caller using a mobile phone where materials to write the phone number may not be readily available. Automatic connection is advantageously free to the caller and may be free to the business or may incur some additional fees. Various alternative credit, bonus, fee and non-fee based mechanisms may be implemented.

In some embodiments, it may be desirable for the caller to provide a phone number to a particular business name and location, and to have the system search and verify a business name by saying the phone number, and getting the business name back with the coupon if available. This feature may be referred to as a reverse search by phone number with optional coupon retrieval. This feature permits the caller to effectively make an inquiry as to the availability of a coupon offer at a particular business establishment, to make comparisons between business establishments, and to make a decision accordingly.

In a further embodiment, a coupon request may be made by the caller asking for a category alone, a category and location, or any other item or combination of items on which the database may be queried. Based on the results of such a category or other criteria search, the coupon may be provided. Note that although this and the above discussion focus on the voice based system, these coupon mechanisms (particularly the ability to perform directed searches on the basis of business identity and category) may also be implemented for the Internet based service.

Desirably, audio coupons delivered in this manner should have a maximum permitted length. For example, in one embodiment coupons are limited to 10 seconds and in another embodiment to 5 seconds or less. Caller consumers are not generally interested in receiving additional advertising, rather they want to know the essence of the offer, what discount, free item, cost saving, or other enticement is being offered, and no more. They are then free to make an inquiry once connected to the business, merchant, or other organization as to further information. Again, there is desirability of satisfying the needs of the caller consumer, the desires of the business, and the practicalities of system implementation where the number of lines, processors, servers, and other software and hardware infrastructure and impacted by call volume and duration.

Once the caller selects the matching business or organization with which to connect, the system dials and connects the call, checks for an answering machine tone, delivers a message that informs the business that this is a Talk411 call and identifies the coupon promised to the caller, and transfers connection with the business to the caller. Optionally, the caller may be connected to the business during this hand over or transfer process, but normally this is disadvantageous as it appears to add undue complexity to a process that the caller should view as transparent and effortless. Advantageously, in one embodiment of the inventive system and method, during some predetermined time interval following the connection to the selected business, the caller can take action to terminate the call with the business and reconnect with the talk411 system. This presupposes that a connection be retained with the talk411 system, or that a re-connection mechanism be provided. These mechanisms are readily available in the telephony art.

This predetermined time period is anticipated to be in the 15 second to 2 minute time frame, and nominally about 30 seconds so that if the caller determines the selected business does not satisfy the need of the caller, he or she can try again without undue difficulty or expense. In one embodiment, the caller action involves pressing a key or combination of keys so that commands to the system may be clearly distinguished from a verbal discussion with the proprietor or employee of the business. A tone signaling scheme will likely be more readily interpreted than a voice command, particularly if automated switching and routing is involved.

Embodiments of the system provide the ability for a caller to rate or otherwise provide positive or negative feedback regarding a talk411 member business or organization. Desirably, the rating of any particular member should be limited in some way to avoid the possibility of a single caller, unduly influencing a member rating in either an absolute or statistical sense. The limit may be rules that provide for a maximum total number of rating inputs for a business, a limited number per month or per year, or some other rating restriction rules. The goal is to provide other callers with a rating that fairly represents the opinion of all callers that have had an experience with the business, and not to allow either an individual that has had a bad experience to rate the business negatively multiple times. These limitations would also prevent an individual from inflating the rating of a member business by calling multiple times with a positive rating. Control mechanisms would also be desirable to keep the proprietor of the member business from self-rating in an unwarranted manner. These controls may involve technological mechanisms and/or legal contractual agreements with the member businesses.

In one embodiment, a caller desiring to rate a member business has to sign on or register in some manner so as to identify themselves. For example, the caller may sign on to the system by saying a phone number and a password. Individuals desiring to participate in rating member businesses may be provided with certain benefits, points in a points or award program, discounts, or other promotional and/or marketing enticements for their participation. In one embodiment, the system implements a Rate2save points program wherein a registered caller earns points that may be redeemed for goods or services in exchange for rating businesses of organizations. In another embodiment, registration is not required, however, the rating made is associated with the caller's telephone number if the system can determine the callers caller ID so that multiple ratings of the same business from a single telephone number cannot be made, or cannot be made within predetermined time intervals. In the desire to maintain privacy, a message may also be played indicating that the caller's telephone number will be examined and compared for the purpose of ratings control and requesting permission to continue.

A caller will say the name of the business, location or other information such as phone number to quickly identify the business and rate on some predetermined scale, to such as for example, a scale of 1-10, or any other numerical or non-numerical scale that permits the caller to use other adjectives such as for example poor, good, great, exceptional, too expensive, no parking, or any rating information that would be of use to a later customer. Ratings in multiple areas may also be permitted. For example, a restaurant may be rated according to food quality, food portion, service, price, wine selection, parking availability, or other factors of interest to potential customers. As system evolves and direct or indirect feedback is obtained from businesses and consumers, particular rating categories and scales found to be useful will be identified for the various categories of business and the ratings categories may be updated and modified accordingly.

Once the caller rates the business, points or other benefits that the caller rater may be entitled to will be reported and the system will hang up. These ratings will then be compiled and made available to subscribed member merchants and businesses on the web as well as the telephone.

For embodiments of the invention that provide a hit or popular site (restaurants, night clubs, coffee shops, bookstores, etc), best sites, highly recommended sites, or the like listing or directory such hit sights are referred to as Bayhits after the San Francisco Bay/Silicon Valley region where the invention was developed. Other regional areas may adopt other names for such attractions, such as Twin-City Hits (Minneapolis—St. Paul Area), LAHits (Los Angeles), or any other title whether containing "hits" or not. Callers may make requests by category such that such BayHits (or equivalent) may also be found by category and delivered in the manner already described.

While many of the advantageous features of the inventive system and method are provided using voice recognition and text to speech processing over existing telephony infrastructure, other administrative facets may advantageously be taken care of using an Internet Web site or live agent. Live agents may also be occasionally used to set up and register. These administrative features may only be implemented where the clarity and preciseness of textual input and/or the volume of input increase the efficiency and accuracy of the process. These administrative procedures may also involve hybrid voice and Internet components. For example, an initial stage of registration or sign-up may be made over the telephone with minimal information provided over the telephone. The callers are then directed to a web site where to registration may be completed. This form of registration may apply to either or both of businesses and consumers, for example consumers enrolled in the Rate2save points program. The advantage of such on-line or web based registration being that such registration does not tie up a phone line that might better be made available for responding to caller requests, and the accuracy associated with typed or menu driven registration may be somewhat greater given the current state of voice recognition technology. It is important that data entered into the database be accurate, and such accuracy is promoted by test input. This does not preclude the use of voiced or spoken input and it is likely that as voice recognition technology improves that the differences between text or character driven digital input and recognized and converted speech to digital inputs will lessen.

Merchants, businesses, and other organizations may register by providing their phone number and a password for a trial period. This may include a simple registration with minimal information obtained over the telephone and direct callers to the web site to complete the registration in order to take full advantage of all merchant and business services and options. In instances where further registration beyond the trial period are required, especially if the additional registration is required for the merchant or business to avail themselves of additional capabilities, such registration may be completed over the telephone, over the Internet, or through the use of paper document of electronic contracts or agreements.

After or as a component of registration, the basic information for the business, such as formal and common name of the business, business address, business phone number, are verified so that the business may subscribe to the inventive Talk411 service. If the business or organization is not in the database contact is made though a customer service representative or other means. Credit card or other bank or payment information is provided to initiate of continue subscription to the service. The business or organization is then provided with an opportunity to record a message to be heard by a caller when callers ask for more information about the business. In one embodiment, the duration of this business introductory message is limited to a predetermined period of time, usually between 10 seconds and 1 minute, and more typically not to exceed 20-30 seconds. An opportunity is given to review and re-record the message, to confirm the message, and ultimately to publish it. In one embodiment of the invention, provision is made to allow a celebrity or other talent to record the message. This optional service and feature is described in greater detail elsewhere in this specification.

Various levels of membership are supported and different optional features may be made available at the various membership levels. Membership and subscription fees may in some instances be tied to membership level or to options selected.

Whether provided as a membership level or an option within one or more membership levels, a business or organization once subscribed (or registered in a trial period), may purchase sponsorship for the category they belong to by specifying the category, number of months category sponsorship is desired, and level of sponsorship. In one embodiment of this category sponsorship feature, the sponsor business is put in an ordered list or queue (or random pool) along with others who have paid for the same level of sponsorship. When its turn comes (whether through a sequential ordering or via a random or statistically determined selection), the name and phone number (along with a attached coupon, if any) for that category sponsor business or organization will be heard if a caller asks for businesses by category.

In one embodiment, there are three levels of sponsorship. Level 1 consists of those sponsors who paid the highest to have a greater frequency of presentation to callers (a higher hit rate), level 2 with lower frequency or lower hit rate and cost, and level 3 with the lowest frequency and hit rate and cost. In another embodiment, a category sponsor may pay for a fixed number of placements per week or per month. Other placement parameters may pertain to geography, time of day, length of message, or other parameters that may tend to drive more business volume to the category sponsor. While category sponsorship is one type of sponsorship that may be implemented, sponsorship opportunities may exist for other aspects of the Talk411 service.

Voice or audio coupons may be created and purchased once a business or organization have subscribed or registered. Typically, a merchant will telephone and specify the number of coupons he or she wants to purchase and provide credit card information or other billing information and confirm the purchase. Usually, coupons will be bought in quantities in excess of 1000, though there are no limits on the quantity that may or must be purchased as any single transaction. The message that will be played in the form of a coupon is recorded (by the merchant or an agent of the merchant (such as a hired talent), along with the name and phone number of the business. This coupon message will not normally exceed a predefined duration, though different durations may be imposed for different types of business, membership entries, geographic regions, or other criteria. Typically the voice or audio coupon will not exceed 30 seconds in duration, more usually not exceed 15 seconds, and frequently will not exceed about five seconds. Some flexibility may be provided according to a minimum and/or maximum information that the merchant is entitled to record.

In one embodiment, once a caller asks for the business, hears the audio coupon and gets connected to the merchant, the merchant is notified by the system that this is a Talk411 call and play the same coupon message to remind the merchant (or an employee of the merchant) about their promotion so as to avoid any ambiguity or problem associated with an uniformed employee contesting the caller's (now customer's) entitlement to the coupon offering.

In one of the embodiments, providing for talk411 ratings, a simple cumulative rating that is compiled from the raw ratings of the users is delivered when the merchant, calls to check the rating. Security protections such as password or numerical code may be required to access such ratings, particularly when greater detail is provided to the merchant than to the general public. There may also desirably be a ranking within the category to which the business belongs. These ratings will likely be adjusted from time to time and evolve to suit the needs for each category. In one embodiment, there is a simple 1-10 rating, where 1 is the lowest rating and 10 is the highest rating. Other embodiments provide for callers to rate the business on multiple criteria as may be relevant to the category.

It will be apparent to those workers having ordinary skill in the art that the inventive voice or speech based system provides numerous features, capabilities, and advantages over existing systems. The inventive system and method also provide for both separate Internet or world wide web based interface as well as to an integrated system providing both voice/telephone accessed and character/Internet based access. All, or nearly all, of the information described for the voice/telephone accessed features and capabilities are also available for access through a computer graphical user interface (GUI) over the web. It is not required to be able to interact with the web-based user interface with voice, or to connect the user to the merchant with the phone in this phase, however it is desirable to be able to play back the messages during an Internet web-based session that were recorded on the phone. It may even be desirable to allow a user to record a message using local available computer resources and upload the message to the system, however, this is not required.

In other embodiments of the invention, the user is provided with the capability to select a business and connect to the business using the Internet with Voice Over Internet Protocol based technology.

Desirably, the graphical user interface, provides a differentiation between a recorded message versus a text message prior to someone clicking the prompt, so the user expectation is set properly.

An embodiment of the Internet web-based graphical user interface is now described. For reasons of simple access, the web pages are desirably sized and formatted to display on a single viewing screen without the need to scroll. Advantageously, this is accomplished independently of the user's currently set screen resolution. Intuitive buttons and menus are advantageously provided where access and interaction is as simple as clicking on the available selections, and a single mouse click is used where possible. Quick page access is a high priority to encourage use without undue effort, therefore any graphics are desirably used judiciously only where necessary.

Simple and clear icons, tabs, drop downs, and the like features are used. Some space may be reserved for ad banners and other content that may provide useful information for the user or a source of revenue for the site, site operator, or talk411 provider. Coupons will desirably be highlighted so the user can easily understand that they are coupons, and provide facility for printing either as part of the web page or via a separate but readily available free program.

Information storage, search, and retrieval are desirably fast and efficient to minimize any delays. Search and retrieval of business/merchant information such as name, phone number, location, address (any elements of the address) from any of the known data above.

Search by category is supported, desirably with result priority given to category sponsors, and to those with coupons. Reserve a small section where BayHit businesses can be featured with a distinct graphic, linking to their business information.

The result of a search will yield a short list of found or matched (or closest match) businesses with the business information for a predetermined number of (typically 2-5 and usually 3), category sponsors visible in most of the page. The user may then click and select others in the list if not satisfied with the sponsors found. Each result page served with the next button should desirably serve the same format as above, except changing the sponsors and the short list.

For the business user, subscribed business users may be provided with one page where they can provide essential business information that will show as a result to a user search. They can select from an available selection of templates, upload their logo or graphics, and input their information. There will be a dedicated part for displaying their coupons if purchased. Custom pages not conforming to the template may be available as part of the standard subscription, available only to higher membership levels, or available at a higher fee. In one embodiment, customization is permitted but only within a certain range of options that preserve the talk411 look and feel.

A dedicated management page may optionally be made available for the subscribers. Subscribed business will be able to track their coupon promotions, category sponsorships, how they are rated in the category, and their account history. Other information may also be provided.

There will desirably be a provision to provide call volume, page hit rate, and comparative business results for businesses in the same category. This feature may be enabled when the volumes reach predetermined levels. Based on account activity and ratings, the talk411 service provider or an agent thereof will publish recommended action promoting our category sponsorship and coupon opportunities. Therefore it is desirable though not required that some space dedicated to Talk411 be reserved on every merchant page.

In one embodiment, a business, merchant, or organization are able to type in or otherwise enter or present the Coupon message or the Business information into the provided field which will then be translated into speech when a caller asks for the information over the telephone. Alternatively, Business/Merchant will be able to type in the information, and request the information to be recorded by a professional voice (or audio) talent from the list provided on the web site. This alternative feature is provided via an optional voice talent portal (VTP). Through this portal or other means, a user is able to select, such as by clicking on an icon or using a pull down menu, and hear a recorded clip of a message delivered by a registered voice talent as a preview. Each registered voice talent will have a private page where pending jobs will be posted and messages to be recorded displayed. Once the voice talent completes the recording of the job, he/she will be able to upload the wave file (or other file format) for the recording to their private page, and verify and publish it for review by the business. A phone alert with the recorded message will be made to the merchant or organization to confirm and publish the message.

Upon completion with business approval, their credit card or other account will be charged or invoiced with a portion of it paid to the voice talent. Using the facilities available over the Internet, including the ability to use email and record, store and communicated high quality digital recordings, it is anticipated that such process should not take longer than 24-72 hours, and that for highly sought after talent, not more than one week. Additional fees and time may be required for premium talent. The ability to provide a quantity or volume of messages to a voice talent is a key value for merchants and businesses who want professional recording of their messages and don't want to pay the full hourly fee for such talent, or invent the overhead associated with contacting and negotiating a contract with the talent or their agent. Using the inventive system and method, talk411 aggregates the messages to be recorded and lets the merchants share the cost of voice talent recordings.

In one particular embodiment of the inventive Talk411 service, the design of the system is guided in part based on empirical results. These results suggest that the voice-recognition should desirably be highly accurate, preferably accurate better than 95% of the time. Automated announcements should desirably be a compelling and use consumer tested voice. Response time to voice inputs should ideally be no more than about 1 second in most cases, and typically no more than 3 seconds when searching. Some fine tuning of the input and search timing will occur when the system is fielded. Callers should desirably be able to interrupt any time and the system and method should desirably be able to deal with this. Transactions and identities should desirably be kept secure by the high standards. For consumer calls, when the system does not understand after two tries, it should desirably bounce to a live operator, or take other action in an attempt to understand the consumer. For example, if a live operator is not available, the system may use a more sophisticated (but possibly slower) processing algorithm to understand the speech. For business subscriber calls, when they say, "help" there should desirably be some automated help, and when they say "save me" they should desirably be connected to a customer service representative.

Various hardware and software configurations, computer program code constructs, procedures, and mechanisms, as well as a variety of different operating scenarios and protocols for accomplishing these and other goals are now described.

Having now described embodiments of the overall system as well as several operating scenarios, attention is now directed toward a description of two particular embodiments, an Internet web based embodiment and a voice processing based embodiment. Attention is first directed to a description of the voice processing based system including the voice processing hardware and software.

Voice Recognition Based System And Method

FIG. 1 shows the top or high level system architecture 102 and consumer user (or caller) 101 access points for a preferred embodiment of the invention. A cellular phone 106 (or other wireless device), standard telephone 118, either an analog (POTS) or digital, can be connected to the architecture 102 using a standard telecommunication link 120, such as a standard telephone line 122, ISDN line 124, cable 126 or DSL line 128. For a cellular phone 106, it is understood that there is a cellular base station 108 and a cellular switch 110 interposed between the cellular telephone 106 and the PSTN 112. The incoming call 130 from the cell phone 106 or the telephone 118 goes through a PSTN 112 and telephone switch 114 and gets picked up by the Speech server 116, which is connected on one side 117 to the telephone switch 115, and on the other side 119 to a computer network 130 such as for example the Internet.

Access may be via the Internet, for example access using wireless devices using or compatible with the Wireless Access Protocol (WAP). Data may therefore be communicated in a WAP compatible format. WAP is a standard set of protocols for wireless Internet access which can deliver special Web pages to portable devices such as smartphones and palm-portables. In current versions it relies on the use of WML instead of HTML and so on. These systems generally support Java and Windows CE, among others. WAP Version 1.0 has been released and is hereby incorporated by reference along with variants and extensions thereof. Other versions are under development.

The user (or caller) 101 can access the information or data 132 that resides in a database 134 within the Information Center 136 and the Web Site 138 through interactive voice commands 140 and/or through keypad presses 142 on the caller's 101 device, such as on the cellular telephone 106 or standard wired telephone 118. In a preferred embodiment of the invention, only the caller's voice commands are used. The caller's voice commands 140 are recognized and translated into one of the variations of Voice Extensible Markup Language (VXML, VoiceXML, or VOXML) commands 144 by the Speech Server 116 using a speech-to-text conversion engine 146 and once translated into VXML are used to retrieve the information 132 from the Information Center 136 database 134. VXML is an extension or elaboration on the XML (Extensible Markup Language) standard known to workers in the art and not described in greater detail here. Information concerning the VXML Forum is available on the world-wide-web at http://www.vxmlforum.org/ and Version 1.0 of the VoiceXML specification dated 7 Mar. 2000 which is hereby incorporated by reference is available in Adobe Acrobat format at http://www.vxmlforum.org/specs-NoiceXML-100.pdf Once the data 132 is retrieved and transmitted back to the Speech Server 116, the text information from the data 132 is converted to speech using a text-to-speech conversion engine 148 within the speech server 116 and played back to the caller 101 using the caller's device 106, 118. Speech server 116 also generates and plays back (presents) pre-recorded or synthesized menu commands 150 to the caller. The system architecture connects 102 the information database 134 to the Internet 130 (or other local or global network of computers and/or information appliances) which can also be accessed with a display device 152 such as a personal computer (PC) equipped with a modem 154 (wired or wireless), a smart phone 156, other wireless phones or devices, a PDA or palmtop device 158 or any computer or other information appliance or device that can be connected to the Internet (or other local or global network) with the ability to display standard Hypertext Markup Language (HTML) pages or other formats interpretable by the computer 152. Access to such wireless devices may use the Wireless Access Protocol (WAP) and/or other protocols or standards.

It is noted that although reference is made to several current industry standard data and information formats and protocols, such as HTML, XML, and VXML, the inventive structure and method are not limited to these particular formats and/or protocols or to the versions of these protocols in existence at the time the invention was made as those workers having ordinary skill in the art will appreciate the capabilities and features provided by these formats and protocols may be provided in other ways and that future versions of these formats and protocols will also support the inventive structure and method.

Embodiments of the inventive system may desirably incorporate and utilize natural language speech recognition. In such implementations, the user can naturally speak and the system interprets the user's speech to extract the request or inquiry. The provides additional flexibility for a user as that user does not need to know any particular commands or request rules or syntax. Natural speech processing and artificial intelligence are known in the art and not described in greater detail here.

The system and/or method described herein may be deployed as a separate installation or deployed through application service providers (ASPs) who have the hardware and software deployed either nationally, or in the local areas. Teleron and Voiceeo are examples of such providers.

Figure 2:
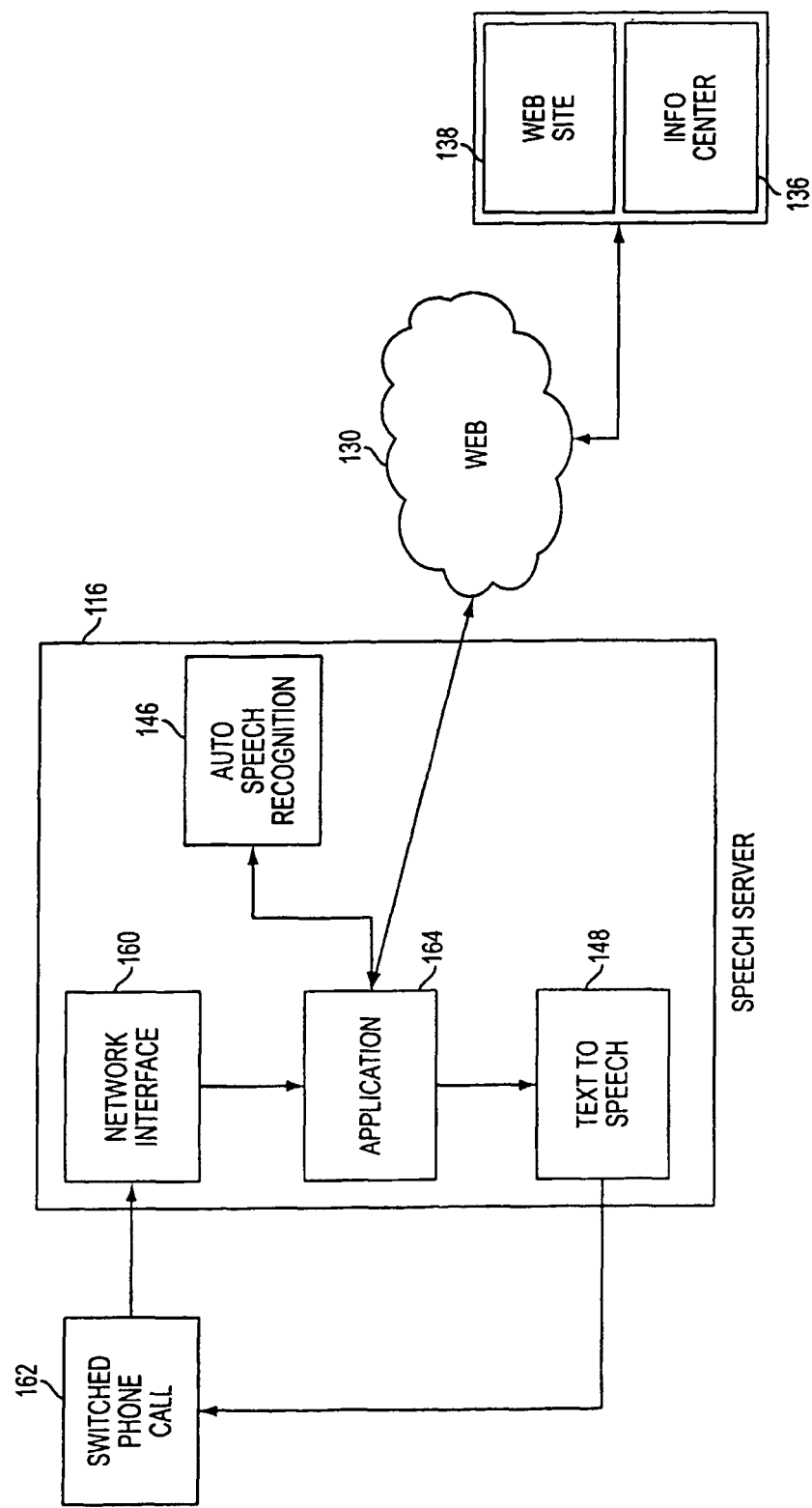
FIG. 2 is a diagrammatic illustration showing an exemplary embodiment of speech server functionality.

FIG. 2 shows an embodiment of Speech Server 116, some of its functions and functional connectivity to receive a switched telephone call and to interact with the Internet 130. Speech Server 116 performs several tasks such as the task of providing a Network Interface 160 to the analog or digital phone network that provides the switched phone call 162, Automatic Speech Recognition (ASR) 146 or speech-to-text conversion (STT), Text-to-Speech conversion (TTS) 148, runs the application or application program 164 that control and manages the phone calls 162 and the Interactive Voice Response (IVR) 166. IVR refers to the interactive voice response which is conventionally a menu driven response provided in response to an input. A user is asked to say something (for example, "Press or say 1 for marketing, press or say 2 for research", etc.) However, the inventors are not aware of any such conventional systems that provide ASR or text-to-speech in connection with IVR. In one embodiment of the invention, the Speech Server 116 is a personal computer equipped with Dialogic Antares automatic speech recognition boards and other products. Information regarding the Dialogic Antares boards are available from Dialogic Corporation, 1515 Route Ten, Parsippany, N.J. 07054-4596 USA and on their web site at http://www.dialogic.com/products/indx_abp.htm.

Operation of the exemplary Speech Server in the system is now described. The incoming call 162 is answered by a network interface card 160, such as for example a Dialogic network interface card (analog or digital). A prompt is played to the caller 101 over the caller's device 106, 118 asking the caller to say the selected item 170 from the available selections on a voice or audio menu. When the caller responds to the request, the application 164 passes the voice data to the auto speech recognition block 146, such as may be provided by a Dialogic Antares™ board loaded with an Automatic Speech Recognition (ASR) software. ASR software is available from several sources, including for example from Lemout & Hauspie (L&H) (LERNOUT & HAUSPIE Burlington, Mass., Phone: 1-781-203-5000, Fax: 1-781-238-0986, http://www.lhs.com) or SpeechWorks (Speech Works International, Inc., 695 Atlantic Avenue, Boston, Mass. 02111, Tel: 617.428.4444, Fax: 617.428.1122, http://www.speechworks.com).

A Dialogic Antares board-based automatic speech recognizer (speech-to-text) 146 translates the voice data into ASCII text (or another code or symbols) that identifies the spoken words (or returns a text or other symbolic representation of the results to the application 164. The application 164 accesses, via for example a T-1 line or faster Internet connection, the database 134 of the Information Center 136. Real-time (or near-real-time), active vocabularies are generated at run-time using the database's 134 ASCII text or symbols. The application uses the ASCII text from the database 134, passes it to a second Antares board 148 running a text-to-speech (TTS) algorithm. The TTS algorithm generates the final voice or audio information that is played to the caller 101.

Voice processing hardware is now described relative to one practical embodiment of the invention, using a Dialogic Antares D41E printed circuit card configured for a Microsoft Windows based computer that supports up to four analog telephone lines and provides a telephony interface and voice processing functions such as playing and recording speech messages and collecting or dialing DTMF digits. The embodiment also utilizes a Dialogic Antares 2000/50 platform is used in one embodiment, and allows the Nuance Voice recognition system (or other voice recognition system with appropriate modification) to operate properly on the Dialogic platform by providing echo cancellation and end pointing services for the system). The installed card will support up to 16 channels of voice recognition.

The Antares 2000 family platform provides a standalone open digital signal processor platform for telecommunication applications. The Antares hardware platform provides four independent TI TMS320C31 32-bit floating-point DSPs running at 50 MHz, each with high-speed SRAM, enabling algorithms to be easily ported to the Antares™ board. Multiple memory options provide flexible solutions for different applications. For example, 512 KB (128 K words) or 2 MB (512 K words) local SRAM are available per DSP and 4 MB (1 M word) or 8 MB (2 M word) global DRAM memory are available per board. SCbus™ (or PEB™) connectivity allows standard access to off-the-shelf call processing products and provides the capability to build higher density systems. Up to 32-channel capability is available. Drivers are presently available for MS-DOS®, UNIX® (SCO®, Unix Ware™, Solaris®, and AIX®), OS/2®, and Windows NT®.

The Antares platform open development environment uses the Antares board and an ANSI C Compiler and Assembler/Linker for the DSPs. SPDX support includes the run-time SPDX DSP operating system and SPDX-KNL kernel development kit. Additional software includes the Antares kernel, which integrates the DSPs into the SCbus system and a down loader to download software to the board.

A single Antares board can process up to 32 channels of digital voice and digital telephony information received from a network interface board via the SCbus. The SCbus bit stream from the network interface board can contain both audio (digitized voice) and telephony signaling information. The bit stream is applied to a SC2000 ASIC chip which has an internal switching matrix. Under firmware control the SC2000 chip can connect any external bus time slot (1024 for the SCbus or 32 for the PEB) to any TDM (time division multiplexed) bus time slot on the Antares board. The Antares board uses four C31 DSPs, each with its own Static RAM (SRAM) to separate and process data for any assigned time slot. Each DSP processes data based on downloaded firmware stored in its SRAM. After processing the incoming data, each DSP communicates with the host PC via global Dynamic RAM (DRAM). Kernel services are available on every DSP. The Antares local kernel provides all the necessary tools to read and write data to and from the TDM bus, which operates as a PCM (pulse code modulated) highway. By using the DSP's internal DMA (direct memory address) capability, the kernel can bring multiple frames of PCM data (up to 32 time slots each) into DSP SRAM from the TDM bus. Each DSP connects to the local TDM bus via a serial interface. The TDM bus is implemented with 32 time slots that are mapped into 1024 external SCbus time slots by the SC2000 chip. Each SRAM contains the downloaded firmware that controls DSP processing and also provides the DSP with dedicated RAM for its data processing operations.

A control port on the Antares platform accepts operational commands from the host PC and monitors DSP-to-host PC interrupt status. This control port controls Antares platform operations such as: DSP reset; communications with and firmware downloading from the host PC via shared global DRAM read/write operations; the transmission of interrupts, control, and status information to and from the Antares platform via the global resource circuits. When the system is initialized, firmware to control each DSP's processing is downloaded from the host PC to the DSP's SRAM. This downloadable firmware enables feature enhancement, application changes, and upgrades.

Additional information on this item as well as on other products that may be used in conjunction with the inventive system may be obtained from Dialogic Corporation is an Intel company, with world headquarters at 1515 Route Ten, Parsippany, N.J. 07054-4596 USA.

The above described Dialogic hardware and the computer system in which it is installed, inter-operates with an operating system (such as for example, a Microsoft Windows operating system, a Linux operating system, a Unix operating system) and application program software including device drivers.

In one embodiment, the Talk411 system is an integration of commercially available software applications and custom applications. These commercial software and custom software components include operation under a Windows NT Workstation (v4.0 Service Patch 4) operating system environment which is available from Microsoft Corporation of Redmond, Wash., USA. The software may alternatively be adopted to interoperate with any of the other commercially available operating systems such as earlier and later versions of Microsoft Windows, such as for example Windows 2000 Professional; or non-Windows operating systems such as Linux, Unix, and others as are known in the art.

The core voice processing application is Parity software's VOS Version 6W (Version 6 for Windows). Parity VOS (V6W dated July 1999) is available from Parity Software, Three Harbor Drive, Suite 110, Sausalito, Calif. 94965. Parity Software is a Dialogic company which is owned by Intel Corporation of Santa Clara, Calif. Parity Active Data Objects RLL (ADO RLL) is also used and is available from Parity Software, Three Harbor Drive, Suite 110, Sausalito, Calif. 94965. The Nuance voice recognition support the voice recognition requirements. Nuance Speech Recognition Software (v6.2.1) is available from Nuance, 1005 Hamilton Court, Menlo Park, Calif. 94025. A VOS-Nuance integration Run-Time Link Library (RLL) provides an interface between the Parity VOS software and the Nuance speech recognition system. An embodiment of a VOS-Nuance Integration Run-Time Link Library (RLL) is available from TeleVoice, Inc., 11767 Katy Freeway—Suite 425, Houston, Tex. 77079. These software and system features are described in greater detail below.

The Parity VOS system includes a VOS Script file or files which have been compiled to binary code which can be executed by the VOS runtime-engine. In Version 6W, VOS licenses are required both to run the system (a run time license) and to compile the VOS script (a developer license), both of which are available from Parity Software. (A developer license can be used as a run-time license but a run-time license cannot be used as a developer license.) Licenses are controlled by a hardware-key ("software sentinel" or "dongle") that plugs into the parallel port of the system.

Additional functionality to the basic Parity VOS script language may be achieved by external modules known as Run-Time Link Libraries or RLLs. Parity Software provides some RLLs with Parity VOS and other RLLs which may be desired to implement additional features are available from third-party vendors. RLLs are used for example, to enhance the VOS capabilities to include such features as voice recognition, text-to-speech, access to ODBC-compliant databases and convert numeric, date and currency values to speech.

The application specific program modules used for the inventive Talk411 system and method include a Nuance voice recognition interface module and a SpeechPro module which converts numeric, date and currency values to speech. Other providers of the broad class of text-to-speech converters (of which numerals-to-speech conversion is a simple subset) are known in the art. For example, Parity VOS provides a similar RLL called SmoothTalker with the VOS application. Those workers having ordinary skill in the art will appreciate that there are a number of competitive commercial products that may be utilized and that the rapid development in this technology area will likely result in a proliferation of software and hardware products that may be used in conjunction with the inventive system and method.

In Windows environments (such as in Microsoft Windows NT, Windows 2000, or the like environments), RLLs take the form of DLLs or Dynamic Link Libraries. RLLs are normally specified in a file (such as for example in a RLLS.TXT file) which must be referenced both when compiling and when executing. These programming and compilation conventions and procedures are known in the art and not described in greater detail herein.

By convention, script files used by the application are designated by a ".vs" (vos script) or ".vh" extension, and compiled VOS scripts are designated by a ".vx" extension. Exemplary embodiments of selected ones of the files are summarized below. Additional detail is available in programming manuals and user documentation from the vendor, either by mail at the address provided elsewhere herein or via an Internet web site provided by each of the vendors.

TABLE I

Exemplary VOS Configuration Files

| | |
|---|---|
| cpb.def | Stores Dialogic specific configuration information (Channel Parameter Block) |
| CPB.PAR | Compiled cpb.def file |
| hedge=2 | Detect greeting on trailing edge for outbound calls |
| nbrdna=6 | Rings before no answer signal given on outbound |
| intflg=8 | Specifies to use full Call Progress Analysis for outbound calls |
| init.def | Stores VOS initialization settings |
| INIT.PAR | Compiled VOS initialization settings |
| sc_pcpa=1 | Use Call Progress Analysis |
| sc_words=20 | Maximum words in a phrase (used by SpeechPro) |
| sc_gtdterm=1 | Let hang-up tones terminate any voice functions |
| fil_buf=16 | File copy buffer size (in Kilobytes) |
| pr.def | Defines indexed speech files |
| PR.PAR | Compiled pr.def file |
| tone.def | Stores PBX specific Tone configurations (generated by Dialogic PBXpert prog.) |
| TONE.PAR | Compiled tone.def |

(Note that ".def" files are the source files, ".par" files are the compiled version of the ".def" file)

Parity VOS configuration files are listed and briefly described in Table I. Parity VOS Source and Executable code files are listed and briefly described in Table II. Table III lists and describes various Other VOS related files. Additional description is provided relative to files and procedures that have been developed to support the inventive system and method and are not part of the commercial software programs.

It is noted that although Parity VOS is used in the particular exemplary embodiment, the inventive system and method are not so limited and that those workers having ordinary skill in the art will appreciate that other programming language and methodological constructs may be used to achieve the invention, such as for example implementations using VoiceXML, C++, or other scripting or programming language or languages.

TABLE II

Aspects of VOS Source and Executable code

| | |
|---|---|
| master.vs | This file "kicks off" the Talk411 application for each voice line |
| master.vx | Compiled "start" file |
| Spro.vh | Header file for SpeechPro commands and constants |
| spro.vs | VOS source code for SpeechPro functions |
| talk411.vs | This is the main application file |
| talk411.vx | Compiled main application file |
| VrCmd.vh | Header file for VR commands and constants |

(Note that ".vs" and ".vh" are source code, and ".vx" is executable code)

TABLE III

Other VOS Related Files

| | |
|---|---|
| directory2.mdb | Microsoft Database file used to store demo business info. |
| LocalRlls.txt | File used to specify VOS RLLs for compilation |
| Rlls.txt | File used to specify VOS RLLs for Run-Time |

The master.vs file is the file specified when launching the Parity VOS run-time engine. It contains all of the code necessary to open up the database, initialize and configure the voice lines and the voice recognition channels and spawn or launch the Talk411 application for each voice line. The presence and general structure of master.vs (and it's compiled partner master.vx) are known to workers using Parity VOS and other such commercial programs. Master.vs for the talk411 system is a file that does some set up, such as, determining how many phone lines are installed, and launches one talk411.vs application for each of the installed lines. It is somewhat like a computer system startup file and initializes some variables, establishes connection to the database that stores the business/merchant/organization information that will be retrieved in response to caller's requests, and then spawns one copy of talk411.vx for each line that it detected as being installed. Master.vs is specific to the talk411 application but it is generic in that each application would usually have a master. Several of the specific tasks performed by master are now described in somewhat greater detail.

Master.vx first determines and defines the number of voice lines installed. This represents the number of simultaneous callers (usually use function that detects number of hardware channels of lines installed, but where the number is stable, this may be hard coded). (Restrictions may also be applied where the number of lines is greater than the to number of software licenses.)

Master.vx then opens a connection to the database in master that is shared by the applications. This database can be a local database either within the same physical box, co-located in a separate box or device, or located remotely. In one embodiment, the database is a Microsoft Access (Access 97) compatible database, however other database types and formats may be used. Advantageously, Parity VOS includes database functionality, so that a database created in Access may be used by VOS without requiring Microsoft Access or separate database application program. In one embodiment, the same data base file (dictionary32. mdb) is used to store and retrieve all of the business, merchant, individual, or other organizational material for both the voice recognition based talk411 and the Internet based talk411.

Master.vx code instructions then initialize the Nuance voice recognition that sets up the mapping between the inbound call line and the Nuance resources. It also maps (or sets up an association or routing of) the Nuance processing channels to the voice caller channels.

Master.vx then spawns or launches one copy of talk411.vx application for every line installed (subject to the number of licenses). There is an iterative loop that increments for the number of lines available. Operation then continues under the control of each talk411.vx compiled application.

The Talk411.vs script defines how the actual call handling and processing happens. The general flow of the call from the talk411 code perspective is as follows. First, a code procedure module "Initialize( )" sets up the telephone line or communication channel specific parameters and prepares the line or channel to accept a call. This line or channel may be wired or wireless and so the term line or channel is used in its broadest sense. Next, a "WaitForCall( )" procedure waits for a ring signal on the line and when it arrives, takes the line off-hook and prepares it for processing. An "InitializeVoice( )" procedure module sets up the voice recognition parameters for this line and prepares for a recognition.

A "MainMenu( )" procedure is where the call originates after the above initialization. At this point we set the Nuance Engine to the ".MainMenu" grammar and wait for a result. It returns a series of "slots" each with a valid keyword. The call is then processed based on the result of this recognition. If the caller said the name of a business, we give them the business information. For example, if the caller spoke a "Type" of business, the caller is provided with information on business of that type. Alternatively, the caller may either have spoken a command (such as help, quit, member information, or the like), in which case the command is handled, or the spoken utterance may not have matched any options in the grammar. Failure to match may be due, for example to the intended spoken utterance not being defined in the grammar, or the quality of the received utterance may have precluded matching. Various programmatic options are available requesting the caller to re say the utterance or to provide a different command or utterance. The talk411.vx file is the compiled version of the talk411.vs file.

A exemplary embodiment of the talk411.vs is now described. The talk411.vs script file and its compiled version talk411.vx is application program that controls how a telephone call to the talk411 service is processed. An interface exists which permits signals sent from any telephone handset or other telephony capable device to be received and recognized by a computer or more precisely by a circuit or PC board designed to handle and process such signals. Telephony-to-computer and computer-to-telephony products made by Dialogic that provide this signaling and call processing capability are described elsewhere herein. In the recent past, interaction between telephone systems and computers primarily relied on touch tone frequency signaling, such as may be accomplished by pressing a series telephone keypad buttons to generate readily recognizable signals, or equivalently to have a computer program generate such tones. More recently, new technology supports spoken voice command and data in a system that provides voice recognition to interpret the electronic signal generated from the spoken voice, interpret that signal, and convert that interpreted signal into one or more commands or data items that can be processed by the computer. Effectively, voice is used to give or respond to an inquiry. These hardware and voice recognition components are known in the art and therefore are not described here in greater detail. References are also provided to companies and organizations providing this type of technology as standard off-the-shelf commercial products.

The talk411.vs, talk411.vx, and other associated or related files provide an additional layer or layers on top of the conventional telephony hardware and software, the voice recognition software and possible optional hardware or DSPs (voice-to-computer), and computer-to-voice (also referred to as text-to-voice), that direct the system in handling a call in a particular way and to provide particular features. The inventive software and system configuration used in conjunction with existing or customized voice recognition features constitute a novel computing and information processing machine and method.

As stated elsewhere in this specification, the Parity Software VOS Version 6 for Microsoft Windows is used as a foundation platform. In its native uncustomized form, it supports only touch tone signaling, and does not support voice processing or recognition in its native form. Nuance has provided a voice recognition software (Version 6.2.1) available from Nuance at www.nuance.com, but this software is not directly compatible with the Parity VOS software. Therefore, a third major software component integrates the Nuance voice recognition software with the Parity VOS software so that the three components accept voice or speech input, interpret it, create a character or a string of characters, and provide that character of character string in the manner of one or more computer keystrokes or other digital data stream that is readily interpretable by the computer.

More specifically, the Parity VOS software handles the interface to the phone system (including how to answer a call when a phone ring indicator signal appears, how to play messages to the caller after it answers, and how to accept touch tone signals form the caller. It also handles branching to further alternative processing based on what action is selected by user, and handles hang-up or call termination by hanging up the line, and resetting the line and the system and software to receive the next call. In essence is it responsible for call control. In many applications it is the only application software that is needed, particularly if the system is a touch tone based systems. The Parity VOS software version 6W does not have native voice recognition built in. Parity VOS version 7 is available, and it is anticipated that Version 8 will be released shortly. Version 8 may provide some additional voice processing or recognition capability, or provide an interface or other integration with Nuance Voice Recognition (and possibly including others, such as SpeechWorks software). The interface software is presently a piece of software that permits use of Nuance Voice Recognition software and returns a result from that software to VOS for processing.

Parity Software also provides a developers toolkit in the form of a programming language and compiler for that language, so that software code, including data structures and executable instructions, can be developed to tell the VOS software and other components of the system what to do. These developer tool kits and documentation for their use are available from Parity Software and are not described in greater detail here. The talk411.vs script is developed using this VOS toolkit and compiled into talk411.vx. This script and its compiled version executes within the hardware to provide control the particular manner in which call flow is handled, what inquiries and responses are permitted (in conjunction with various dictionary and grammar filed described elsewhere herein), how to interpret specif commands and situations. In essence, the talk411.vs and talk411.vx files control the life of a call. Note that multiple phone lines and interactions on a shared personal computer or server are permitted. In one embodiment, twenty-four simultaneous calls on twenty-four different lines are supported. With additional hardware boards and an appropriate configured computer, additional lines and calls are supported. Portions of an exemplary talk411.vs file are set forth in the specification. Selected components of the talk411.vs script file are listed and described and it is expected that those workers having ordinary skill in the art in light of the description provided herein, including the description of the function and operation, the commercial availability of Dialogic, Parity and Nuance Software and Hardware, will understand how particular aspects of call handling are implemented without detailed exposition of all portions of the script, dictionary, and/or grammar source or executable files.

The exemplary talk411.vs file includes the following components or functions: main menu {MainMenu( )}, business information {BusinessInfo( )}, connect to business {ConnectToBusiness( )}, more business information {MoreBusinessInfo( )}, recommend others {RecommendOthers( )}, type menu {TypeMenu( )}, modifier menu {ModifierMenu( )}, rate business {RateBusiness( )}, member entry {MemberEntry( )}, play promotional message {PlayPromo(ID)}, play coupon message {PlayCoupon(ID)}, record promotional message {RecordPromoMessage( )}, purchase coupons {PurchaseCoupons( )}, record coupon message {RecordCouponMessage( )}, check score {CheckScore( )}, category sponsor {CategorySponsor( )}, get credit card information {GetCreditCard( )}, confirm information {Confirm( )}, get voice response {GetVoiceResponse(Grammar, FirstPrompt, SecondPrompt)}, parse input string {ParseString(InputString)}, process slot {ProcessSlot( )}, remove input string spaces {(RemoveSpaces(InputString)}, remove input string dashes {RemoveDash(InputString)}, remove input Wing parenthesis {RemoveParens(InputString)}, save recording {SaveRecording( )}, set end time in seconds {SetEndSeconds (seconds))}, initialize {Initialize( )}, wait for incoming call {WaitForCall( )}, initialize voice {InitializeVoice( )}, terminate voice {TerminateVoice( )}, play message {Play(MessageName}, play message b {Playb(MessageName)}, speech process the phone number {SproPhone(Number)}, and, play speech message that can be interpreted by the caller {PlayI (Prompt)}.

These functions are largely self explanatory by their name. For example, the MainMenu( ) function lets the caller select a business, a type of business or enter the member area. The BusinessInfo( ) function reads the business information from the database and speaks the business Name, Phone Number, and any optional features such as the BayHit Message, Promotional Message, and Coupon Message. The ModifierMenu ( ) menu function is used if the caller only said a modifier such as Coupons or BayHits. The PlayI(Prompt) function will play a speech message that can be interrupted by the caller speaking, where the result of their speech is thrown away, and where the function returns true if the message was not interrupted and false if the message was interrupted.

By way of further example, the MainMenu( ) function portion of the talk411.vs file is duplicated in Table IV. Exemplary portions of talk411.grammar code are also provided in Tables V and VI. As will be appreciated from the syntax of the MainMenu function in the table, this function lets the caller select a business, a type of business or, entry to the member area. Variables used by the function are reset, a greeting is optionally played, and a voice response is received from the caller. A determination is then made as to whether they spook the name of a recognized business, or of a business type, and whether any business type modifiers were spoken. The function also monitors to determine if any commands were spoken, such as for example "Help", "Quit", or "Member".

In particular, the GetVoiceResponse(".MainMenu", Prompt, "MainMenu") syntax results in playing a prompt entitled "MainMenu" that speaks: "Thank you for calling talk 411, please speak the name of a business or a type of business and we will get the information for you." Note that in one embodiment of the invention, the words or phrases are played back from earlier recordings, and that in a different embodiment they are synthesized based on the words or text. Either approach may be utilized and some implementations may utilize a combination of the two. In general, the speech quality is better using pre-recorded speech and is preferred.

TABLE IV

Exemplary embodiment of Main Menu from talk411.vs script file.

```
func MainMenu( )
#==========================================================
# This function lets the caller select a business, a type of business or
# enter the member area
#==========================================================
do
    voslog("Line: ", Line, " Main Menu");
    #    Reset the VR Variables before getting the next VR
    Business="";
    Modifier="";
    Type="";
    Command="";
    if (GreetingPlayed)
        Prompt = "MainMenu";
    else
        Prompt = "Greeting";
        GreetingPlayed = true;
    endif
    # Get a Voice Response from the caller
    GetVoiceResponse(".MainMenu", Prompt, "MainMenu");
    voslog("Business=", Business);
    voslog("Modifier=", Modifier);
    voslog("Type=", Type);
    voslog("Command=",Command);
    # Did they speak the name of a business?
    if (Business strneq "")
        BusinessInfo( );
    else
        # Did they speak a business type?
        if (Type strneq "")
            TypeMenu( );
        else
            if (Modifier strneq "")
                ModifierMenu( );
            else
                # Did they speak a command
                switch(Command)
                    case "Help":
                        Play("Help");
                    case "Quit":
                        Play("Goodbye");
                        TerminateVoice( );
                    case "Member":
                        MemberEntry( );
                    default:
                        Play("Help");
                endswitch
            endif
        endif
    endif
until (Command streq "Quit");
endfunc
```

TABLE V

Exemplary .MainMenu Grammar from talk411.grammar Nuance Voice Recognition Component

```
...
.MainMenu
[
    Business
    Type
    (Modifier Type)
    (Type Modifier)
    Modifier
    Commands
]
...
```

Assuming the caller spoke something the system detect what they said. If they spoke the name of a business then the string returned would not be empty. If the string is not empty, it is processed as if the caller spoke the name of a business. If the type variable has been set, the system knows the caller spoke a type of business and we process that. The program and system parse through and analyze the results that come back from the voice recognition process (Nuance) and process it. Note that the voslog operation merely displays to a display screen. It is further noted that this exemplary main menu is taken from a simple example of a talk411 script file used for demonstration purposes.

In connection with the get voice response (GetVoiceResponse) operation, the ".mainmenu" parameter is a reference to a Nuance voice recognition grammar file that will be used in processing the voice response. When programming Nuance, Nuance requires the identification or definition of each symbol, word, number, or phrase that a caller may say in response to the prompt. Many or even most common words and numbers, as well as common phrases are defined in files provided by Nuance; however, current versions of the software do not allow unlimited words such as might be supported by desktop voice recognition applications. That additional level of flexibility and sophistication invariably require prior training by the speaker so that the speaker's voice characteristics are understood by the speech or voice processing software.

Within the ".MainMenu" portion of the talk411.grammar file are six top-level grammars: Business, Type, Modifier Type, Type Modifier, Modifier, and Commands. Anything with a capital letter as the first letter, such as capitalized "Type" means that the item or type is defined later on in the file or in another file. Further down in the same talk411.grammar file appears a block of code pertaining to further definition of the main menu "Type" top-level grammar. In what follows are a set of definitions, including definitions for such groups as attorneys, auto parts, and the like as indicated in Table V.

With respect to the "<Type "Attorneys">" in the right-hand column, there are three ways in this example that a caller might refer to attorneys, including "attorneys", "lawyers", or "ambulance chasers". Clearly other deserved or undeserved names might be included. These are all the ways someone might say attorneys. In similar manner, the <Type "Auto Repair & Service"> provides several different ways in which a caller may request this type of business, including: "auto repair", "auto service", "auto repair and service", "auto service and repair", "auto repair service", "auto service repair", and even "auto repair and repair", "auto repair repair", "auto service and service", or "auto service service" though the later four combinations are unlikely to occur. Note that in the Grammar Specification Language (GSL) in which the definitions are written, the square brackets "[ . . . ]" mean "or", the parentheses "( . . . )" mean and, and the "?" mean that the item is optional, have meaning such as "and" or "or" which is part of the Nuance "grammar specification language" GSL. The "?" means that the term is optional. For example, one can merely say the word "hamburger" (as well as "hamburger restaurant") and the system will respond as if the caller said "hamburger restaurant".

Note that the "Businesses" are all included in another file called "talk411businesses.grammer", but it is defined here (under the .MainMenu). The talk411business.grammer is a file the contains all of the actual business names with variations on the way a caller may refer to a business. For example, a caller may speak either "Cisco" or "Cisco Systems" and mean the same business.

The other elements such as "Modifier" are identified with or mapped in similar manner using GSL. Within "Modifier" the parenthetic lowercase "coupon" is the actual word coupon that is spoken. These are the things that can be used to modify business or type. One notes that in the main menu, provision is made such that a caller can say "coupons for hamburger restaurants" and the system would extract both the modifier and the business type. Understanding the way people speak and providing the alternative expressions in the system is beneficial as it encourages individual consumers to use the system.

TABLE VI

Exemplary "Type" grammar from talk411.grammer file for Nuance Voice Recognition Component Type
[
    [attorneys lawyers (ambulance chasers)]    {<Type "Attorneys">}
    (auto parts)    {<Type "Auto Parts">}
    (auto [repair service] ?and ?[repair service]) {<Type "Auto Repair & service">}
    (chinese ?food ?Restaurants)    {<Type "Chinese Restaurant">}
    (hamburger ?Restaurants)    {<Type "Hamburger Restaurant">}
    (italian ?food ?Restaurants)    {<Type "Italian Restaurant">}
    (japanese ?food Restaurants)    {<Type "Japanese Restaurant">}
    (mexican ?food ?Restaurants)    {<Type "Mexican Restaurant">}
    ([physicians surgeons] ?and ?[physicians surgeons]) {<Type "Physicians & Surgeons">}
    (pizza ?Restaurants)    {<Type "Pizza">}
    ([steak seafood] ?and ?[steak seafood] ?restaurants) {<Type "Steak & Seafood Restaurant">}
]

The grammar files are ultimately compiled to create a grammar library that identifies all of the various permitted combinations and permutations that are matched to. One may appreciate that for a large vocabulary, this data structure can become quite complex. A library of spoken words and phrases are used that are used to match and recognize the permitted words and expressions. In one embodiment, the libraries are built using the spoken expressions of human speakers.

The talk411.dictionary file is a file that contains an explanation of words or phrases that are not in the Nuance engine. This file is needed when one compiles, however the file may be and frequently will have no entries. It contains the phonetic GSL description of the words or phrases that are not known by Nuance.

The Nuance Voice Recognition System was developed using source files called "grammars" which define the range of speech a caller can say in response to a given prompt. Like VOS scripts, once a grammar has been defined, it too must be compiled using the "compile-grammar" command. A Nuance license has heretofore been required on a per-port basis and the Nuance license has been controlled by a software key.

Grammars may conveniently be characterized as either "Top-Level" grammars and "Sub" grammars. Top-Level grammars are initiated from the VOS script. Sub grammars are essentially the building blocks used to creating a Top-Level grammar. Each Top-Level grammar defines all of the allowable responses a caller can say in response to a voice prompt. A simple example of a top level grammar would be ".Confirm". The ".Confirm" grammar may be used in response to a voice prompt such as "Is this correct?" The ".Confirm" would be constructed of two sub-grammars, "yes" and "no". Each sub-grammar would include all of the various ways a caller could say "yes" or "no".

It is noted that these grammar files having all allowable responses may be seen as being somewhat limited given developments in speech processing and recognition. It should however be understood that the software and system are intended to recognize a response from some arbitrary speaker who may have never accessed the system before and has not trained the system or software with their voice. The circumstances may therefore differ from those present for various commercial voice or speech recognition products, such as those made by Lernout & Hauspie Speech Products N.V.; Flanders Languages Valley, 50; 8900 Leper, Belgium or Lernout & Hauspie Massachusetts Office, 52 Third Avenue, Burlington, Mass. 01803. International Business Machines also provides continuous speech recognition products. These products permit a user to train the system to recognize virtually any words, and take into account not only the speaker's voice but also the microphone, memory, processor, and program application characteristics of the overall system. It may be expected that in time, the inventive system and method would be compatible with such as system; however, as the number of possible inquiries and responses are limited and may be known in advance, the use of such grammar files does not present any practical limitation to the invention.

Grammar files are designated by a grammar extension. At least two additional files are required before a grammar can be compiled: a slot-definitions file and at least one .dictionary file. The .slot_definitions file defines slots for natural language recognition. The .dictionary file (or files), for example the talk411.dictionary file, defines words that are not in the Nuance grammar and thereby allows the total vocabulary which may be spoken and recognized to be extended.

Embodiments of the inventive system and method provide the following five vocabulary related files. The "Talk411.dictionary" file defines words that are specific to the talk411 system and therefore not in the Nuance grammar. (It is noted that future versions of Nuance may be modified to include talk411 words. The "Talk411.grammar" defines the Talk411 application grammar. A "talk411.missing" file is a file that stores the result of the compile and indicates words not in the Nuance grammar. The "Talk411.slot_definitions" file defines "slots" for the natural language recognitions.

The talk411.grammar file is the main file that links any and all other grammar files provided by Nuance. Any file that is a ".grammar" file is defined by an include statement in the main talk411.grammar file. Most of these .grammar files are provided by Nuance, such as grammars for obtaining and processing commonly used credit card expiration dates, through their commercially available tool kits. Note that in addition to the talk411 specific grammars, the main talk411.grammar file includes an initial set of include statements that link the other grammars. A portion of the code is provided in Table VII so that this grammar structure and relationship is clearly set forth.

These "included" files handle, for example, common expressions, yes/no grammar, number grammar, thousands grammar, credit card number grammar, credit card expiration date grammar, and a larger talk411 business grammar that is a grammar containing the talk411 business, merchant, and organization names. In this particular embodiment, all of the grammars except for the talk411business grammar are provided by Nuance, and are common grammars that are used for many different voice recognition applications.

TABLE VII

Exemplary talk411.grammar showing include statements to Nuance grammar files

```
;==========================================================
;     Talk411 Nuance Grammar Definition File
;==========================================================
;     Talk411.Grammar
;==========================================================
#include "common.grammar"
#include "number.grammar"
#include "yesno.grammar"
#include "thousands.grammar"
#include "CreditCardNumber.grammar"
#include "CreditCardExpiration.grammar"
#include "Talk411Businesses.grammar"
.MainMenu
    [
        Business
        Type
        (Modifier Type)
        (Type Modifier)
        Modifier
        Commands
    ]
.TypeMenu
    [
        Business
        Commands
        (more ?businesses)          {<Command "More">}
    ]
... (additional items not shown here follow)
```

The "Talk411Business.grammar" lists all of the business in the system. In one embodiment, this Talk411Business.grammer is a dynamic grammar that can be added to or modified on the fly, that is as the system is up and running and being accessed by callers. In the other embodiments, such as developmental versions, this grammar is a static grammar meaning each business is added manually. In this manual version, the grammar is recompiled and the system restarted after making any changes to this file. An exemplary sample entry in the grammar is listed below:

(straw hat pizza) {<Business "Straw Hat Pizza">}

The entry on the left (straw hat pizza) is the actual phrase of set of words the caller must to say or utter to select this business and the entry on the right is slot (Business) and the keyword (Straw Hat Pizza) that would be returned to the application for processing. Note that in this particular embodiment, the entry for the keyword must match the corresponding entry in the database exactly for a match to occur. Also recall that entries in the database and in the grammar may be established for variations of the phrase. For example, there may be an additional entry for "Straw Hat" that does not include the word "Pizza". Therefore the requirement for exact matching is not unreasonable given that all of the possible variations that may match are made available.

The talk411business are just a list of business, such as straw hat pizza, Michael Italian foods, or other business names. These are just examples, and the names are put in a separate file for convenient administration. Ultimately, a business will be able to sign up without any human intervention using technology currently being developed. Under these systems, it will merely be a matter of the user typing in the name, and allowing the system to process it. If it can be recognized without help that will suffice, however in some instances it is anticipated that a user may have to say the new name one or more times. It is also possible to specify the phonetic characteristics using GSL or other phonetic descriptive language, however this skill would not generally be available to lay people using the system. Nuance also provides for "dynamic grammars" that permits adding entries to a running application on the fly. In this way, business subscription or membership may be implemented automatically without requiring system restart or the like. Nuance and Talk411 grammar files are listed with a description as to their function in Table VIII.

TABLE VIII

Nuance and Talk 411 Grammar Files

| | |
|---|---|
| common.grammar | Nuance provided grammar of common expressions |
| CreditCardExpiration.grammar | Nuance provided grammar for credit card expiration |
| CreditCardNumber.grammar | Nuance provided grammar for credit card numbers |
| MAKEGRAM.BAT | Batch file for compiling a grammar |
| number.grammar | Nuance provided grammar for numbers |
| Talk411.dictionary | Talk411 dictionary file defines words not in the Nuance grammar |
| Talk411.grammar | Talk411 application grammar |
| talk411.missing | Result of compile that shows words not in the Nuance grammar |
| Talk411.slot_definitions | Defines "slots" for natural language recognitions |
| Talk411Businesses.grammar | Talk411 business |
| thousands.grammar | Nuance provided grammar for numbers in the thousands |
| yesno.grammar | Nuance provided grammar for yes/no responses |

The inventive system and method also utilize a database file that stores Customer or Business information. In one embodiment, the database file (directory2.mdb) is created as a Microsoft Access 97 database file. Microsoft access was selected for this embodiment, as the other program modules making use of the database are able to store and retrieve information from the file without having Access program running. Other database structures or programs may alternatively be utilized.

In one embodiment, the database named "directory2.mdb" includes a table named "Customers" and Field Names: MemberID, CompanyName, PhoneNumber, Address, City, Region, Category, Specialty, BayHitScore, BayHitRates, Coupons, and CouponMessage. These fields include entries which are clearly optional in character and pertain to certain specific features provided by the inventive system and method. For example, the BayHitScore, BayHitRates, Coupons, and CouponMessage fields provide novel informational features not present in existing systems or methods. In fact, nearly any database fields may be provided, it is merely a matter of identifying the type of information or content that is to be provided in response to a caller. It is anticipated that these informational or content items will include some identification for the business or entity (company name), telephone contact information (phone number), and address information (city and street address). It may also be desirable to provide some regional information separate from the city and street address (regions), and such region information may define a local neighborhood, or a multi-city or metropolitan area. Driving instructions from key recognized points of interest or locations may also be provided. Specialty may permit a member business to identify a particular product for which they are noted. For example, an Italian Restaurant may wish to identify themselves as specializing in Italian Vegetarian Cuisine, a night club as specializing in swing dance music, or a book store as specializing in first editions. There are a myriad of other fields that could be provided in the database and for response.

It is noted that in one embodiment, the same database is used for the voice accessed and for the Internet accessed system. In the voice accessed system and method, the information may necessarily be limited to a set of words, short phrases, or expressions to simplify the voice recognition and text-to speech processes. It is also generally true that individuals accessing the inventive system from a telephone would prefer short to the point answers or information rather than lengthy explanations or pitches, particularly if such access is made while driving from a mobile telephone. Therefore, a single database may include entries that are common to voice and Internet accessed systems and those that are not common. For example, an additional set of fields may be provided that are served only when accessing over the Internet. Alternatively, two different databases may be provided which are optionally synchronized. One embodiment, maintains separate databases that are regional in character with the concept that a caller in New York City would not need to access the information for businesses or organizations in San Francisco.

Such a database is defined in a memory storage device (either in solid state memory or bulk storage device) on a computer system. The computer may for example be a server computer, many types of which are known in the art. The computer and any attached storage may be on the same machine or on a different machine. Structures and methods for building, maintaining, and accessing databases are known in the art and not described in greater detail here. Several fields for an exemplary customer data are listed in Table IX. These fields include the Company name and phone number, as well as optional but advantageously provided data fields for address, city, region, category, specialty, bay hit score, bay hits rating, coupons, coupon message. A member ID is also provided for accounting and identification purposes.

TABLE IX

Exemplary Customer Database Fields

| Field Names: | MemberID |
| --- | --- |
| | CompanyName |
| | PhoneNumber |
| | Address |
| | City |
| | Region |
| | Category |
| | Specialty |
| | BayHitScore |
| | BayHitRates |
| | Coupons |
| | CouponMessage |

Having described the software modules and procedures present in an embodiment of the inventive system, attention is now directed to operation of the system. In order for the system to be started, each software module must be launched in the proper order. In one embodiment, the order for launching and a description of each module is listed below. It is noted that this ordering applies the particular scripts, compiled scripts, programs, or procedures as they presently exist and that variations in this order may be anticipated for a different set of scripts, compiled scripts, programs, or procedures.

First, the "license.exe" is launched. This is the Nuance license engine that must be launched with a valid "license.txt" file which controls the available recognition sessions that are allowed on a given system. (This program file is executed as a condition of using the Nuance software and is not otherwise required for system operation.)

Next, the "resource-manager.exe" program file is launched. This is a Nuance program which is like the gatekeeper for controlling the Nuance sessions. The "recognition-server.exe" is then launched and provides the Nuance grammar engine that is started with the grammar "package" defined for the application.

A VOS-Nuance interface "VRServer.exe" program is then launched to provide an interface between VOS and Nuance. Finally, the "VOS6W.exe" program file is launched. This VOS6W.exe file provides the Parity VOS application engine, and must have an identified valid .vx (compiled VOS script) file specified in order to start.

Conveniently, an executable file (StartVR.exe) is provided to facilitate this ordered launch and execution process. This executable performs the above tasks and monitors the program modules as they are running.

One embodiment of a particular example of the general flow of new business user (new merchant) 201 interaction with the inventive system and method according to one embodiment of the invention is now described with general reference to FIGS. 1-4. A business user 201 is a user that is providing goods or services to consumers 101 where consumers also refer to the previous caller 101. The business user is desirous of having their goods and services made available to consumers over the inventive system and in promoting their goods and services to consumers.

Once the business user 201 calls, and gets identified as a new business user utilizing a business user registration procedure the business user is asked to say certain business registration information, including for example their name, name of the business, phone number, credit card number, and/or other pertinent business information. Once the registration information is obtained, the system 102 compares the information provided by the new business user 201 with the information that resides in the database 134. The database includes information regarding business so that the authenticity of the attempted registration can be verified with reasonable assurances. In the even that the information does not match, the system 102 may connect to other databases in an attempt to verify the authenticity or otherwise complete the registration. If the information matches, the user registration is completed. If the information does not match, the user is notified with a message providing the new business user with additional options or information, or to recommend trying to say the information again. For example, in one embodiment of the invention, the new business user is prompted with the audio message "Sony, but the information you have provided does not seem to be correct, say 'again' to start over. You can also hang up and call again, say 'help', or register at our web site www.Talk411.com".

Once the new business user 201 is registered and a password is issued to the business user, then he or she is requested to record a short message that will be heard by the callers 101 who request the business user's phone number. Voice recognition can to be used (in conjunction with an optionally previously stored authentic voice print of the business user) to authenticate the business user 201 in addition to or instead of the password 212 depending on the quality of the speech recognition technologies used and the quality of the line or other communication ling connecting the business user to the system at the time. So called "caller identification" available in some areas may also assist in verifying the identity of the business user where the business user would then be required to call from a registered telephone number.

Once the business user approves the short message just recorded, the recorded short message is published then he or she is requested to provide an additional longer message that may be or include a special promotion, directions to the business location, or any other information that will provide additional information to the callers. Both of these short message and long message are available for playback to callers and can also be viewed in text form by those who visit the web site and look up that particular business. The new business user can change either message completely over the phone, or edit it word by word on the PC connected to the web site. Opportunities to subscribe as a category sponsor, and to record and publish a category sponsor message, provide a service description, and to review or change messages are provided.

It is noted that the messages provided by the business may either be a representation of the business representatives own speech which is preferred so that the quality and character of the voice is maintained, or the message may be computer synthesized speech. The later being necessary if the business chooses to provide or later modify the message using text input on a computer. As maintaining original speech may be somewhat cumbersome, additional fees may be levied on the business for providing actual speech as compared to synthetic speech. Alternatively, the business user may be able to select from a set of available synthesized voice types so that the voice, even though not provided by the business directly, provides the intended feeling or emotion associated with the business. For example, a restaurant may wish to convey the feeling of romance.

In yet another alternative, the business user may choose a voice talent to record the message, or choose to have synthesized speech simulate a celebrity voice either living or deceased.

Figure 3:
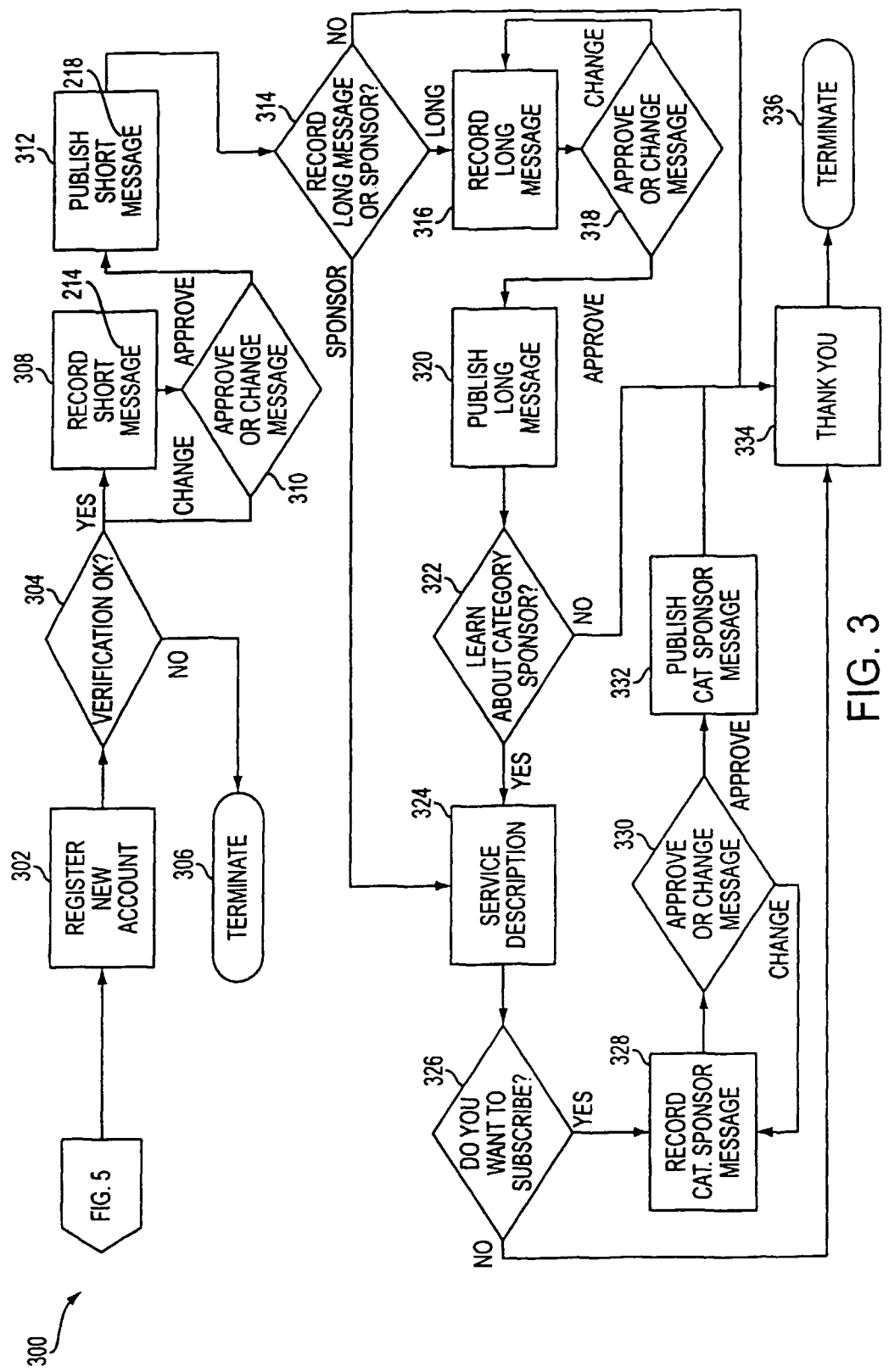
FIG. 3 is a diagrammatic illustration showing an exemplary embodiment of a new business user (merchant) interaction with the inventive system.

Having described the general operation of the system during a new business interaction, we now describe one particular exemplary embodiment of the new business interaction procedure. As illustrated in FIG. 3, the business user calls the decision is made as to whether the calling business user is a new user or in existing user. Once it is determined that a new account needs to be established, registration of the new business account proceeds as described above wherein the calling business user provides certain business registration information register the new account (Step 302). The registration information provided by the registering new business user must be verified (Step 304) before the new business user interaction can continue. If verification cannot be made, then the interaction is terminated (Step 306), otherwise the business user is prompted to record a short message (Step 308). The business user can then approve the recorded short message 214 or change the recorded short message until the business user is satisfied with the recorded short message an approves it for publication (Step 310) at which time the short message is published in a voice form and in text form on web site 134 (Step 312).

Business user 201 is then prompted to optional record either no message, and long message 218, or sponsor message 219 (Step 314). In the event that the business user to record no additional messages, the business user is thanked for providing the information (Step 334) and the interaction terminates (Step 336). If the business user chooses to record a long message than the business user records the long message (Step 316) and a given on opportunity to approve the recorded message or change that message until the business user is satisfied with the recorded long message (Step 318). The long message is published (Step 320) and the business user is again the given opportunity to learn about category sponsorship (Step 322). If the business user declines the opportunity to learn about category sponsorship, the business user is thanked for providing the information (Step 334) and the interaction terminates (Step 336). On the other hand, if the business user indicates a desire to learn about category sponsorship he or she is provided with the description of the sponsorship service (Step 324) and again asked if he or she wishes to subscribe to the category sponsorship service (Step 326). A category sponsorship message is a message will come up when the caller requests businesses in a category without a specific business name in mind. Then the system will play back the message of the sponsors in that category in a pre-determined order, random order or a dynamically defined order based on some policy or membership level or category, or other rules. If the business user declines the opportunity to subscribe, the business user is thanked for providing the information (Step 334) and the interaction terminates (Step 336). If the business user indicates a desire to subscribe, he or she is given opportunity to record a category sponsorship message (Step 328) and further opportunities to either approve or change the message until he or she is satisfied with the recorded category sponsor message (Step 330). The category sponsor message is then published (Step 332) and the business user is thanked for providing the information (Step 334) and the interaction terminates (Step 336).

Figure 4:
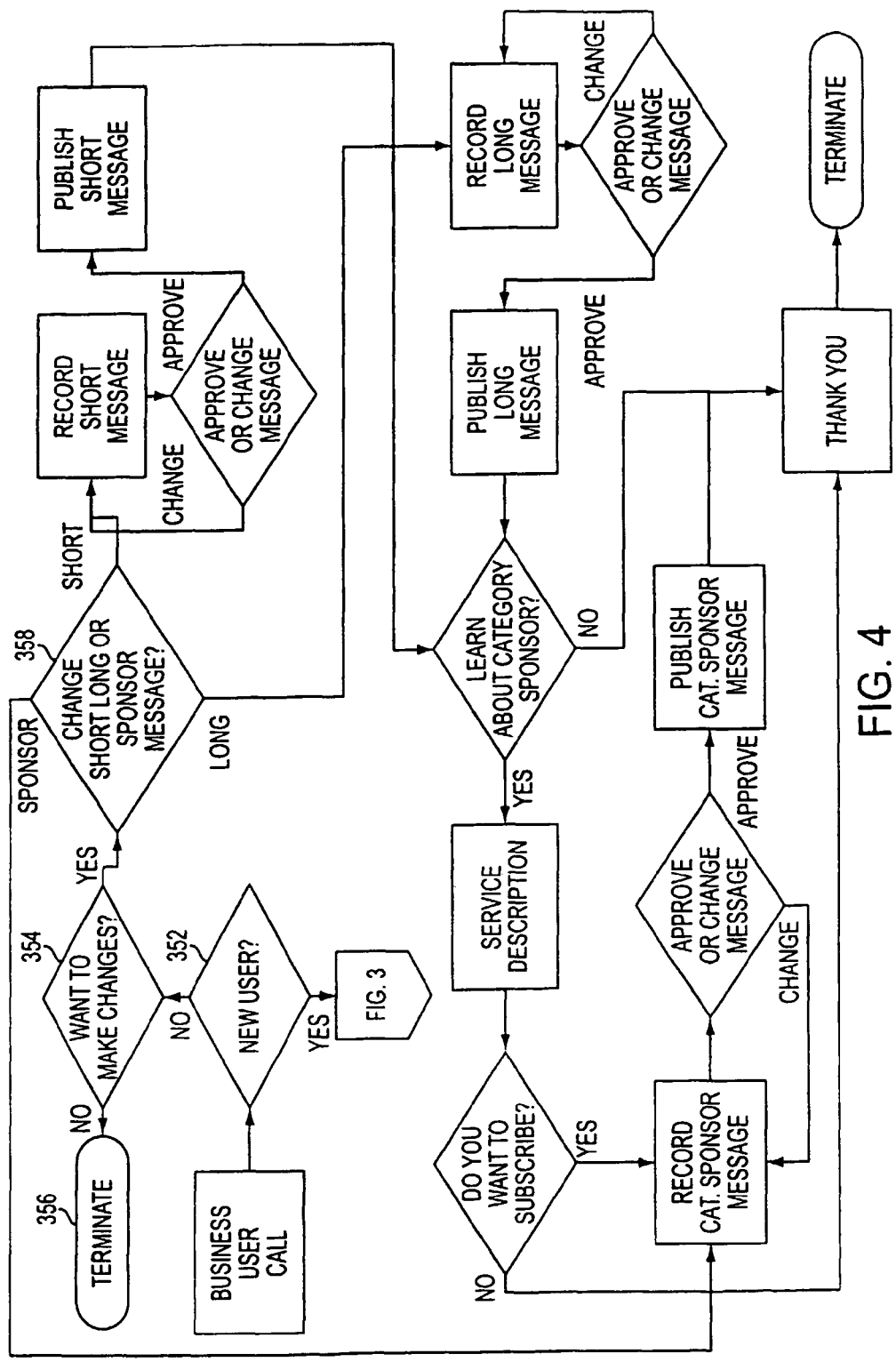
FIG. 4 is a diagrammatic illustration showing an exemplary embodiment of an existing registered business user interaction with the inventive system.

As illustrated in the flow chart diagram of FIG. 4, the procedures associated with the repeat or registered business user interaction are substantially the same as, though not identical to, those just described for a new business user interaction. The differences primarily concerned how the initial phase of the business user call to the system is handled. For in existing registered business user interaction, the system receives the business user call and determines if it is a new user or an existing registered user (Step 352). If the system determines that it is a new business user, then the procedure already described relative to FIG. 3 is executed. However, if the system determines that an existing registered business user is calling into the system, it presumed step the existing business user wishes to make changes to one or more of the items of registration information or to one or more of the recorded messages (Step 354). If the business user decides after placing the call that he or she does not wish to make changes than the interaction terminates (Step 356), otherwise the business user is asked whether he or she wishes to change the short message, the long message, or the sponsor message (Step 358) and given opportunity to change one or more of these messages. These messages are the Long, Short and Sponsor messages that he may have already input into the system via a phone or a personal computer of other information appliance. The process for recording, changing, approving, and publishing each of these messages is similar to that already described relative to FIG. 3 and indicated in the FIG. 4 flow chart, and the business user it is similar given additional opportunities to learn about, subscribe to, and record messages pertinent to additional services provided by the system.

In order to make the user interface more satisfactory, additional steps can be introduced or some of the shown steps can be deleted from the interaction flow. For example, after the Business User makes changes to the short message, he can be prompted to see whether he wants to make any changes to the long or the sponsor messages. An example of the deletion of a step can be where the user is initially prompted to find out whether he wants to make changes and gets told that he can say anytime "make changes" and trigger the menu options. The amount of consolidation largely depends on the speech recognition technologies employed and the key words chosen for the speech recognition vocabulary.

In addition, other embodiments of the invention may largely or entirely eliminate the particular command and data extraction procedure set forth in the above described procedures and replace them in all or in part by a natural language recognition and extraction procedure that either listens to the user's request in free form speech and extracts commands and/or data from the user's speech, or extracts the commands and/or data in part and intelligently asks additional questions of the user for any added information. In this sense, the inventive system and method provide logic for conducting a dialog or conversation with the caller. Essentially the same or substantially the same information is exchanged between the user and the system but with a more flexible interface that is more familiar and enjoyable to the user.

Those workers having ordinary skill in the art in light of the description provided here will appreciate that the procedures described for existing registered users as well as for new business users may be modified to provide somewhat different options at each stage of the interaction or to provide different ordering of the options. Therefore, the interaction described here are merely exemplary of the type of business user to system interaction desirable in an implemented system, but does not limit the inventive system or method to these particular interaction schemes or procedures.

Figure 5:
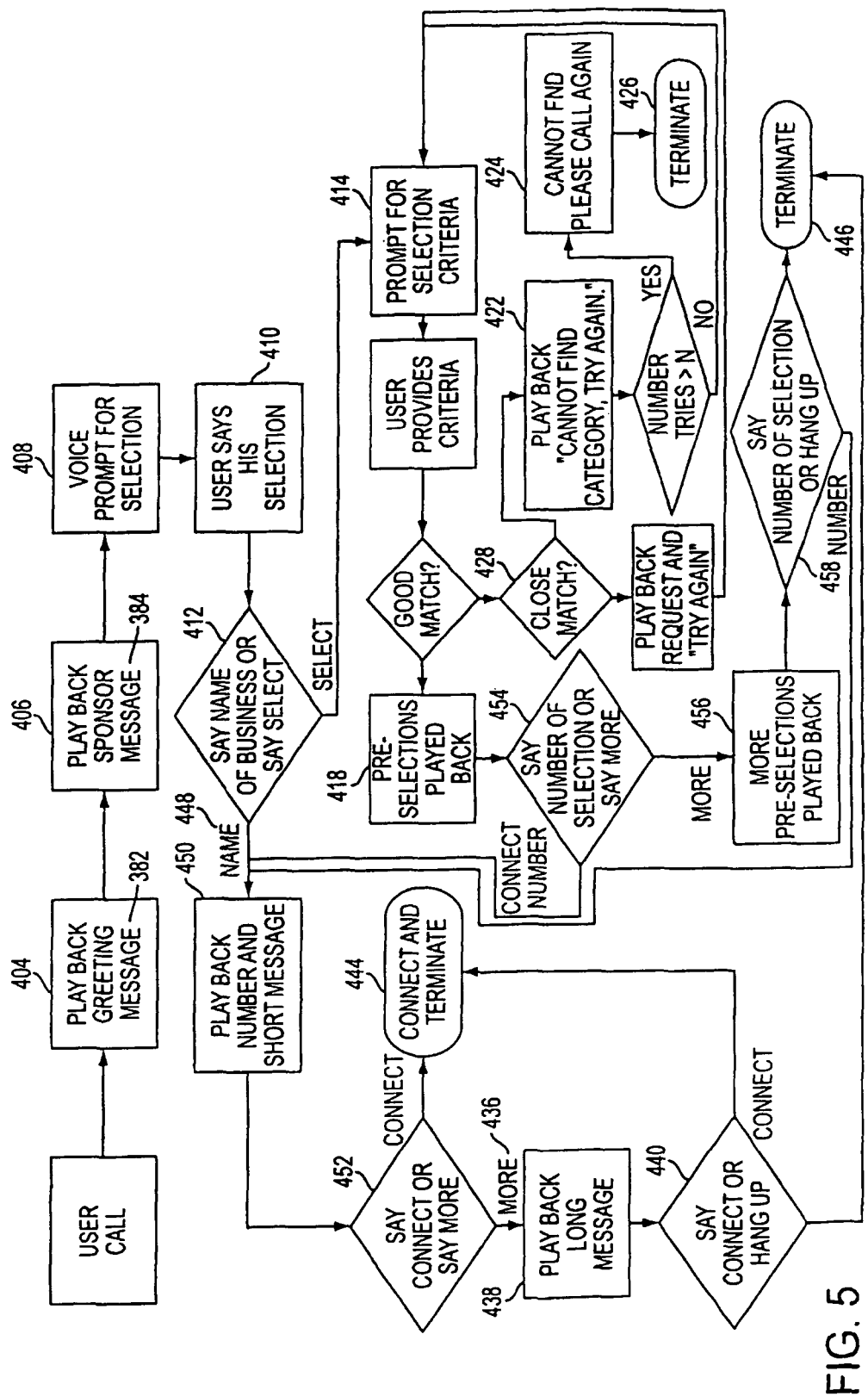
FIG. 5 is a diagrammatic illustration showing an embodiment of a general consumer user interaction with the inventive system.

FIG. 5 shows an exemplary embodiment of the General User interaction 402 such as might occur when a consumer calls for information. Once the consumer user 101 calls, a greeting message 382 is played back (Step 404) such as "This is TALK411, your best source for local information" followed by a sponsor message 384, such as for example "brought to you by Dialsurf, bringing the web to your phone" (Step 406). This sponsor message is typically a paid message by a sponsor. Then the voice menu 386 is played back to the caller (Step 408), such as "Please say your selection: Restaurants, Lawyers, Auto dealers, etc.". Once the consumer user says one of the menu items (Step 410), then he or she is prompted with a request message (Step 412), such as "Say the name of the business or say 'select'".

If the consumer user 101 says "select" or another word identified to the system that indicates to the system that he or she (the consumer user) should be prompted with a list of pre-selected business names, he or she is prompted with a request to specify selection criteria (Step 414). This criteria 388 is pre-determined and varies according to the type of business. In the case of restaurants for example, it may be "type of cuisine, city and zip code". In case of lawyers, it may be for example "type of practice, city and zip code". Once the user says the criteria 388, then the system 102 tries to match the requested category or criteria 388 to the closest category or criteria stored in the database 134. If the match is good (according to some predefined rules or decision algorithm or procedure), then the system will play back a number of business names pre-determined by the system (Step 418). These names can be picked from the database 134, in the requested category, in a pre-determined fashion, randomly or based on a dynamically changing criteria or some fixed set of rules.

The inventive system, method, and business model or operating method is applicable to a broad variety of business and merchant types including but not limited in any way to: restaurants, physicians and surgeons, auto parts, auto repair and service, pizza, auto dealers, department stores, attorneys/lawyers, dentists, hospitals, insurance, beauty salons, banks, plumbing contractors, florists, as well as many other types of businesses and services. The system may also be adopted to professionals, or other individuals or organizations other than those specifically qualifying as businesses or merchants.

One example of pre-determined way is for the subscribed businesses to pay the corresponding fees to be included in the top category (Category #1), second category (Category #2), and the like for a specific time period. An example of random procedure can be, as the name implies, based on a random number generator that picks a database record in the category requested. An example of dynamically changing criteria is when users rate the businesses on a real time or periodic basis and which ever business is rated highest gets to be heard as the #1 (first named), #2 (next named), #3 (third named), and the like down a hierarchical or other list.

After the pre-selections are played back, the caller is invited to say the 'number of the menu selection' or to say 'more" (Step 454), if the caller responds with the number of the selection, the number and a short message is played back (Step 450) and he or she gets prompted with a questions such as "Say connect or 'more' for additional information" (Step 452). If the caller says "connect", the caller is connected to the phone number that was found (Step 444). If the caller says "more" (Step 436) then the pre-recorded Long Message is played back (Step 438) with a question such as "Say connect or just hang up your phone" (Step 440). Based on the caller's selection, either the caller gets connected to the phone number (Step 444), or gets disconnected to the service (Step 446). Of course, different rules may be applied to permit the user to input different choices, however, in some situations it is desirable to have a user call in again when they have rethought their need rather than to tie up the connection for an extended period of time.

If the caller responds by saying 'more', then additional pre-selections are played back to give the caller more and different choices (Step 456). The caller may then either say the number of one of the new selections (Step 458) or terminate (Step 446). In some instances, the caller may be permitted to keep repeating the request for more choices until all choices available in the data base (or a predetermined number of such choices) have been presented to the caller. In either event, if the caller does not like or select one of the available choices, the call terminates (Step 446).

If there is no match (Step 420), an answer such as "sorry, but we cannot find this category in our list, try again" is played back (Step 422). After a predetermined number of tries (for example, after two tries) if there is no match, the system will say something like "sorry, we could not find a business that matches your request, please call us again" (Step 424) and terminate the call (Step 426). If there is a close match, the system will play back the match to verify the request for further action (Step 428).

Once the caller chooses the business by saying its name or menu number (Step 430), the number and a short message is played back (Step 450) and he or she gets prompted with a questions such as "Say connect or 'more' for additional information" (Step 452). If the caller says "connect", the caller is connected to the phone number that was found (Step 444). If the caller says "more" (Step 436) then the pre-recorded Long Message is played back (Step 438) with a question such as "Say connect or just hang up your phone" (Step 440). Based on the caller's selection, either the caller gets connected to the phone number (Step 444), or gets disconnected to the service (Step 446).

If the caller says the name of a particular business instead (Step 448), then the phone number and the Short Message (refer to FIG. 3) will be played back (Step 450) with an additional prompt (Step 452), such as "Say 'connect' or 'more' for additional business information (the Long Message per FIG. 3). Once the Long Message is played back (Step 438), the user will be prompted once more whether the connect or terminate the call (Step 440).

Figure 6:
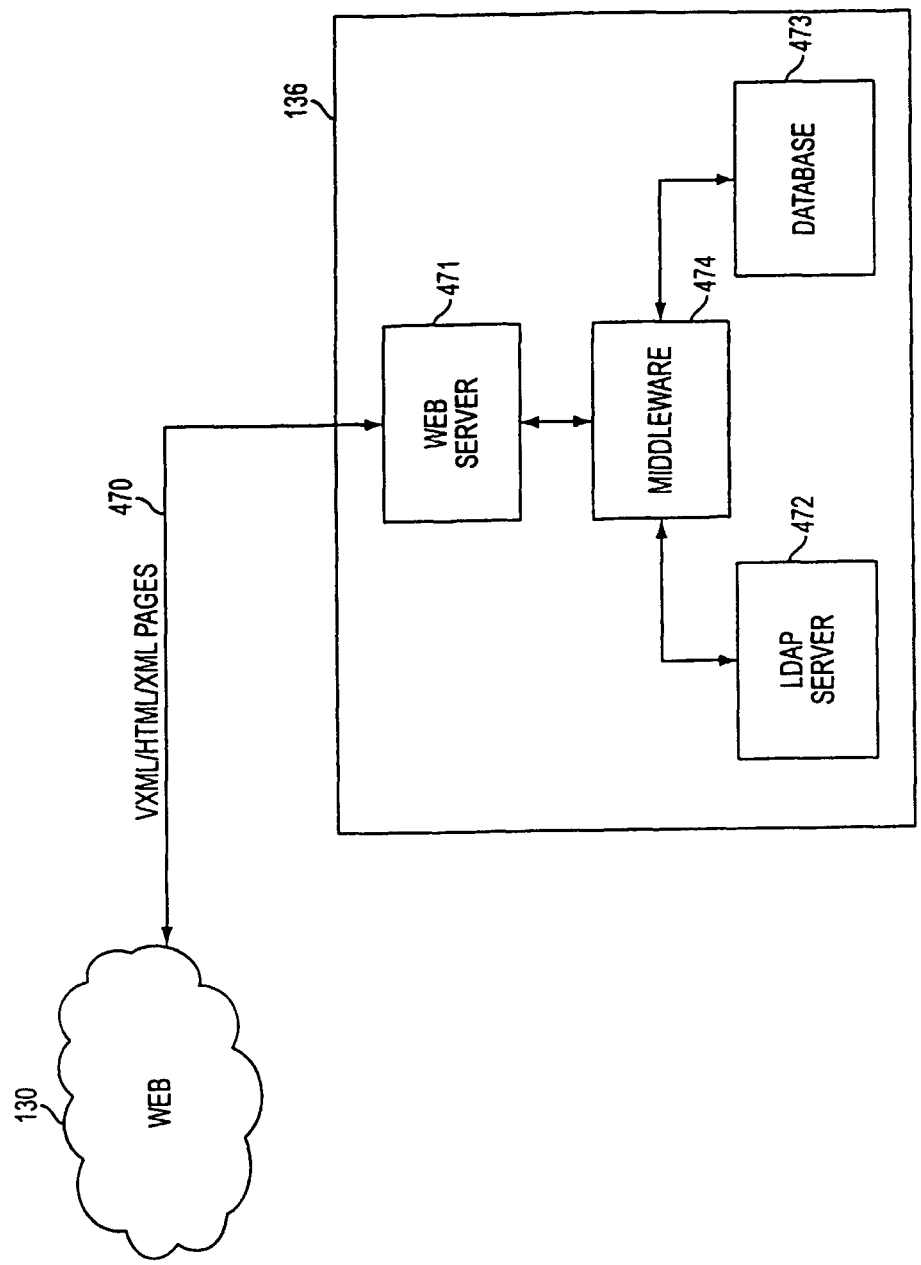
FIG. 6 is a diagrammatic illustration showing an exemplary implementation of the inventive directory service on the Web.
Figure 7A:
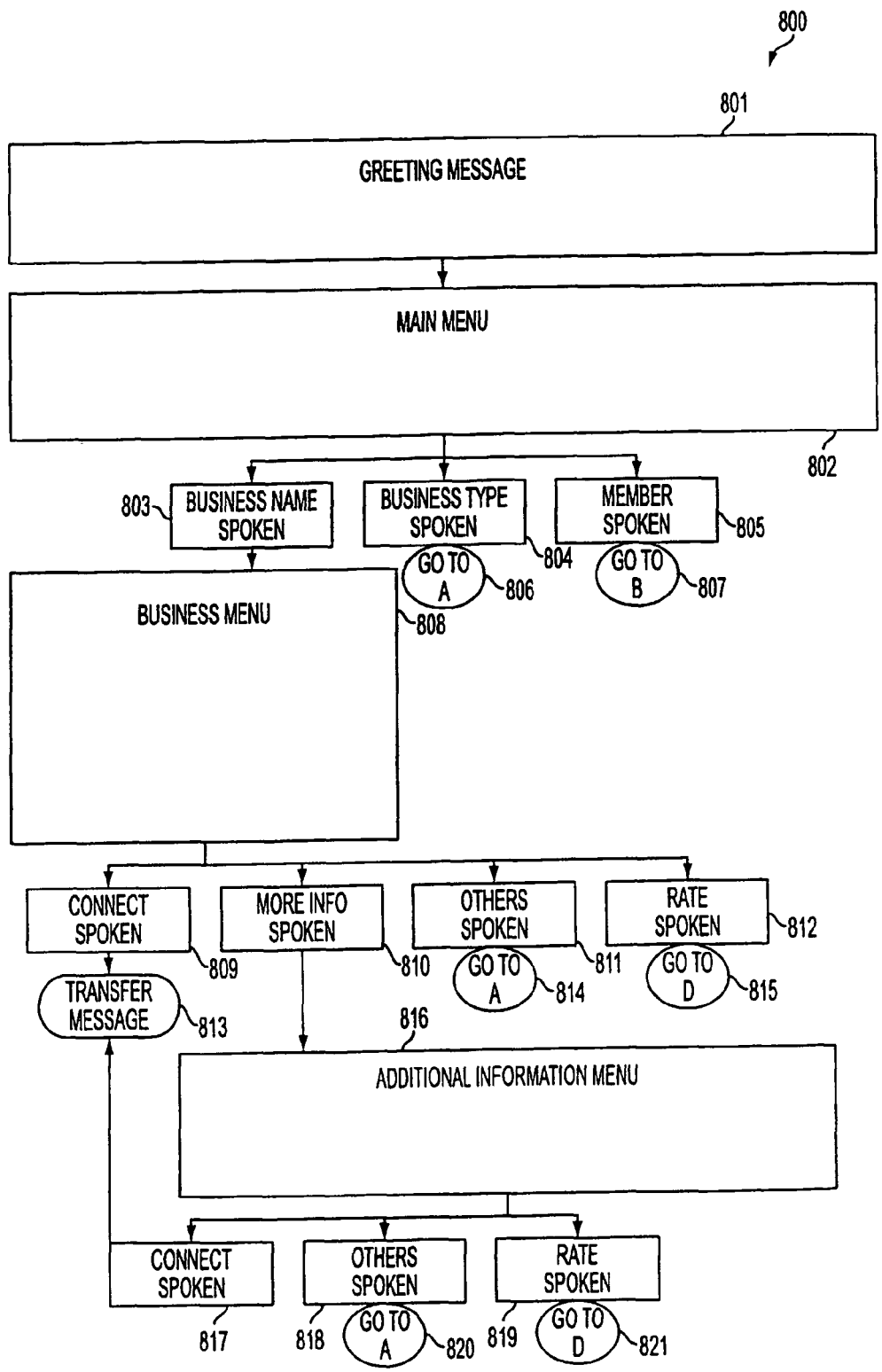
FIG. 7 is a diagrammatic illustration of a flow-chart for a method of interaction between the inventive system and a caller, including call flow procedures and procedures for articulating messages to the caller and for receiving inputs from the caller.
Figure 7B:
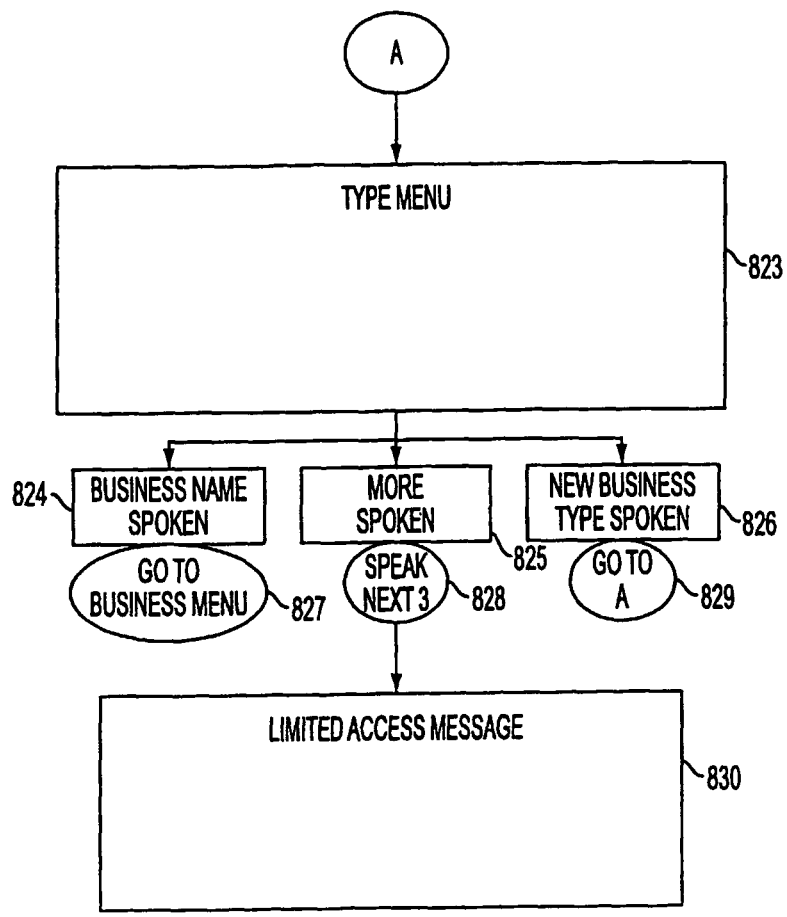
Figure 7C:
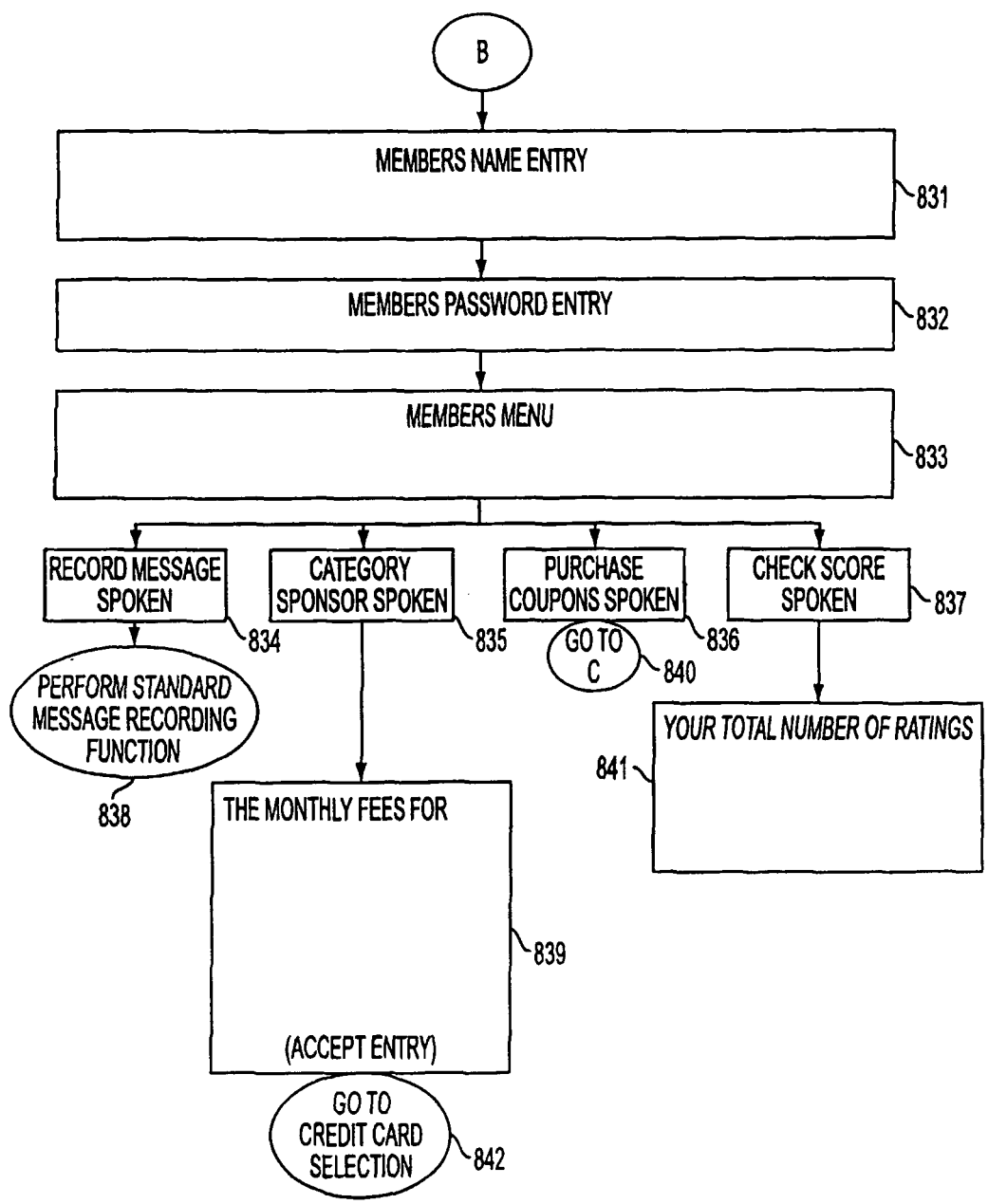
Figure 7D:
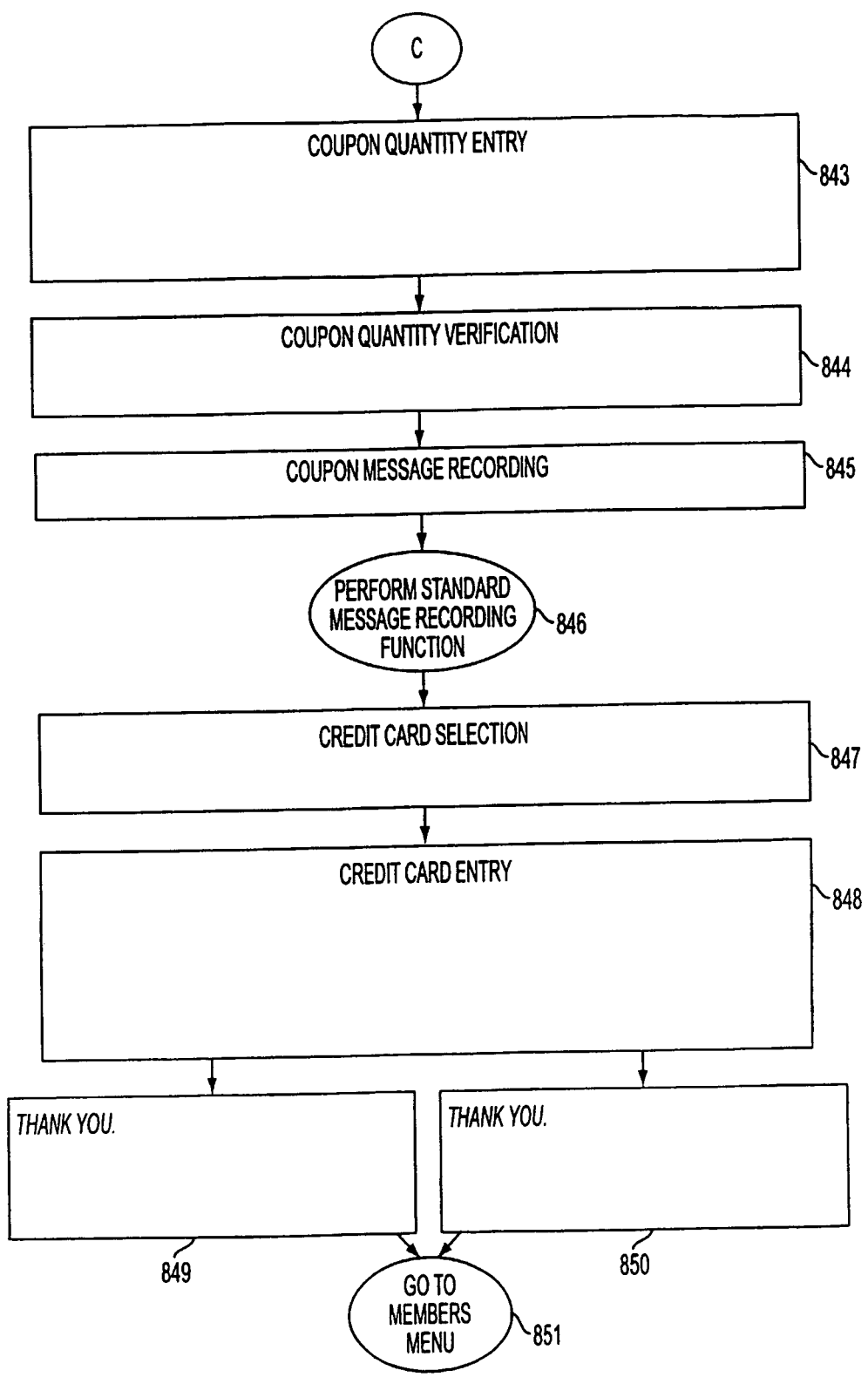
Figure 7E:
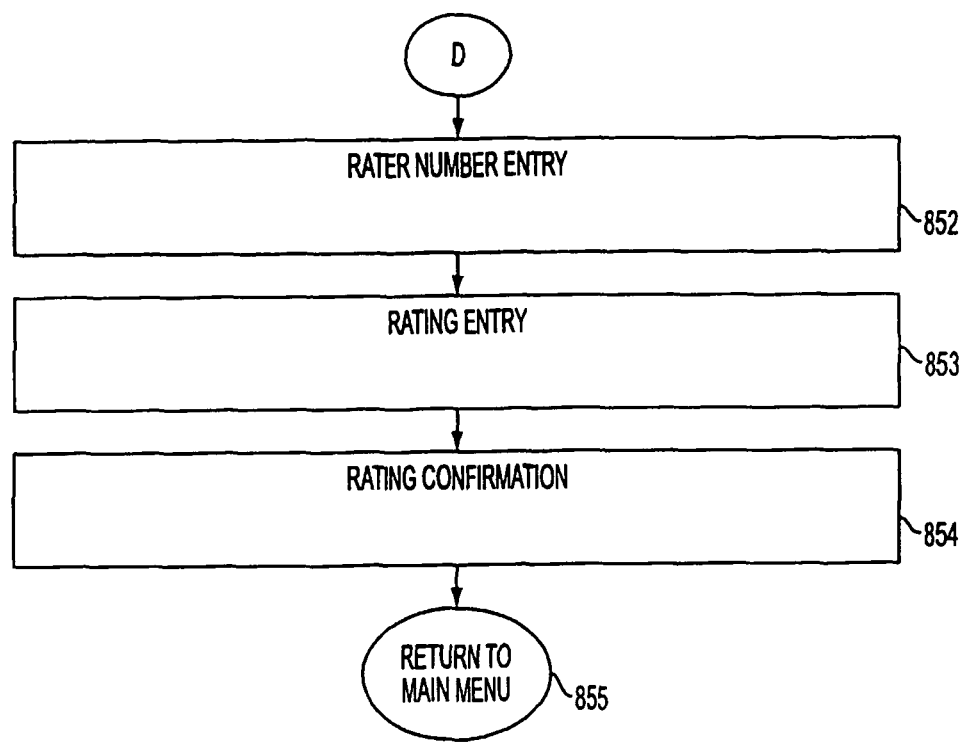

FIG. 6 shows an exemplary implementation of the Directory Service of the information center 136, where the Web Server 471 serves VXML or HTML/XML pages 470, the LDAP Server (Lightweight Directory Access Protocol Server) 472 runs over TCP/IP and provides quick response to high volume lookup to the Database 473. It is noted that this is merely one example of how an information center may be organized and that its computer or server based organization may be integrated with various types of call centers, service centers, and the like as are known in the telephony and server technologies. The Middleware 474 is the layer of software that integrates operations of the Web Server, LDAP Server, and the Database (or any additional software such as Transaction Server). LDAP Servers and operation are known in the art, and is described, for example as of 23 Mar. 2000, at:

http://www.umich.edu/~dirsvcv/ldap/doc/guides/slapd/1.html.

An example of a Web Server for high volume application such as TALK411 is the Microsoft Internet Information Server (HS). Microsoft IIS runs on Windows NT Server. LDAP also runs on Windows NT® 4.0 using Service Pack 4 or later, Windows® 2000, or Windows 95/98. All systems desirably have TCP/IP (or an equivalent capability) installed. Additional information relative to Microsoft products, including Microsoft IIS is available on their website as of 23 Mar. 2000 at http://msdn.microsoft.com/isapi/msdnlib.idc?theURL=/library/psdk/ldap/Id about 7euh.htm Other optional but desirable features may also be provided. For example, one desirable promotional feature involves issuing an audio coupon (also referred to as voice coupon) to a consumer user of the inventive system. In one embodiment, a consumer user is issued an audio coupon entitling the user to a promotion. Typically, such promotion would entitle the user to a discount to be applied to the item or service purchased when the consumer user connects using the inventive system and method. This discount, for example 10 percent off, would only be available to the consumer user when using the inventive TALK411 system and is therefore an enticement for a consumer user to use the inventive system rather than dealing with the business through conventional means. Other promotions might involve a buy one get one free offer, of free drink with order of food type offer, or any other the other variety of promotional offers typically made in the retail trade between merchants and consumers.

The audio coupon may be provided in a variety of ways. For example, the business would become aware that the consumer user contacted the business using the inventive TALK411 system and automatically give the consumer user a discount (or other promotional item) when the your was placed. Alternatively, the consumer user might be given a coupon code which could only be available to a consumer user who ate utilize the inventive system, and a consumer user would provide this code to the merchant upon connection. This code might be generic to the business or particularized to that specific transaction. Therefore, in addition to be self promotion aspects of the business model, the optional use of audio coupons also provides considerable business advantages. In one embodiment of the invention, the system inserts a message to the merchant after the call has been connected to identify the caller as a valid service user and to validate the audio coupon.

In a preferred embodiment, the use of audio coupons is integrated with the world wide web or Internet in that the audio coupons may be identified, stored to, retrieved from, or otherwise processed using the businesses or the inventive services web site. In this way, the consumer user is not limited to using the coupon at the time it was earned, but may instead be collected for later redemption. This also affords an opportunity to obtain a printed copy of the coupon for use at any later time.

In yet another embodiment, the audio coupon or a coupon derived from that coupon may be delivered to a personal data assistant or PDA (such as for example, an email enabled PALM VII) so that the PDA stores the coupon and serves as a medium for displaying the coupon the business, merchant, or organization.

Independent of how the coupon is delivered, one aspect of the inventive system, method, and business model is to collect money or other revenue in what ever form for each coupon delivered. It is also advantageous to collect money or other revenue for each coupon redeemed either as a fixed amount per coupon or as a portion (such as a percentage) of the sale, or both. Collection of revenue for each coupon delivered is separate from collection of revenue for each redemption or sale.

A Professional Message Conversion Service and Method Embodiment is optionally provided and provides a capability for converting recorded or typed (character based) promotional messages to professionally recorded message. Once the user records the promotional message and saves it, the user is prompted to keep the message the way it is recorded, or to get the message re-recorded by a professional audio talent. Then the recorded message is sent to the mailbox of the audio talent. He or she records the message and saves it. An email is automatically sent to the user notifying that the message is recorded and will be activated once he/she reviews it.

In a further embodiment, the system has geographical context provided by a known location of the caller. For example, it is expected that mobile or cellular telephones will have capability to self locate, either using internal satellite-based Geographical Positioning System (GPS) means or by using various schemes known in the art for determining (or estimating) the location of a cellular telephone based on proximity to cellular base stations, hand-off's to base stations, and similar techniques. In any event, the inventive system provides for geographically-based recommendations, geographically-based promotions, as well as for geographically based audio coupon delivery. Here the geographic proximity may be established according to some set of rules which may for example depend upon the density of business establishments in the local area. However, in one embodiment the geographically directed audio coupons pertain to business within one to a few blocks of the callers location, in other embodiments to a mile or two, and in still other embodiments to the region of the city or town. Caller ID may alternatively be used when an address associated with the telephone number is available.

In yet another optional feature, consumer user's who call into the inventive service will be able to rate the particular business after they have utilized the businesses goods or services. For example, a consumer user having been referred to a restaurant using inventive system can later call in using a toll-free or free local phone number and provide feedback, such as in the form of a rating, relative to their experience. These ratings would then be compiled and made available to the local businesses. Hopefully such feedback would encourage the businesses to either maintain their high quality of service or to improve the quality of their service and/or goods in response to the consumer user's rating.

In another embodiment, these ratings were also serve as an additional information source for consumer user's and would be available either or telephone or on Internet based website. The business establishment having demonstrated a particularly high-level of goods or service based on these ratings would be placed into a category of highly rated businesses, such as "BayHits", would be available to the consumer user during his or her call into the system. So for example, when the user calls in to request "Italian restaurant in Palo Alto", if in one of the candidate restaurant played back to the caller happens to be a "BayHit" then that restaurant would be indemnified as such. For example, the caller might receive a message "Il Fornaio—a BayHit". Alternatively, consumer user may be able to request "BayHit Restaurants" and receive only a list of restaurants satisfying the BayHit criteria. In some embodiment of the invention, the rating or BayHit feature may be provided free to the businesses while in an alternative preferred embodiment businesses falling within the highly rated or "BayHit" category would be charged the nominal fee. Those workers having ordinary skill in the art in light of description provided here will appreciate that this rating and promotion scheme may be implement in a variety of ways and that the particular descriptions provided here are merely exemplary of the more general method. The ratings may alternatively or additionally be provided on an Internet website (such as http://www.bayhits.com so that information obtained from caller's using inventive system method would be available to other individuals and businesses as well.

BayHits is the name for a promotional vehicle for local businesses to promote their products and services through the telephone and the web to the San Francisco Bay Area (or any other) population. Analogous names may be applied to other regional markets. Businesses offer a promotional discount of some sort in order to participate and consumers have to register and participate in the "ratings" in order to earn points redeemable towards subscribed discounts. For example, John Doe registers either at the web to be a BayHits Rater. He is immediately given some points (for example 500 points). He can spend these points in exchange for "deals" from participating businesses. Once he calls in and rates one of the participating vendors, he will earn points for each rating.

Ratings will be made available to the participating vendors on the web site. Each participating vendor will be able to see the number of redemptions, ratings for their own business compared to the rest of their category without specific business names. This will help them understand where they stand against their competitors and give them a chance to change their promotional strategy. This is a win-win program, since participating consumers continue to win points, and hence discounts from participating vendors. Participating businesses win because they get increase in patronage and get real time feedback through the phone or the web. If businesses get high ratings, they will be promoted free of charge on the Talk411 phone and web services by the label "BayHit". For example, if ABC Pizza is rated high enough to be a BayHit, every time someone calls to find out info about ABC Pizza, it will be announced "ABC Pizza, a BayHit". Furthermore, when callers call Talk411, they will be able to ask for "BayHits" in a specific Category and get connected. In one business model participation in the BayHits program will be free until brand is recognized and momentum is built with participating vendors. Subscription to the Talk411 service is a prerequisite to become a participating business in the BayHit program.

Other optional services and procedures may also be provided. An optional Audio Talent brokerage portal provides a list of audio (voice) talents. In a reserved area of the web site a list of audio talents are provided to the business users. Once the business user clicks on the audio talent, a pre-recorded message is played back. The user selects to purchase the services of the audio talent of choice, and provides payment means, such as for example credit card or other account information necessary for the transaction.

An Audio Coupon redemption tracking mechanism by auto decrementing a total count of purchased coupons. Audio coupons are purchased through the phone service or through the web site. Once the coupon message is saved it is ready for delivery to users. Once the user gets connected to the business who has purchased the coupons, a coupon counter gets decremented by one. The balance of available coupons is updated in the business account information provided to the business on the phone or on the web site.

Promotional messages may be displayed in an Internet web-based search box. These messages may be rotated based on predetermined criteria, such as x many messages in y minutes. When the user hovers or clicks the mouse or other pointing device over the message box the message will get fixed. When the user hits return, a page from the Talk411 web site will be served with information about the business with the displayed message. If the user starts typing, the box will be cleared and accept the keystrokes of the user.

Facsimile Business Information Input Service Embodiment provides for fax input of business information that gets scanned and converted to text and get played by TTS over the phone. In order to motivate and provide ease-of-use to the business users, a fax back service will be provided, where when the user calls in to the Talk411 service and wants to be a member, he/she will be faxed a form page with fields of information that need to be filled out and faxed back to Talk411. This information will be scanned, edited and accepted to the system. Then a fax will be sent back to the new Business User notifying that a membership is formed and that the user should call Talk411 to check and accept the information.

Some of the steps in this procedure can be changed, left out, or combined to make the user interaction to be a satisfying experience as will readily be understood by workers having ordinary skill in the art in light of the description provided here.

Exemplary Typical Call Flow for a Member Business Using Talk411 Service

Some typical representative call flow scenarios are now described. These are merely illustrative as both the content and ordering of the content may change to suit local or region speech patterns, the goals of the call service, the demographics of the caller to the extent they can be determined, and numerous other objective and subjective or cultural factors.

In this embodiment, a new business manager/owner calls in and registers to be a member. She/he is asked to provide a credit card number for business information verification and services. Then, she/he gets prompted to verify the existing information and subscribe 3 months free of charge to the basic services where she is told she can record her promotional or informational message at the prompt. Then she/he is given a chance to review the existing business information in the Talk411 database, edit information if not correct, review and publish. Then she is given a chance to review and publish her promotional or informational message and asked if she wants to learn about enhanced membership services. If she/he says yes, then she is briefly explained what those are and given a chance to subscribe. She/he is told she can always change her message, subscribe for additional services either on the telephone or on the Talk411.com web site.

First Exemplary Script for Consumer Call:

"Hello, welcome to Talk411, Bay Area's fresh information source"

"Please speak clearly. You can cut me off at any time, I won't get offended"

"If you are a member or want to become one, say 'Yes', if you want me to Find a business for you, say the name, or the type of the business"

ABC Pizza

"ABC Pizza is at 408-255-0000, say "connect", or say "more" for more info"

More

"There is no additional info. Do you want me to connect now or would you like me to recommend others in the area?"

Others

"Choice 1:Domino. Choice 2: Straw Hat with 10% off on any large Pizza, say your choice"

If answer is: Straw Hat

"You will need the following number to get your discount. Write it down while I connect. It is: SH1. Again, it is SH1. Thank you for calling us"

If answer is: Domino's

"All of Domino's Pizzas are made with real cheese and guaranteed to be hot on delivery! Thank you for calling us."

Exemplary Script for Business Call:

"Hello, welcome to Talk411, fresh info source for the Bay Area"

"Please speak clearly."

"If you are a member or want to become one say 'Yes', if you want me to find a business for you, say the name or the type of business"

I want to become a Member

"What is your business name or business phone number?"

ABC Pizza

"I do have some info for your business. Please answer my questions so I can process your membership. Your first three months are free of charge. We do require a major credit card so we can continue to provide you with uninterrupted service and give you the ability to order audio promotions and coupons any time any where on the phone or at the Talk411 web site. We will not charge your card until your 3-month trial period is complete. Please provide a MasterCard or a VISA credit card number followed with the expiration date"

xxxx xxxx xxxx xxxx and the expiration is 03/01

"What is the full name on the card?"

John Doe

"What is the zip code for the billing address?"

94102

"Please wait a moment while we process your information"

. . . (may play an ad here)

"Thank you. Your password is Pass001. Please write it down. Again it is Pass001. Now you can dictate a short message that I will deliver to callers when they request your business information. You can change this message anytime here or at Talk411 web site by signing in with your password. Please dictate at the prompt or say Exit"

ABC Pizza is located right next to the Great Mall and we serve anywhere in the Bay Area "This is how I understood your dictation: "ABC Pizza is located right next to the Great Mall and we serve anywhere in the Bay Area". If this is not correct please repeat the message. If it is correct, say so" (after two tries, go to the Talk411 web site to type in your message).

Correct

"Congratulations. Now all callers who request your business info will hear your message. I can promote your business in other ways as well such as Category Sponsorships and Audio Coupons. Please visit our web site at www.Talk411.com and give me a call again. When you are ready to purchase additional services you can say "Promote" any time and I will step you through it. Thank you for your business"

Exemplary Script for Experienced Consumer Call:

"Hello, wel . . .

Pizza Coupons

"What is your zip code?"

94122

"Say your choice any time to redeem your coupon and connect:

Domino's two for one for any large pizza

Straw Hat 10% all Medium size pizzas

Big John's 50% off the second pizza . . .

Big John's

"You will need the following number to get your discount. Write it down while I connect. It is: BJ1. Again, it is BJ1. Thank you for calling us"

Exemplary Script for Experienced Business Call:

"Hello, wel . . .

Member ABC Pizza

"Please say your password"

Pass001

"Do you want to change your message, or purchase new promotional services?"

Promo

"Extended Message, Category Sponsorship, General Sponsorship or Audio Coupon?"

Extended Message

"This feature is an additional $20 per month. You will be able to provide the information most callers are requesting for your type of business by answering the questions I will ask, or you can leave a general message X seconds long. Say "Template" or "General message" to pick one"

Template

"Do you deliver?"

Yes

"Do you charge for delivery?"

No

"Which zip codes or cities do you deliver to?"

San Jose, Milpitas

"What is your house specialty pizza and how much does an 18" one cost?"

ABC Supreme and it costs $15

"Do you offer per slice and if you do how much for a pepperoni/cheese slice?"

Yes, it is $2.50 per slice

"What are the closest freeway and the name of the exit?"

101, exit is $1^{st}$ Street

"Do you take credit cards, if so which ones?"

Yes, all major credit cards

"Do you promote your specials on Talk411 service and the web site?"

Yes

"What the most ordered Pizza?"

Supreme (if not understood invite to input this field at the web site, or try again later)

"Thank you. All of this information will be displayed on the Talk411 web site and will be available to callers who are interested in listening." (Note: A feedback mechanism to verify the inputs are correctly recognized may also advantageously be provided.)

"Do you want to purchase Audio Coupons?"

Yes

"Audio Coupons are sold in quantities of 100, 500, 1000, 5000, 10000. Price for 100 is $1 each, 500 is 90 cents, 1000 is 80 cents, 5000 is 75 cents and 10000 is 70 cents per coupon. Please pick a quantity"

One thousand

"Please dictate the discount message you want to communicate"

Purchase one large pizza and get a medium pizza free

"Thank you. Callers who request to hear coupons or info about your business will hear your message. If you would like to be the first or second heard when callers ask for your category, please say "promo category sponsorship, otherwise say exit or hang up"

Promo category sponsorship

"Do you want to check availability by date or by preference order?"

Preference order

"#1 is available April 8 at $5000, #2 is available May 15 at $2500, and #3 is available now at $1000. All prices are valid for 3 months, and can be purchased for one, two or three months. Please say the pecking order you want to purchase followed by the number of months."

1 for 3 months

"Your total will be $15,000. Would you like us to charge this to your credit card on record or would you like to send a check?"

Send a check

"You have till xx/00 to send your check. If not received by this date, your promotion will be cancelled, and a deposit may be required in the future. Please send your check for $15,000 to Talk411 Service, P.O. Box 10000, San Jose, Calif. 95131, again (repeat) . . . Thank you for your business. You can check the status of your account and order additional services through the Talk411.com web site. Thank you for your business."

It is noted that for experience callers, the scripted message may be interrupted by the caller so that his or her response may be acted upon more quickly. It is not necessary for the caller to listen to the entire prompt before responding. This feature reduces or eliminates potential irritation at having to wait to respond.

Exemplary Script and Call Flow for Caller Interaction:

Caller interaction with the inventive system is important to the commercial success of the system, method, and business. In general, consumers do not tolerate an interaction that is overly rigid or inflexible, or that requires carefully formatted responses. FIG. 7 is a flow-chart diagram setting out the caller flow and interaction with the system for a method of interaction between the inventive system and a caller are now described. The flow-chart of FIG. 7 is broken into FIG. 7A-7E for convenience in presentation. The flow-chart includes call flow procedures as well as procedures for articulating messages to the caller and for receiving inputs from the caller and may serve as a basis for developing the call handling procedure and the talk411.vs script file.

In responding to a caller, the caller interaction is outlined in a caller handling procedure 800. The caller first receives a Greeting Message 801 that articulates the message "Hello, welcome to Talk 411. I am your local business guide to instant savings. Please speak clearly. You can cut me off anytime. You can also bypass my prompts by saying some keywords such as member, coupon, or BayHits." Next the caller hears the Main Menu 802 message that articulates "If you want me to find a business for you, say the name or type of business. You may also ask for coupons or a list of Bay Hits businesses for a particular type of business by saying something like "Pizza Coupons" or "Bay Hits Restaurants". If you are a member, just say "Member"." Upon speaking a selection from the available choices, the caller is directed to the selected category, here one of 803: Business Name Spoken 803, Business Type Spoken 804, or Member Spoken 805.

For a Business Name Spoken 803 selection, the caller hears a Business Menu 808 which articulates the name of the business, if it is a BayHit, the phone number, a promotional message, and a coupon message and asks if the caller wishes to be connected now, receive more information, recommend others, or rate the business, where the form of these items is identified as follows: "<Name><Bay Hit> is at <phone>. <Promo message><Coupon Message> Would you like me to connect you now, give you more information, recommend others, or would you like to rate this business as part of our Bay Hits program?" Notes for Business and Additional Information Menus: (1) ".a Bay Hit" will be spoken after the name of all businesses who have a Bay Hits score>4, and (2) Promo Messages and Coupon Messages will be spoken for a business if they exist.

If Connect Spoken 809, then Transfer Message 813 is articulated and the caller is connected to the identified business.

If More Info Spoken 810, then the caller is presented with the Additional Information Menu 816 which articulates the name of the businesss, if it is a BayHit, its address location, its phone number, any promotional message, and an inquiry as to whether the caller wishes to be connected now, for other recommendations, or for an opportunity to rate the business as part of the BayHits feature, in the form "<Name><Bay Hit> is located at <address>. The phone number is <phone>. <Promo Message> Would you like me to connect you now, recommend others, or would you like to rate this business as part of our Bay Hits program?"

If Connect Spoken 809 at this stage, then Transfer Message 813 is articulated as before and the caller is connected to the identified business. If Others Spoken 818 at this stage or Others Spoken 811 in response to the inquiry from Business Menu 808, then the caller is presented ("Go to A" 814 or "Go to A" 820) with Type Menu 823. If Rate Spoken 819 at this stage or if Rate Spoken 812 in response to the inquiry from Business Menu 808, then the caller is presented ("Go to D" 815 or "Go to D" 821) with Rater Number Entry 852.

If in response to the Main Menu 802 inquiry, the caller spoke business type (Business Type Spoken 804) the caller is also presented ("Go to A" 806) the Type Menu 823, while if the caller spoke member (Member Spoken 805), then the caller is presented with ("Go to B" 807) a Member Name Entry 831 message.

Type Menu 823 presents three businesses at random by type of business, identifying them by name, BayHit, and any coupon message, in the form:

<Name><Bay Hit><Coupon Message>
    <Name><Bay Hit><Coupon Message>
    <Name><Bay Hit><Coupon Message>, and indicating that "You may choose one of these businesses, or say "more" for additional selections." If Business Name Spoken 824 then the caller is presented (Go to Business Menu 827) with Business Menu 808 as described herein above. If New Business Type Spoken 826 then the caller is presented ("Go to A" 829) with Type Menu 823, and if More Spoken 825 then Speak Next 3 828 speaks three more businesses, until the third set of three businesses are presented and then plays Limited Access Message 830 articulating "For more information, please call me again. Due to heavy traffic I have to limit access to our free service. Thank you for calling Talk411."

It is noted that in the embodiment in FIG. 7: (1) If the caller has selected the modifier "Bay Hits", only businesses with the Bay Hits designation (Bay Hits rating>4) will be presented. (2) If the caller has selected the modifier "Coupons", only businesses with Audio Coupons will be presented. (3)<Bay Hit>, <Coupon Message> and <Promo Message> are only played if they exist, and the demonstration will include a <Promo Message> for each business, but only some businesses will have a <Coupon Message> or be rated highly enough to be a <Bay Hit>. (4) A maximum of nine businesses will be spoken, including the original three businesses.

When Member Spoken 805 in response to Main Menu 802 inquiry by the caller, the caller is presented with Members Name Entry 831 and hears the message "Please tell me your business name. If you are not a member and would like to become one, please visit our web site Talk411.com." The caller is prompted for Members Password Entry 832 and hears "Please tell me your password" and then Members Menu 833 hearing "Would you like to record your Promotional Message, purchase Audio Coupons, check your Bay Hits score, or become a Category Sponsor?" may speak a selection from among Record Message Spoken 834, Category Sponsor Spoken 835, Purchase Coupons Spoken 836, and Check Score Spoken 837.

Record Message Spoken 834 permits the caller to Perform Standard Message Recording 838. Category Sponsor Spoken 835 permits the caller to hear the monthly fees for Category sponsorship which in one example are as follows: Silver: $2500, Gold: $5,000, Platinum: $10,000; and permit selection and acceptance of one of them, and then payment for the selection via the Go to Credit Card Section 842.

When Check Score Spoken 837, the caller is presented with an indication of the total number of ratings, points, and average rating in the form of: "Your total number of ratings is <number>." and "Your total number of points is <points> for a Bay Hits rating of <average>."

When Purchase Coupons Spoken 836, the caller is presented ("Go to C" 840) with Coupon Quantity Entry 843. Coupon Quantity Entry 843 plays to the caller: "Audio Coupons are sold in quantities of 100, 500, 1000, 5000, and 10,000. The price for 100 is $1 each, 500 is 90 cents, 1000 is 80 cents, 5000 is 75 cents, and 10,000 is 70 cents per coupon. Please tell me the quantity that you would like to purchase." Next, the caller is requested to verify the quantity of coupons spoken in Coupon Quantity Verification 844 and hears "You have asked to purchase <quantity> Audio Coupons at <price> each for a total of <total price>. Is this correct?" Next, the caller is requested to record a coupon message in Coupon Message Recording 845 and hears "Please record your Coupon Message." whereupon the system performs the standard message recording function 846.

Next, the caller is prompted for Credit Card Selection 847 and hears the message "What kind of credit card will you be using for this purchase—VISA or Master Card?", and after their response are requested to enter and verify a credit card number 848 and expiration date as follows: Credit Card Entry #1—"Please tell me your credit card number." (Accept entry), Credit Card Entry #2—"Please tell me the expiration date." (Accept entry), Credit Card Verification—"You have entered credit card number <number> with expiration date of <date>. Is this correct?" After credit card information validation 848, the caller either hears message 849 "Thank you. Callers who request to hear coupons or information about your business will now hear your Coupon Message." or message 850 "Thank you. Callers will receive information about your business in a preferred position." The caller is then directed (Go to Members Menu 851) to the Members Menu 833 for additional options.

When the caller selected Rate Spoken 812 in the Business Menu 808, the caller is presented with the Rater Number Entry 852 and hears "Please tell me your Rater number. (Accept Entry) If you are not a BayHits rater yet, register at the BayHits.com web site and start saving." Next, the caller is presented with Rating Entry 853 and hears "Please rate this business on a scale of one to five, with five being excellent." (Accept Entry), and is requested to confirm the rating in Rating Confirmation 854 and hears "Thank you. Your score of <number> has been recorded for <business name>. You may rate each business once a month." The caller is then returned to the Main Menu.

Note that: (1) in one embodiment of the invention (demonstration software), no verification will be performed to insure that the Rater has only rated a particular business once a month; and (2) Rater Number will be a 5-digit numeric number.

Figure 8A:
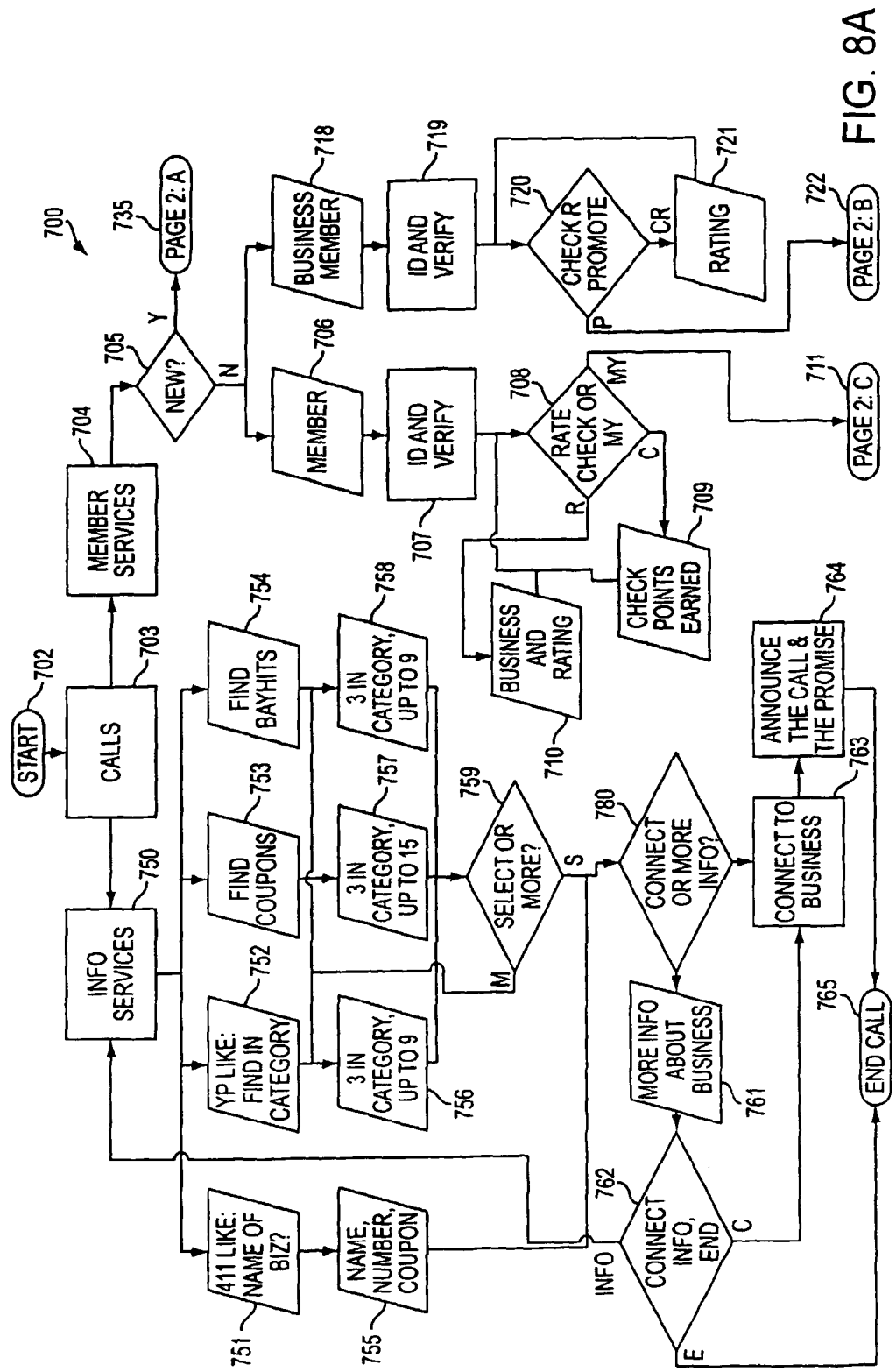
FIG. 8 is a diagrammatic illustration showing an embodiment of an alternative call handing procedure by the inventive system and service call center.
Figure 8B:
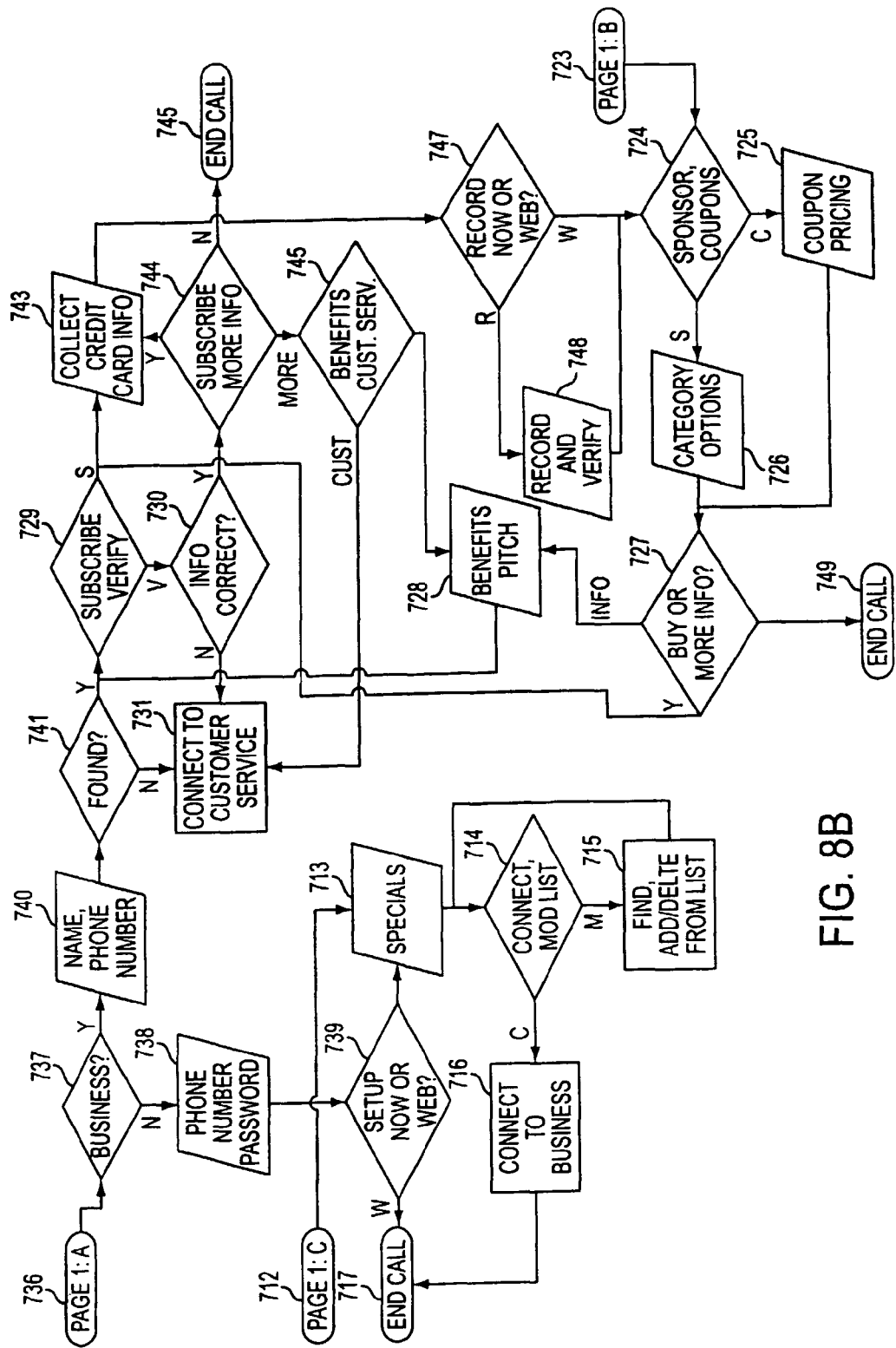

With reference to FIG. 8 (FIG. 8A-8B), an exemplary embodiment of a second different call handling procedure 700 is provided and now described. This is another example of a call handling procedure which, like the others provided here, may form the basis for a VOS, voiceXML, or C++ based script implementation. It starts 702 with receipt of a telephone call 703. The call may be directed in one of two ways, to member services 704 or to information services 750. For the member services path 704, a determination is made as to whether it is an existing member or a new member 705. If it is not new, then the member may be either a member 706 or a business member 718. If the member is a business member 718, then the member's ID is obtained and verified 719. Next a check is made as whether they wish to check a rating or request information on, make or modify a promotion 720. If they choose to check their rating, they are given the requested rating information 721 and then asked if they wish to check their rating or promotion again 720. This allows them to sequentially address both rating and promotional issues without requiring a call back. The member is then permitted to select between sponsor and coupon paths 724. Should the business member choose coupons, they are provided with information concerning coupon options and/or coupon pricing 725 and then given an opportunity to buy coupons or obtain additional information 727. If they instead select sponsor, they are provided with information concerning sponsorship category options 726 and then permitted to buy a sponsorship or obtain additional information 727. Should the business member then chose to receive neither coupon nor sponsor information, the call terminates or ends 749.

If the caller chooses to receive additional information, they receive a benefits pitch 728 and are then given an opportunity to subscribe or verify 729, and if the caller business member chooses subscribe, a request is made for credit card information (or other account, billing, or payment information) 743. Credit card (or other account, billing, or payment information) is also collected if the earlier caller decision was to buy coupons or a category sponsorship 727. If the caller chooses to verify 729 and the information provided cannot be verified 730, then the caller is connected to customer service 731. Customer service may be an automated system, a live operator, or a combination of the two. If the verification can be made 730, then the caller is asked to select 744 if they wish to subscribe in which case the credit card information is obtained 743, end the call 745, or obtain more information (including at this point information that may only be available from a customer service representative 731, but also from a benefits presentation or pitch 728. After credit card information has been obtained (and desirably verified) 743, the caller is asked whether they wish to record the promotional message or coupon over the phone at that time or using one of the available internet web based recording interfaces 747. Recall that the web based interfaces permit voice recording, typing the promotional item for automated text to speech conversion, utilizing a voice talent, using a synthesized celebrity or historical characters voice, or other option. If the caller chooses to record now, the caller is given an opportunity to record and verify the recording including opportunity to re-record until satisfied 748. After selecting the recording option, the caller is again asked to choose other options relating to sponsorship and coupons 724 as already described. It is noted that other options and call flow may be added or modifications made and that the particular choices available at any point may readily be altered.

It is further noted with reference to the flow chart in FIG. 8, that after the caller selected member services 704 and identified themself as a new member 705, somewhat different information is required before being asked if they wish to subscribe or verify 729 or be connected to customer service 731, where the afore described procedures are repeated for the new business. In particular, the system asks if they are a business 737, and if they identify themself as a business provide their business name and telephone number 740. If the matching business is found, they are asked to subscribe or verify 729 and which point they make a selection and proceed as already described for existing members.

In on the other hand they are not a business 737, they are requested to provide their telephone number and password 738, and to chose between setup over the telephone and web based set up 739. If they choose web-based set up, set up will occur over the web at a later time, and the call ends. If they do not select web set up, the caller is given an opportunity to learn about specials and avail themself of specials as desired 713. The caller may then choose 714 to connect to a business or modify from a list 715. This opportunity is repeated so that the caller may select different available options. Once the caller chooses to connect to a business, the caller is connected 716, and the call to the service ends 717.

Referring back to the point in the procedure when the caller selected member services 704, and indicated that they were not a business member 718, but rather an other member 706, the members identity is obtained and verified 707. That caller member is then asked to choose between ratings, points check, or My 708. If the caller chooses My, the caller presented with specials 713 as previously described. If the caller selects ratings check the caller is advised of the business and rating 710, and if the caller selects check points, is advised of the current points earned 709. The rate/check/my loop iterates so that the caller can cycle through and obtain more than one type of information while connected.

Again referring to FIG. 8, the incoming call 703 may be a request to obtain information services from a non-member (or even from a member) caller 750. Usually the request will be for one of four possible information types, though other types may clearly be added, and some existing ones deleted. A request may be for a yellow pages (YP) type request where the caller desires to find matches in a category 752. When such request is made, a predetermined number of matches are provided, in this case three are provided at a time, with a total of up to nine if additional matches are requested 756. These numbers may readily be modified according to response and need. A different request may be to find coupons 753. Again three are initially provided in the requested category, with up to fifteen being provided as requested 757. The request may also be a request to find BayHits 754, and in similar manner three matches are initially provided with up to nine total matches as requested 758. After any of these three options are exercised 752, 753, 754, the caller is given the opportunity to select one of the matches or request more 759.

The caller may alternatively make more specific 411-type (but with added features) directory assistance type request for the name of a business 751, optionally specifying the name and coupon number 755. In this situation as well as when one of the other options were selected 759, the caller is given an opportunity 760 to connect to the business 763 or to obtain more information about the business 761 before connecting. If the caller chooses to connect 763, the call is announced along with any promotion or coupon promise 764, at which time the call to the service ends 765. If the caller requested more information 761, such information is provided, and the caller is asked to choose between connecting to the business 763, ending the call 765, or returning to information services 750.

Internet Web-Based System and Method

The inventive system and method are also implemented from an Internet or other networked computing environment using conventional keyboard, mouse, and display interfaces or with the addition of voice input and speech-recognition capability. Therefore it should be understood that the system and method described relative to the voice recognition embodiment may be implemented from a personal computer or other information appliance that supports voice input, such as using a microphone and modem connection to connect over an analog or digital telephone or other radio-frequency, optical, cable, or wireless communication link. Alternatively, though with some sacrifice in ease of use, the voice recognition component may be substituted by a typed or character string based interface. In this light, rather than repeating the various embodiments of the invention for an Internet Web based implementation, this section shows various web screen shots and the manner in which web pages are organized and navigated to provide an easy efficient and enjoyable experience. It is further noted that certain options are provided in the voice-recognition implementation to conduct some of the more detailed and time consuming steps at a later time using the talk411 inventive system.

The Talk411 Internet application is developed using Microsoft's IIS (Web Server) and Active Server Page (ASP) technology. The Active Server Pages access the same database as the Voice system and deliver similar information. The Internet web-based Talk411 application includes both HTML and ASP files, both of which file types are well known in the art. Basically ASP files are HTMP files that include some active content. Exemplary html and asp code is provided for the getbusiness.asp file, a portion of which pertaining to "Dim Business" is duplicated in Table X. Angle brackets identify key words, and anything that starts with a bracket and a % sign is active server page code. The indicator "html" is a label for the html page. The portion of the code identified by "DIM BUSINESS".

For the Internet or world wide web based application All active server page files (.asp file) are html pages with a little code that can create some html on the fly. In this case, since we are reading from a database and want to display the name, pre-written html does not have database interaction, nor does it know what database item it will need to provide or display. Therefore, there is a need to use active server pages (.asp) where you can put in a little code that instruct to go to data base to get name and display the information that was retrieved. An example of a portion of active server page code is provided in Table XI.

TABLE X

ASP and HTML Files for Exemplary Internet Web Site

| | |
|---|---|
| Default.htm | Main menu page (601) |
| Business.asp | Gives user a list of valid businesses to select from (602) |
| Types.asp | Gives user a list of valid business types to select from (603) |
| BayHits.asp | Displays business that meet the BayHits criteria (604) |
| Coupons.asp | Gives user a list of businesses with coupons to select from (605) |
| Members.asp | Member login form (606) |
| GetBusiness.asp | Displays information for a given business (607) |
| GetTypes.asp | Gives user a list of valid business for a specified type (608) |
| MemberMenu.asp | Validates member ID and password, displays menu (609) |
| UpdateBusiness.asp | Validates business information from MemberMenu.asp for update (610) |
| RateBusiness.asp | Validates business rating and updates database (611) |
| Rate.asp | Allows user to select a rating for a business (612) |
| InvalidRater.htm | Displays if rater number is incorrect (613) |
| InvalidMember.htm | Displays if member login is incorrect (614) |
| Partners.htm | Displays Talk411 partner list (615) |

TABLE XI

Exemplary portion of active server page and html page code for talk411 Internet application.

```
...
<%
    Dim Business
    Business = Request("Business")
%>
<form name=TypeForm method=post action="GetTypes.asp">
<% Set conn = CreateObject("ADODB.Connection") %>
<% conn.Open "Driver=Microsoft Access Driver
(* .mdb) ;DBQ=c:\inetpub\clients\talk411\directory2.Mdb" %>
<% Set rs = conn.Execute("SELECT * FROM [Customers] WHERE
[CompanyName] = '" & Business & "'") %>
<h1><%= rs("CompanyName") %></H1>
<h2>Phone: (<%= Mid(rs("PhoneNumber"),1,3) %>) <%=
Mid(rs("PhoneNumber"),4,3) %>-<%= Mid(rs("PhoneNumber"),7,4)
%><BR><BR>
<%= rs("Address") %><BR>
<%= rs("City") %></H2>
<h3>Specialty: <%= rs("Specialty") %></H3>
...
```

Those workers in the art will appreciate the flexibility available in web page design and construction using html alone or in conjunction with asp, therefore only a few examples of the above listed web pages are illustrated to provide examples of a relatively simple graphical user interface. The use of various buttons, hot spots, pull-down menus, imbedded GIF files and the like are well known in the art and not described in any detail here.

Figure 9:
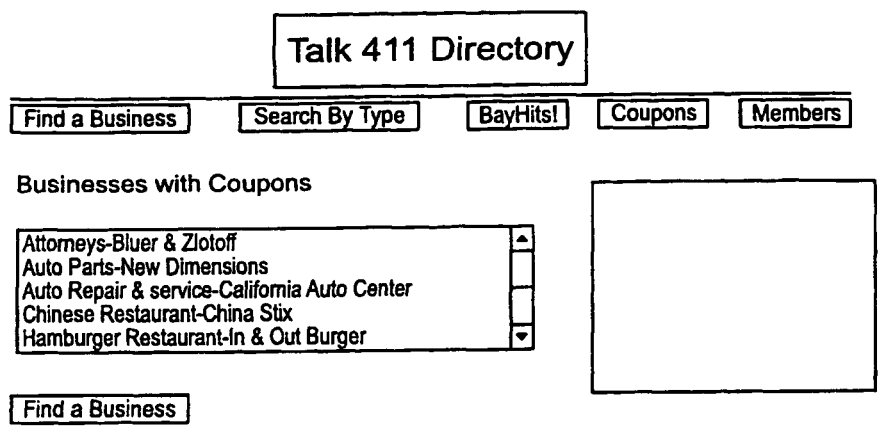
FIG. 9 is a diagrammatic illustration showing an exemplary coupons web page.

FIG. 9 is an example of the Coupons.asp and gives user a list of businesses with coupons to select from (605). This particular embodiment of the coupons web page interface provides Find A Business, Search By Type, BayHits!, Coupons, and Members button or menu bar. The coupons web page also provides a scrollable list for Businesses with Coupons.

Figure 10:
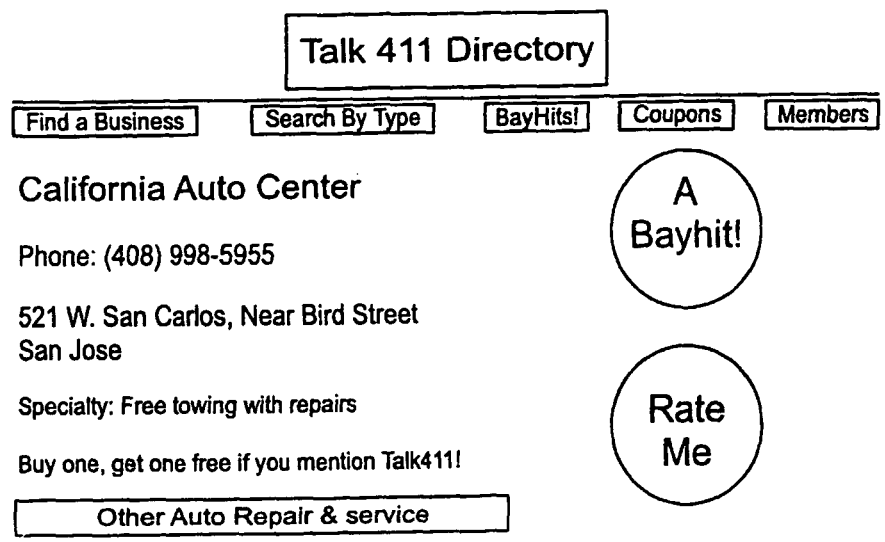
FIG. 10 is a diagrammatic illustration showing an exemplary get business web page.

FIG. 10 is an example of a GetBusiness.asp page (607) and provides information for a particular business identified by the user. The web page presents similar buttons to those on the Coupon web page so that the user can readily navigate between the pages using a common interface. The get a business page also provides a menu button for selecting another business in the same category. In this case, other auto repair and service. BayHits and a rate me menu button are also provided.

Figure 11:
FIG. 11 is a diagrammatic illustration showing an exemplary member menu web page.

FIG. 11 provides an example of a member menu web page generated by a MemberMenu.asp file that validates member ID and password, displays menu (609). It provides a box for entry of a member ID number and another box for entry of the member Password. The user enters this information and clicks a submit button to submit the information and begin processing. Security measures as are known in the art may optionally be implemented.

Figure 12:
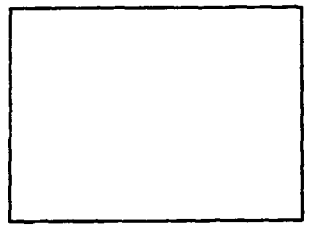
FIG. 12 is a diagrammatic illustration showing an exemplary member registration web page.

FIG. 12 provides an example of a member menu for purchasing and editing a coupon message is provided. Other embodiments of the web page for coupon generation provide templates for entering and arranging the information so that the member may try different alternatives for web based coupons that may be printed. It may also provide an interface for picking voices, sampling voice talent, selecting celebrity voices, and selecting simulated voices for text-to-speech conversion. These may be tested at the web site and made available for the telephone handset based implementation.

Figure 13:
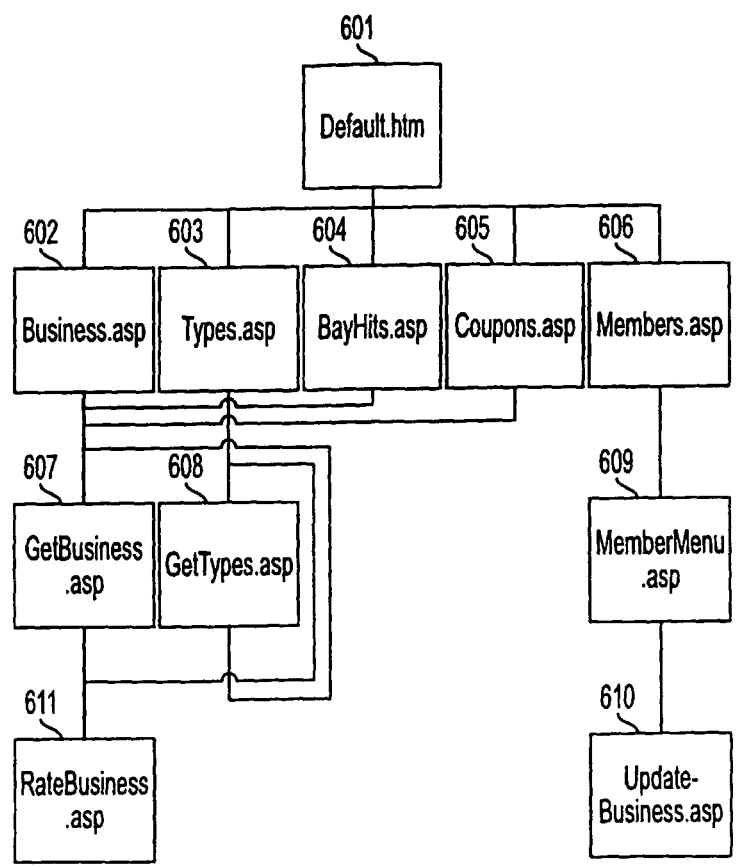
FIG. 13 is a diagrammatic illustration showing the relationships of several web pages to each other.

FIG. 13 is a diagrammatic illustration showing the relationships between the various web pages and web page asp files described in Table XI. Various other paths between web pages are possible and may be used. Alternative web pages may be designed, and features from multiple web pages may be combined into a single or into fewer web pages.

Exemplary Additional Embodiments And Optional Features and Enhancements

Tracking
Tracking a Promotion

In one embodiment, promotions are tracked using promotion codes or other tracking codes or indicia. In this embodiment, a user of the Talk411 service provides the merchant with a promotion code, word, or any other promotion identifying indicia that the merchant will recognize. The use of promotion codes is optional but advantageous as it permits a merchant or other interested party to track and assess the usefulness of the service to the merchant. Such information may also or alternatively be gathered to provide on or more system or service wide measure of the usefulness or benefit of a promotion or set of promotions to the merchant.

Tracking promotions using promotion codes is an optional feature and may not be utilized in all embodiments of the invention, or such codes may be used for some merchants or for some promotions but not for others. Tracking promotions through promotion codes will not for example be implemented in instances where the logistical burden in doing so would require the merchant to do more than is desirable. Instead in such embodiments or for such merchants or promotions an alternative tracking of promotions may be performed such as by tracking usage of the Talk411 service so that merchants know if the service works for them. The promotions themselves, however, do have a bearing on the effectiveness of the service since they are at least a part of the fuel that channel customers to the merchant.

Tracking the Effectiveness of Talk411 Service—Customer Loyalty Program

In one embodiment of the inventive system method, and service aspects of the effectiveness of the Talk411 service may be measured in terms of store (or merchant) visits from registered Talk411 customers or users using a customer loyalty program. The customer loyalty program is designed so that customers and merchants have an incentive to participate in tracking customer visits to the merchants. Merchants are motivated because they have a ready, easy-to-use loyalty program that can bring back repeat customers. Customers are motivated because they can get free rewards or other loyalty and repeat customer visit based rewards including but not limited to discounted goods and/or services, free goods and/or services, advance notice of sales or special offers, or any other good, service, or information item.

In the proposed implementation, the customer is awarded some number of points as determined by the individual businesses or merchants for each store or merchant visit and purchase. In one embodiment no actual purchase is required and it is sufficient that a visit be made to the merchant. The customer gets merchant points and Talk411 points. In one embodiment of the invention, the customer receives a number of points from the merchant and an equivalent amount of Talk411 points. For example, if a merchant offers 50 points for a store visit, the customer will get 50 merchant points and 50 Talk411 points. Other embodiments of the invention may provide for different and unequal number of points and in any event the number of points offered from time to time may vary. They can accumulate points and trade it in for rewards. There may be one or more rewards catalogs (paper, electronic, audio, or any other form of catalog or list) from which the customer may select rewards. Talk411 offers one reward catalog. Merchants participating in the loyalty program may offer other reward catalogs or other means for identifying available rewards no matter what form.

The points earned in a merchant's store can be applied towards rewards from that merchant's catalog. The Talk411 points can be applied towards the rewards in the Talk411 catalog. For example, the customer can accumulate and redeem 500 points for a reward from the merchant's catalog. The Talk411 points can be redeemed for rewards from the Talk411 catalog. The number of points that are needed for redeeming the rewards from the merchant's catalog may be different from the number of points needed to redeem one from the Talk411 catalog.

It will be appreciated that in general, the manner of accumulating reward points, how they are distributed between one or more account types, and how they may be redeemed may be implemented in a variety of ways, and may in some instances be customized to different markets. These market differences may be geographically based, market segment based, may be based on the type of good or services, may be based on the dollar value of the goods and services, and/or may be based on merchant and/or customer preferences, or any other criteria.

One advantageous way for tracking usage of the Talk411 service is to have a Talk411 Loyalty Card having a machine readable code (such as a magnetically encoded or bar coded customer information) that is swiped through a card reader and the amount in dollars is entered. The merchant code can be read from or input to the card reader and the number of points assigned would be proportional to the dollars spent at the merchant or calculated according to some other dollar value to points conversion. In one embodiment the points value increases non-linearly with the value of the transaction so that a customer may be encouraged to spend more to receive a disproportionate number of points. In another embodiment, some time period or calendar based incentives may be implemented. For example, a customer may receive more points or bonus points for making a purchase at least once a month or according to some other time or calendar based criteria.

Loyalty Program Setup

In one embodiment of the invention all merchants are entitled to participate in the loyalty program by default. In other embodiments only merchants meeting certain criteria are permitted to participate in the loyalty program by default or upon meeting certain predetermined or dynamically determined criteria. In other embodiments, Merchants are not enabled to participate in the loyalty program, by default. In such embodiments or in other embodiments where some particular criteria need be satisfied before participation, participation may be enabled by the Talk411 administrator or by other human or automated or computer assisted registration or enrollment.

Merchants can provide any type or number of rewards for the rewards catalog. In addition, they should advantageously specify the number of points the customer redeems for these rewards. Rewards should advantageously have a description and where beneficial an optional picture of the reward.

Once this is done, the merchants can send a message to the provider of the Talk411 service (such as Dialsurf or other authorized provider) to print the stickers, stamps, indicia, or other tools for operating the loyalty program for their use. Merchants who choose not to participate in or the setup the loyalty program may optionally also be issued stickers for tracking their customers. These customers can still accumulate points towards Talk411 rewards even though no merchant awards for particular merchants may be available.

The Talk411 service provider issues stickers, stamps, or other indicia or tools to the merchant. On the sticker are the merchant code and a random, unique id code. The unique id code is to make it more difficult for customers to guess at these codes and enter them without getting a sticker. Stickers may optionally but desirably have a part that can be retained by the merchant so that they can do their own tracking if they so choose.

Acquire Points

Talk411 cards are advantageously placed at all the merchants locations. Customers use these cards to collect stickers that have been issued to the merchant. They are given a sticker, stamp, or other identifying appliqué, device or the like for every visit to the merchant. The customer can either call the Talk411 telephone number (for example, 1-866-Talk411) or visit the Talk411 website (for example www.talk411.com) to enter the code on it. They can also collect several of these stickers and enter them at the same time into Talk411. We can give the customer extra Talk411 points if they use the phone to record their identity and the merchant code on their stickers. This is intended to encourage them to use the phone service and get familiar with the phone aspects of the Talk411 service. The system validates the code against those codes issued to the merchant. Each code can be entered only once. This means that other customers cannot reuse the code. In an alternative embodiment, the codes may be generated by the merchant using some code generator, and the valid codes are uploaded to the Talk411 service provider so that they can later be validated against those entered by the customer. This reduces the need for communicating the codes between the Talk411 provider and the merchant. In another alternative embodiment, codes are generated by Talk411 and then sent to the merchant electronically for printing on secure paper stock as stickers. In this embodiment, the codes are generated by Talk411 provider and sent via (desirably secure) communication to the merchant for printing.

The customer account is then credited with the respective points and the merchant points are also accounted for. The customer can view the total points he/she has got against each of the merchants and see how close he/she is to getting rewards from the merchants' catalogs as well as the Talk411 rewards catalog.

In one embodiment, the code is made up of an issue code, a merchant code, and an id number. Issue codes are advantageously unique for a merchant although an issue code may comprise a merchant unique portion and another portion that is or may not be unique. A new issue code is advantageously generated every time the merchant is issued a new set of stickers. For example, the Merchants may be issued with a sequential range of codes. This is done so that a database set up to track such codes can store a ranges of numbers in the database instead of having to store individual numbers or codes and thereby conserving storage space in the database.

It is possible that customers might attempt to guess at the code to enter into the system. For example, a customer might go once to the restaurant. He would get a sticker with the issue code, merchant code 42, and an id code of 85790. He could then enter other codes by simply trying other codes such as 85791, 85792, or the like according to a perception of the next or other codes in the sequence. However, since these are registered customers, we can easily detect attempts at fraud especially when other customers enter these same numbers. In other cases where a bunch of codes are close in value for the same merchant and entered by one customer, this can be detected, scrutinized, and challenged. In another embodiment, this potential problem is somewhat reduced by applying a mathematical formula or computer algorithm or procedure to a range of codes to generate non-sequential codes. As the formula or algorithm are known to the Talk411 service provider, it is still sufficient to store only the range of code values or numbers.

It is desirable (though not required) to keep the codes as short as possible since customers will have to dial these numbers in over the phone. In one embodiment, each code can include three parts, a merchant code, a issue code that is unique for the merchant, and a customer code that grows serially. The issue code changes every time a new issue of stickers is made for a particular merchant and grows serially. The customer code is unique for a particular merchant code and issue code but may be reused for other issue codes. They issue codes are unique for a merchant code but not across merchant codes. Other codes having a selected subset of these three parts or having more parts may be used.

We keep track of the customers entering these codes. The codes are checked against the codes issued to merchants. Customers entering codes are initially given points as long as they match against the codes issued. If a customer fraudulently enters valid codes (for example, he/she enters apparently valid codes but does not have the sticker or other physical evidence of its validity for it), the program can give him/her the points. However, at some point a customer who does have the sticker comes in and enters the code. The inventive system and method can flag this, send some email to Talk411 customer support or take other action and let the customer know that we will look into it. We could have the customer mail the stickers to us or provide other validating information. Meanwhile, Talk411 customer support can investigate the customer who previously entered the code for possible fraud. In some instances, apparent minor infractions such as a possible issue resulting from a code entry error may be ignored unless the number of points is large (above some predetermined threshold) or the customer shows many such problems or a pattern of such entries.

Redeeming the Reward

If the customer has the right amount of points for getting the award, the system allows the customer to print out a coupon or other certificate or document for the reward. An all electronic certificate or document may alternatively be generated that may be presented to a merchant in an appropriate form. The coupon advantageously has the date on which it was printed (or generated), the name of the customer, name of the merchant, and the details of the reward. The coupon is valid for 30 days (or some other predetermined period of time) from the date of print. The merchant is also faxed, emailed, or otherwise communicated a copy of the reward coupon so that they can validate the reward coupon. Coupons may alternatively be generated that do not have expiration but this is not preferred. The merchant can also see the reward coupons from their web site.

For Talk411 rewards, customers can print out a coupon or conduct the transaction electronically. Depending on the reward they might have to mail it in to a redemption location and address.

Creating Talk411 Rewards

Talk411 rewards are created through the administrator interface. The administrator should be able to create rewards with a description of the reward item or service, an optional picture of the reward item or service, and the number of points required to redeem it.

Track Customers and Reports

Various aspects of customer activities may be tracked and reports pertaining to such customer activity generated. These reports may be each customer individually, or for any selected set of customers or customer characteristic or demographic. Examples of some of the types of reports are listed below by way of example and not limitation. 1. Customer registration report—May be generated yearly, monthly, weekly, daily, or according to any other criteria.

This may include the details of the email and phone verifications and any other information or data that it is desired to report. Customer Referral report—May be generated yearly, monthly, weekly, or according to any other criteria.

Figure 14:
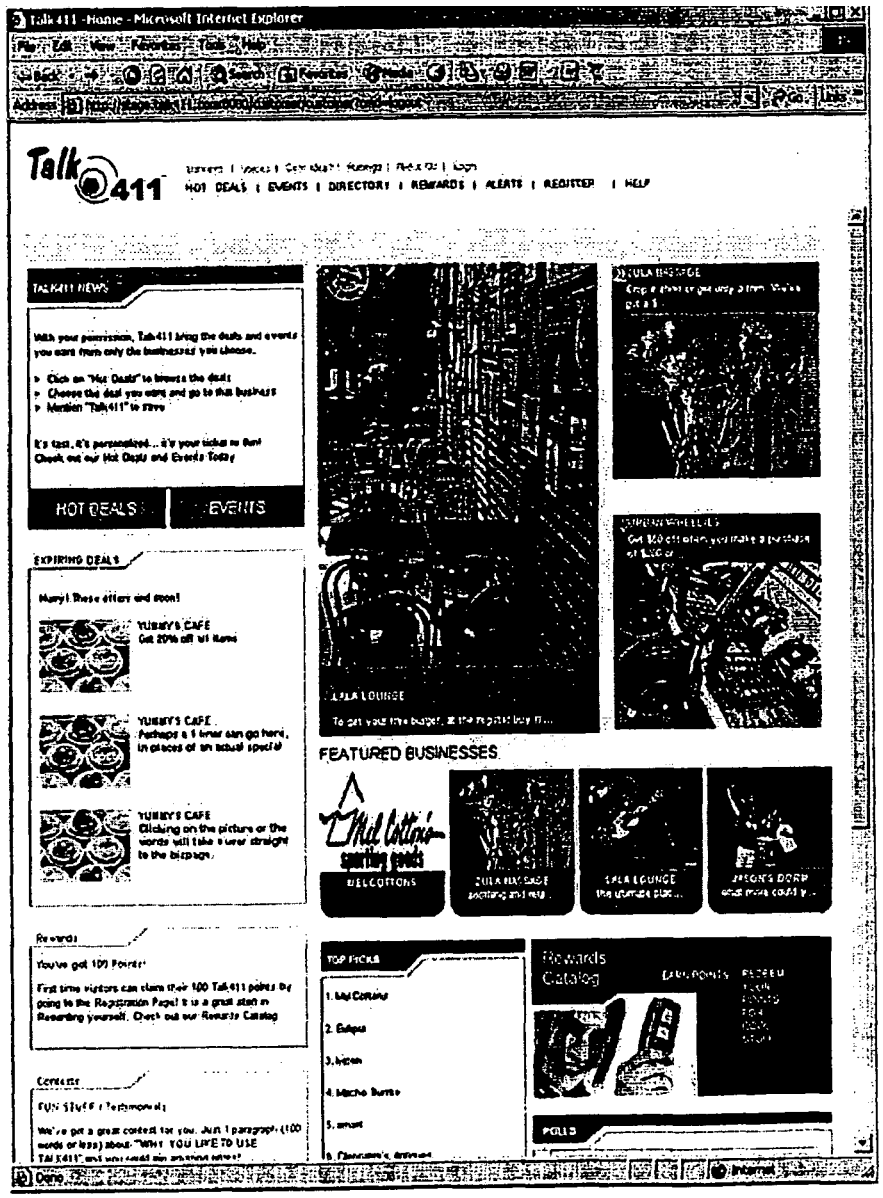
FIG. 14 is a diagrammatic illustration showing an exemplary Internet web page according to invention for a Home page.

Talk411 Customer Usage report—May be generated yearly, monthly, weekly, or according to any other criteria. Such reports may include, one, any subset, or all of the following usage events:

Track customer hits on Talk411 home page (See FIG. 14

Track time allocable to merchants from consumers listening to their deals and requesting alerts on the phone.

Track number of customers listening to merchant deals on the phone.

Track number of customers looking at merchant deals on the web.

Track activity of calls to Talk411—logging in, verification, browse deals, request alerts etc.

Track number of hits on merchant pages

Alerts Usage Report—May be generated yearly, monthly, weekly, or according to any other criteria.

Track alert activity on merchant basis—alerts requested, alerts sent, email versus phone alerts, forwarded alerts Customer points report—May be generated yearly, monthly, weekly, or according to any other criteria. Points that customers have accumulated and redeemed on a merchant-by-merchant basis. Another report where the customers with the top 100 points balances (or any other predetermined or dynamically determined balance) are shown.

In one embodiment, the following details may be tracked. Other embodiments provide for tracking of any selected subset of these details, and yet other embodiments provide for tracking of any selected subset as well as additional details.

- Number of customers accessing the website on a day (or other predetermined period).
- Number of customers logging in.
- Number of customers versus time spent at the websites. This can be calculated based on the customer session timeout. When customer logs out one can compute this accurately. If the session times out, one can reduce the total time of the session by the session timeout period (for example in one embodiment this is currently configured as 60 minutes) to calculate the time spent at the site by the customer.
- Frequency of use: Number of customers versus the number of times in a month (or other period of time) they visit the website.
- Number of customers who looked at a particular merchant deal or promotion. The hit is counted every time the customer looks at a deal even though it may be in the same session. Coming back to the same deal several times is a session might indicate that the customers are not able to make up their mind.
- Number of customers versus the category they looked at in a month.

Track customers calling the Talk411 toll-free number (1-866-TALK411)

- Number of calls on a daily basis (or other basis).
- Number of customers logging in.
- Number of customers versus duration of the call.
- Frequency of use: Number of customers versus the number of times in a month (or other time period) they call.
- Number of customers who listened to a particular merchant deal or promotion.
- Number of customers versus the category they looked at in a month (or other time period).
- Number of customers connecting to the merchant.

Business Yellow Pages

Businesses can be found by specifying the business name, if customers know the business name. Alternatively one can select a city first, which then shows a list of regions for the city. Upon selecting a region, the categories that have merchants are shown to the customer. Upon selecting a category all the merchants in that category are shown.

Figure 15:
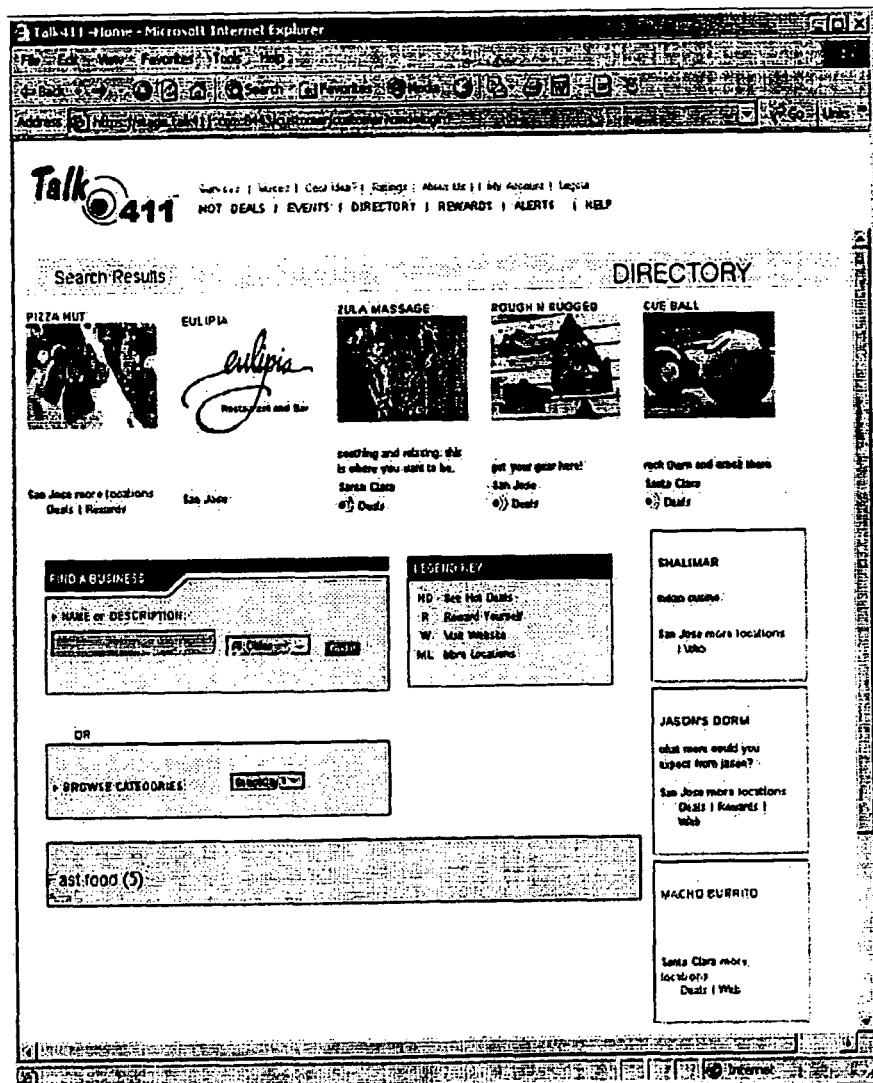
FIG. 15 is a diagrammatic illustration showing an exemplary Internet web page according to invention for a Directory page.

Merchants are classified in line with the directory structure (See FIG. 15) for yellow pages. This will be different from the category classification for deals.

Merchant Rating

Figure 19:
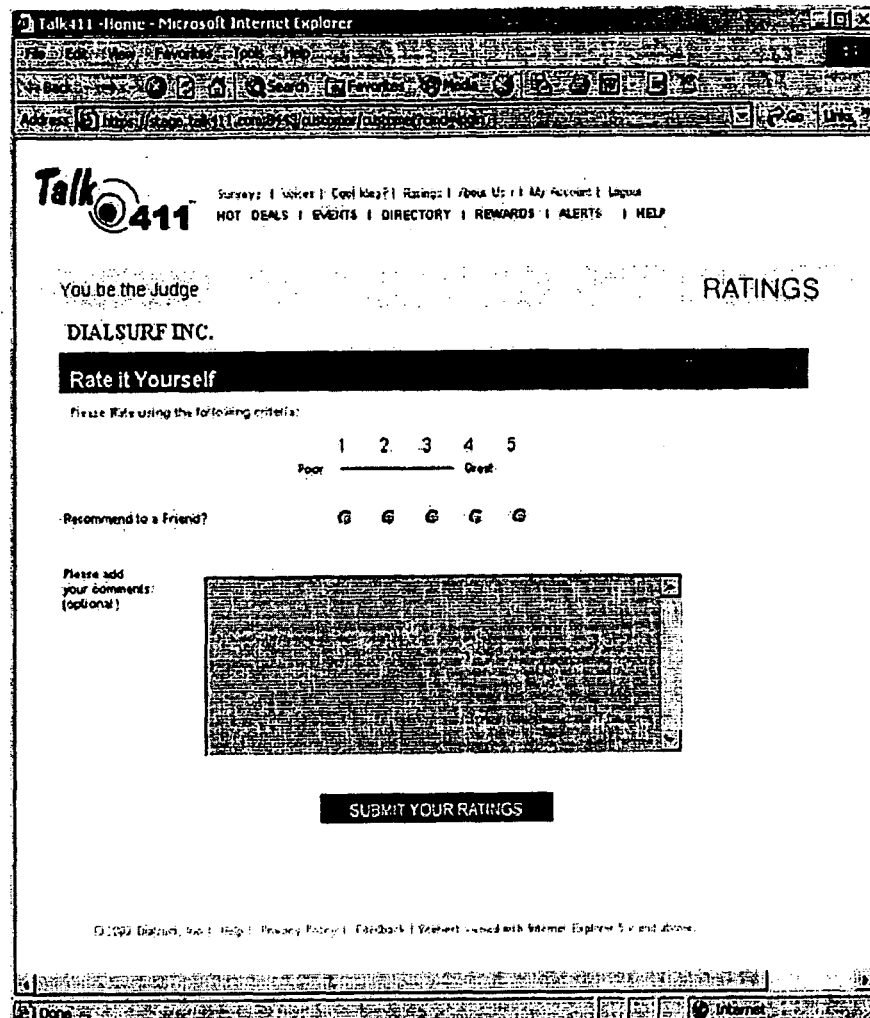
FIG. 19 is a diagrammatic illustration showing an exemplary Internet web page according to invention for a Ratings page.

All merchants are rated on a rating scale, such as a 1-10 or 1-5 scale, or any other numerical or non-numerical ratings scale. There are some common questions that are asked of all merchants. An exemplary ratings page is illustrated in FIG. 19. There are also questions specific to the yellow pages directory that the merchant belongs to. The system combines these questions and presents it to the customer for rating the merchant. For the 1-5 ratings scale, each answer is on 1-5 scale. The answers are averaged out across all questions to get an overall rating for the merchant. The top 10 merchants (or other selected number) are shown on the customer home page. When rating the merchant, the customer can enter comments. The merchant may view these comments. Merchants can define how often the same customer can rate the merchant.

Merchant Surveys

Merchants can create surveys that may be presented to the customers. Surveys that are shown on the home page are selected by the administrator or other authorized party. The customer can browse and answer surveys for any or all merchants. The merchant should optionally but advantageously award merchant points for taking the survey. For surveys that have to be answered on the phone, there is desirably an audio recording of the questions and answers. Alternatively, computer generated speech may be used to enunciate the questions and answers. Merchants should advantageously be able to see the results of their surveys.

Premium Discounts Program

This premium discounts program enables registered customers to get premium discounts from selected merchants. A merchant prepares special, deep discounts for this program. These are contingent on the amount that the customer spends at the merchant store. For example, the merchant may offer different discounts on purchases of $20, $50 and $100. The $100 purchase may offer a discount of $40, as agreed between the merchant and Talk411. Talk411 will offer this voucher this to the customer for $70. In essence the customer gets a discount of $30 for a $100 dollar purchase. Talk411 gets $10 for the transaction.

Combining discounts from different merchants, Talk411 can create custom packages that provide added savings for the customer. Vouchers will however be issued for individual merchants separately. Customers can also create their own package by incorporating vouchers from several participating merchants. They can get volume discounts based on their purchase value. We have to make sure that we get enough of a discount from merchants to cover sales tax, credit charges and our commission and yet be able to provide the customer with an attractive discount. This discount is desirably better than the ones they see for free on the rest of the site.

These vouchers typically expire in a month but may be valid for other periods of time. In one embodiment, cancellations are not allowed. They are free to use the voucher anytime within the specified period. There might be restrictions on the use of these vouchers.

When the customer purchases (after adding them to a shopping cart) voucher (through their credit card or other payment scheme), it is created dynamically by the system. The vouchers are mailed to them through postal mail (or communicated by other means). The voucher will have the customer's first name and last name (or some other identification) along with the name of the merchant, the voucher value and the expiration date. Customer can buy this as a gift for a friend in which case they would enter the friend's name. The merchant will use this to check the customer's driver's license or other valid id against the name on the voucher. The merchant has an option whereby a fax with the details of the voucher is sent anytime a voucher is purchased. The voucher will have a serial number or code to uniquely identify it. Customers are informed that their voucher will be checked against a copy of the same that is sent to the merchant.

Customer can submit this voucher to the merchant before the expiration date and redeem it for goods and services. The merchant has to return the voucher to Talk411 to claim their share of the transaction i.e. $60 in our above example. The merchant and Talk411 may share the revenues from vouchers that are not used by the customer before the expiration date on the voucher.

Customer Site Design

Customer Home Site Design

A customer home site is provided and its design may advantageously be updated from time to time to provide for new features and capabilities and to maintain interest in a user (customer or merchant) visiting the site. The site advantageously includes text or other symbolic information and graphic or pictorial information. For example, pictures for selected deals and events are advantageously provided as are pictures for any featured businesses on the home page.

These can be uploaded from the administration page. The administration page sets up the merchants that are the featured businesses. Clicking on the featured business would take them to their business page.

The "Voices" menu item of the home page allows customers to browse what others have to say. This is a public forum. The customer may be able to mark customer inputs as offensive. They can then be reviewed by admin and deleted if found offensive. It should desirably be possible to quickly find specials for a merchant that we have in mind.

There may be none, one, or a plurality of surveys accessible from the web home page. These are selected by the administrator. They could be Talk411 surveys or merchant surveys. Talk411 surveys are the surveys created by Dialsurf as one of the registered merchants in Talk411.

The five merchants (or other selected number of merchants) with the highest customer rating in a certain category show up on the home page. The actual ratings are or may not revealed be to the customers. The merchants can see their own rating.

The featured deals and merchants cycle through different ones, every time the customer hits the home page.

Find Deals

Capability is provided to enable one to find deals for merchants in regions such as deals for merchants in downtown San Jose or any other city or region. By default, all the deals for all cities are shown in one embodiment. The user can narrow the list by selecting the city as well as the category. The user can browse the deals according to the yellow pages directory such as restaurants, cuisine etc. They can also search by the type of deal such as lunch deals, dinner deals etc.

Find Merchants

Capability is provided to permit one to find merchants based on regions such as merchants in downtown San Jose, Calif. (or other city or region).

Survey Pages

Customers have to register before they can take a survey.

Survey of the day—Customers can take a survey calling the Talk411 toll-free phone number or at the Talk411 web site, and immediately see what others say on the same survey. Customers have to log in to take the survey on the phone or on the Talk411 web site. Surveys are made up of up to three (or some other number of) questions. Answers are of multiple choices up to a maximum of five (or some other number of) choices. Advantageously, a customer can take the survey only once. These surveys are created from the merchant site. The Administrator picks the ones that show up on the home page. Surveys have a scheduled date as well as an expiration date. Surveys show up on the scheduled date and disappear from the customer site after the expiry date. There can be only one survey active at a time.

At the end of the survey, customers can be asked if they are willing to take another survey. This should happen only if there are surveys available for the customer to take. They can get additional points when they take the surveys.

A list of surveys in our survey library is prepared so that we can request customers to take the surveys and they are available for selection at that time.

Merchants can also create surveys that customers can choose to answer. The results of these surveys can be private to the merchant or public, as defined by the merchant. Customers can get points (as defined by the merchant) for doing these surveys. In one embodiment these surveys can only be done by customers who have gone to the merchant location and received a sticker (or another form of loyalty program identifier). Desirably, any arbitrary customer cannot do the survey.

Creating Merchant Rewards Catalog

The merchant can create rewards catalog for the loyalty program. They can create rewards with a description, an optional picture, and the number of points required to redeem it.

Business Card Links and Pages

The site advantageously has links to the merchant business card. The business card is a static html page (or other formatted or unformatted content) that provides information about the merchant. This may include store locations, hours of operation, pictures of the business, and the like. When html is used, being static html pages they can be customized for individual businesses.

Process when Customers Forget Passwords (Password Recovery)

Customers can enter their email address and have the account number and password sent to the owner of the email. If there is more than one customer with the same email address (such as different members of a family or employees of a business), they will all get the email. If they don't have an email address they will have to call Talk411 Customer Support to retrieve or recover a password.

Customer Registration with Referral Code

Customers have the option to register with a referral code. This is to track and account for specific organizations and promotions that have customers registering. First names and last names should be optional for registration. All required fields should be marked with a red asterisk and bold typeface or some other highlighting to make registration as simple as possible.

Referral codes are advantageously created solely through the administrative interface in this version. These may be self-standing codes or related to a merchant.

Got An Idea

Figure 22:
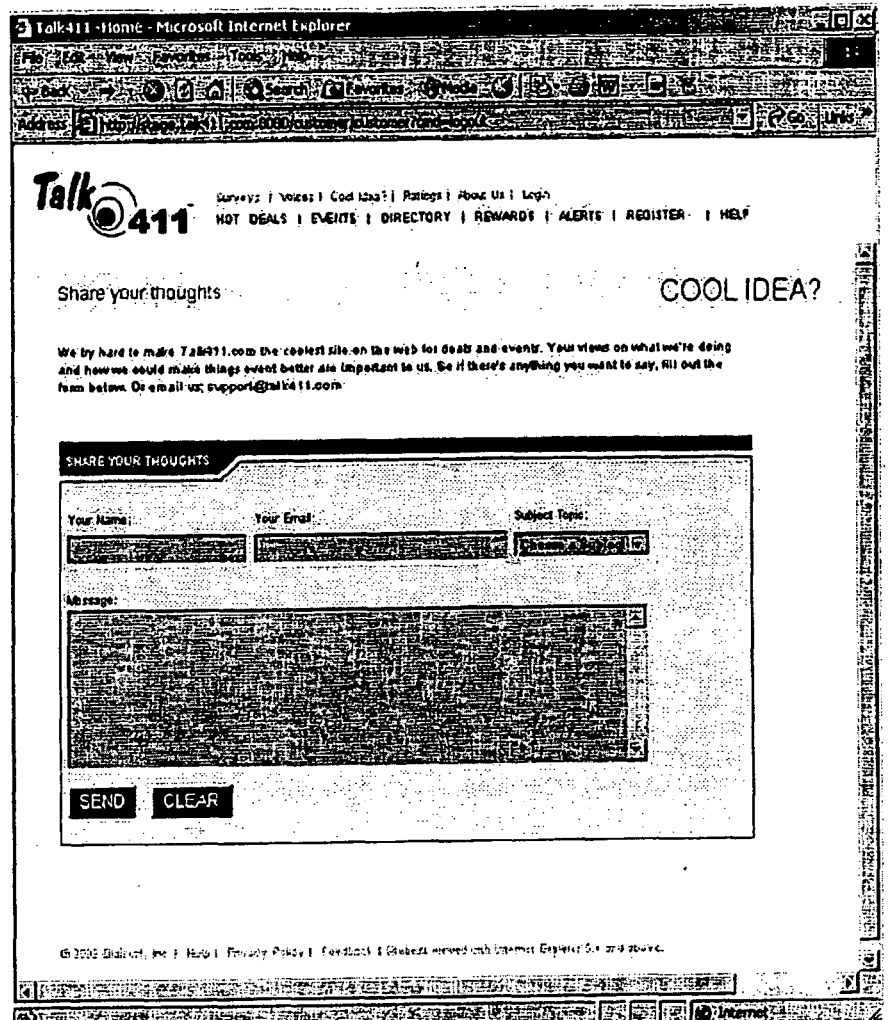
FIG. 22 is a diagrammatic illustration showing an exemplary Internet web page according to invention for a Cool Idea page.

When customers click on "Got an idea" (or "Cool Idea?"), a HTML form is shown (See FIG. 22). They should select from a classification of the feedback such as website problems, deal recommendations, merchant recommendations etc. They can then enter their feedback into a field and the whole content is emailed to a predetermined email address (for example to the Talk411 feedback email address feedback@talk411.com).

Support for Netscape or Other Browsers

In the event that a page on a website is best viewed using a particular browser (Internet Explorer (IE) or Netscape for example) or where the content or format may differ as between different browsers, some indication may be provided or check if a user is using a Netscape browser and show a page that the site is best viewed with IE. This page can have a continue button to continue if the user chooses to do so. There can a be link to get the latest release for IE.

Selective Merchant Site Design and Redesign

Link to Pages at Talk411 from Merchant Website

Capability is advantageously provided so as to provide pages that can be linked from the merchant web site. When visitors to the merchant web site click on the link provided by Talk411, they are taken to a page for that merchant only. This page will allow them to view current specials and request alerts (See FIG. 16) for categories and future specials from that merchant only. If they haven't registered with Talk411 they can do so from this page, otherwise they can login to request alerts. There will be no links from these pages to the main Talk411 site. This is to allay the concerns of to merchants that we are presenting other merchants' offerings to their customers.

Help and Help Files

Help files are provided to assist the user is understanding and accessing features and capabilities of the site and system and method.

Merchant Ratings and Feedback

Capabilities are provided so that customers are be able to provide free form feedback to the merchants on their experience at the store or restaurant. Merchants should be able to review this feedback. The ratings and feedback that the customers provide to the merchant can be made private to the merchant or public so that other Talk411 users can access.

Merchant Surveys

Figure 17:
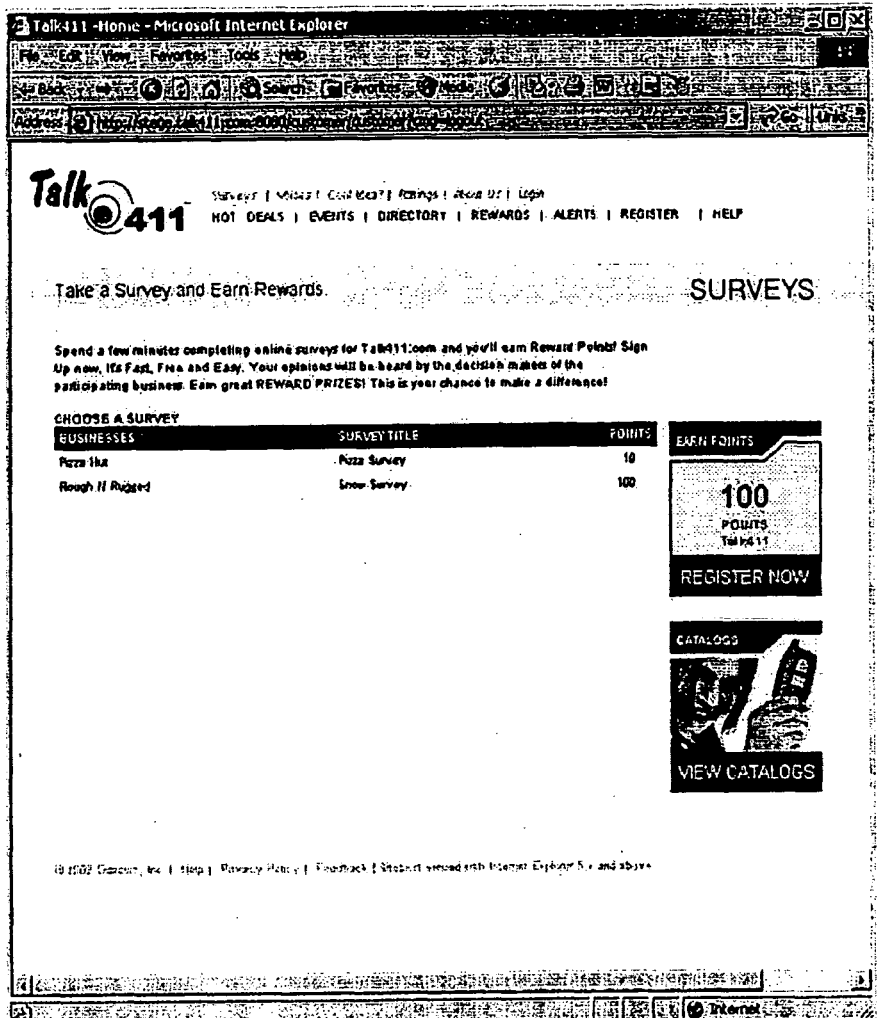
FIG. 17 is a diagrammatic illustration showing an exemplary Internet web page according to invention for a Surveys page.

Merchants can create surveys that may be presented to the customers. Surveys that are shown on the home page are selected by the administrator. The customer can browse and answer surveys (See FIG. 17) for all merchants. The merchant should award merchant points for taking the survey. For surveys that have to be answered on the phone, there is advantageously provided audio recordings of the questions and answers. Alternatively computer generated speech may be utilized.

The points awarded and the frequencies with which customers can take the surveys are set when these surveys are created.

Alerts

Figure 16:
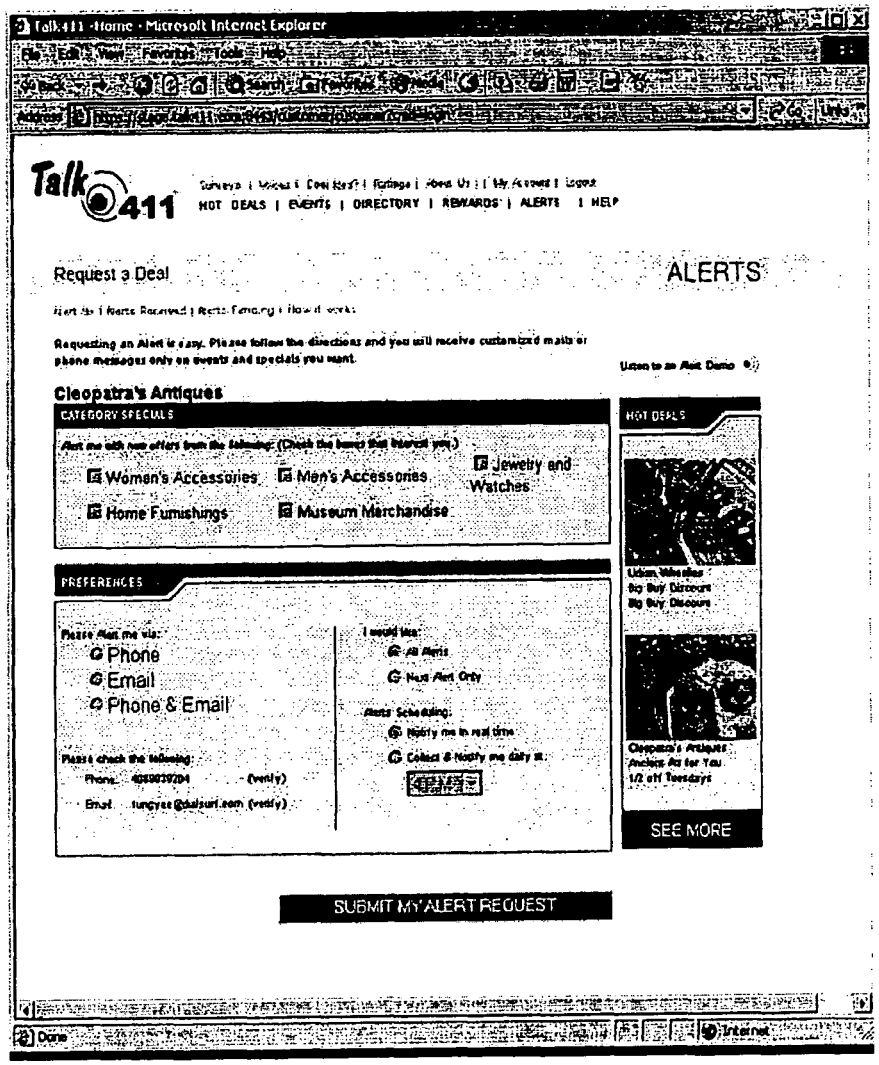
FIG. 16 is a diagrammatic illustration showing an exemplary Internet web page according to invention for an Alerts page.

Merchant should desirably be able to upload the main picture, the second picture and the thumbnail picture (where such pictures are utilized) for the alert in the preferences page (Se FIG. 16). There is a field for the message header and another one for the savings value. The message header has an audio component since this will be heard over the phone. The savings field is simply a text field.

In one embodiment, when a request for an alert is made, the customer is immediately called back with an alert if there is a deal currently available. This may be annoying since they can already see the deal at the website. The alerts should be sent for new deals.

There is a preference for a fax or other electronic communication such as email to be sent to the merchant when an alert is sent. This will enable merchants to keep the fax or email near their cashier so that their staff knows about the deal. The type of fax, email, or other communication is advantageously selected in conjunction with and to match merchant equipment and preferences.

Administrator Site

Registering Customers from Sign-Up Sheets

The administrator is able to register a customer from the administration site. The system sends an email to these customers.

The administrator can register a customer through a form similar to the one on the customer website. The system should first check to see that it is a unique account. It should also check to see if a person with the same name or email address has been entered before into the system. A special email is sent to these new customers thanking them for registering and requesting them to verify their email. They should be encouraged to change their password. This option should be provided on the page. We should track the people that we send these emails to so that we do not send them additional emails, if they still do not verify their emails or phone numbers. We should be able to send coupons and other prizes to these customers once they verify their phone or email.

The administrator is advantageously be provided a field for the subject of the email. They can enter a string denoting the subject for the email. The first email that goes to the customer also has their name and password. The email contains a Universal Reference Locator (URL). The customer clicks on the email and comes to a new page where the merchant they registered at is shown, possibly with a picture. The future specials of the merchant are shown. The ones they had selected at the business are shown selected. The fact that the user has clicked on the email means that the email address is valid and verified. The user can choose to verify his phone and also select if he wants recurring alerts or only the first one. The user can then confirm his request for alerts.

The administrator can also put in or select a referral code for the merchant that is then applied to all the registered customers. This sort of tracking which customers come from which merchants can be advantageous in assessing the effectiveness of a merchant's promotion. It can also provide valuable information to the administrator regarding the traffic a specific merchant provides to the Talk411 service.

Create/Modify Categories

There is advantageously provided be a facility to upload the main picture, the second picture and the thumbnail picture for each category.

Survey Selection for Home Page

The administrator can select two surveys (or some other predetermined number of surveys) from all the merchant surveys to show up on the home page. The merchant may not delete them, when they are shown on the home page. The merchant has to request the administrator to delete survey from the home page.

Zip or Postal Code Assignment to Area

The administrator is advantageously be able to assign zip codes to named areas. For example the zip code 95113 would be assigned to San Jose Downtown. This allows customers to find merchants in downtown San Jose.

Creating Cities and Assigning Grammar to the Names

The administrator is advantageously able to create cities and assign grammars to their names. Grammars are used for speech recognition on the phone. The grammar file can then be generated for the city names.

Creating Referral Codes

The admin is advantageously able to create referral codes for merchants. These codes can be selected by the admin when registering customers.

Preferred Deals and Events Appearing on the Home Page

There may advantageously be multiple modes for generating these deals. In one embodiment there are two modes. One is a random mode where the system picks three from the preferred merchants. The other mode enables the admin to explicitly select deals from the preferred merchants deals.

Figure 20:
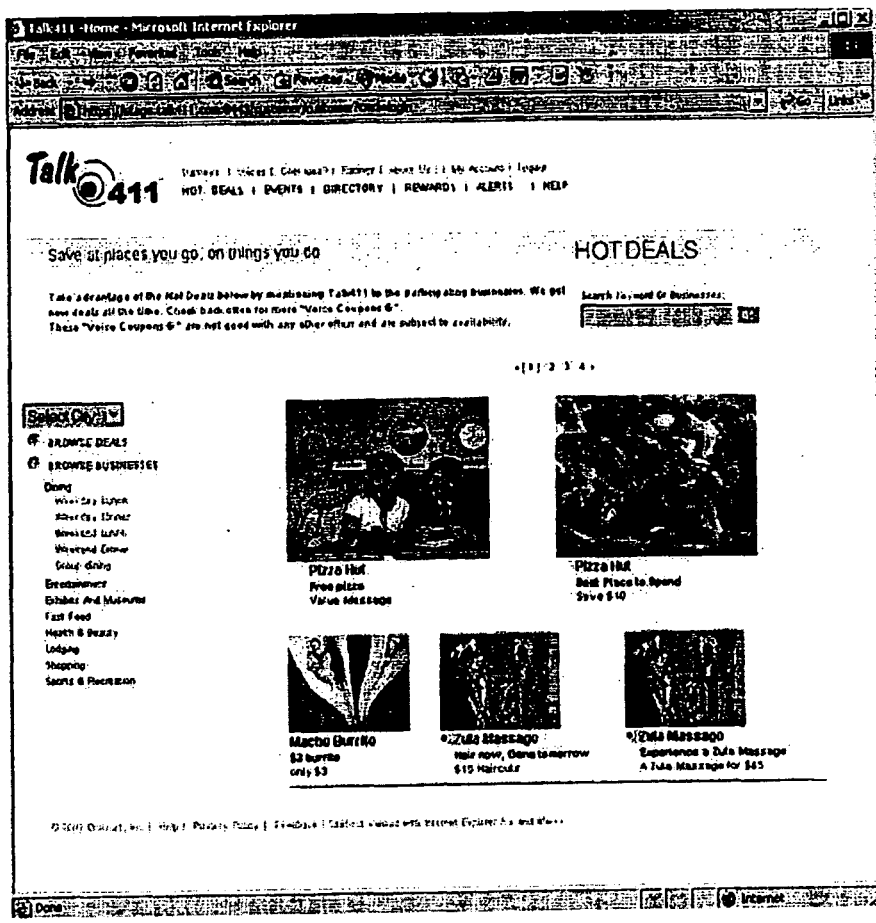
FIG. 20 is a diagrammatic illustration showing an exemplary Internet web page according to invention for a Hot Deals page.
Figure 21:
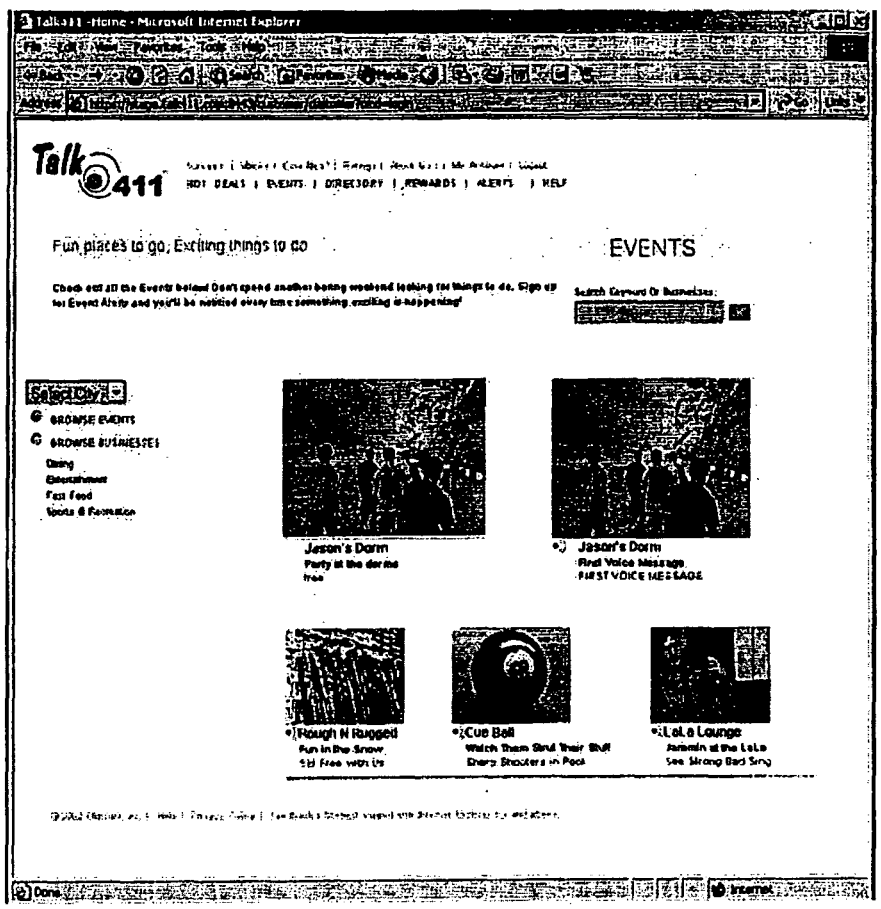
FIG. 21 is a diagrammatic illustration showing an exemplary Internet web page according to invention for an Events page.

The same may apply to events too. The specials events and deals are also shown when the customer clicks on hot deals (See FIG. 20) and events (See FIG. 21).

The administrator is advantageously able to upload images for these deals so that they display nicely on the home page (See FIG. 14).

Creating and Maintaining Categories/Subcategories for Business Directory/Yellow Pages The administrator should be able to create categories and subcategories for the business directory. The merchants are assigned by the administrator to these categories. They may be entered into more than one category. These categories are classified under a "Directory" category theme.

There are category sponsors for each of these categories. In one embodiment there are five levels of sponsorship for these merchant sponsors. Depending on the level of sponsorship, there will be different placements for the merchant on the directory pages. There are also two levels of sponsors for the main directory page. Different numbers of levels may be provided.

Updating the Static Html Pages on a Regular Basis

The administrator can upload the static pages and place them in the right locations so that the pages are displayed as part of the dynamic pages. The static html pages are served from the media server. In one embodiment, each static page has it own directory structure that when uploaded replaces the same directory structure on the media server.

Upload Merchant Pictures

The administrator is advantageously able to upload a main, secondary picture, and thumbnail picture for each merchant.

Merchant Rating Questions

The administrator is advantageously able to review and create questions for rating merchants in categories. The customer is presented with the questions that have been setup for rating the category to which the merchant belongs. The answers for these questions are one star, two stars, three stars, four stars, and the like.

Directory Structure for Yellow Pages or Other Business Merchant Directory

The administrator is advantageously able to create categories and subcategories for yellow pages. The administrator should be allowed to move a merchant in and out of these categories. Merchants can only be assigned to the leaf nodes of these hierarchies.

Loyalty Program

The administrator is advantageously able to setup the number of extra Talk411 points that are given to a customer for registering their sticker on the phone.

The administrator is advantageously able to update the database when stickers are issued to the merchant. They are advantageously able to modify the merchant codes, the issue codes and the ranges of serial number that form the codes.

Main Audio for Phone Site

There should desirably be several audio files that are setup by the administrator. When a customer calls 1-866-TALK411, an audio file is picked randomly (or according to other rules or policies) and played.

Merchant Description Audio

The administrator is advantageously able to upload files for the description of the merchant.

Website URL for Merchants

The administrator is advantageously able to add a URL for the merchant's web site.

Merchant Logo

The administrator should advantageously be able to upload the logo for the merchant.

Administrative Monitoring of Voices

Figure 23:
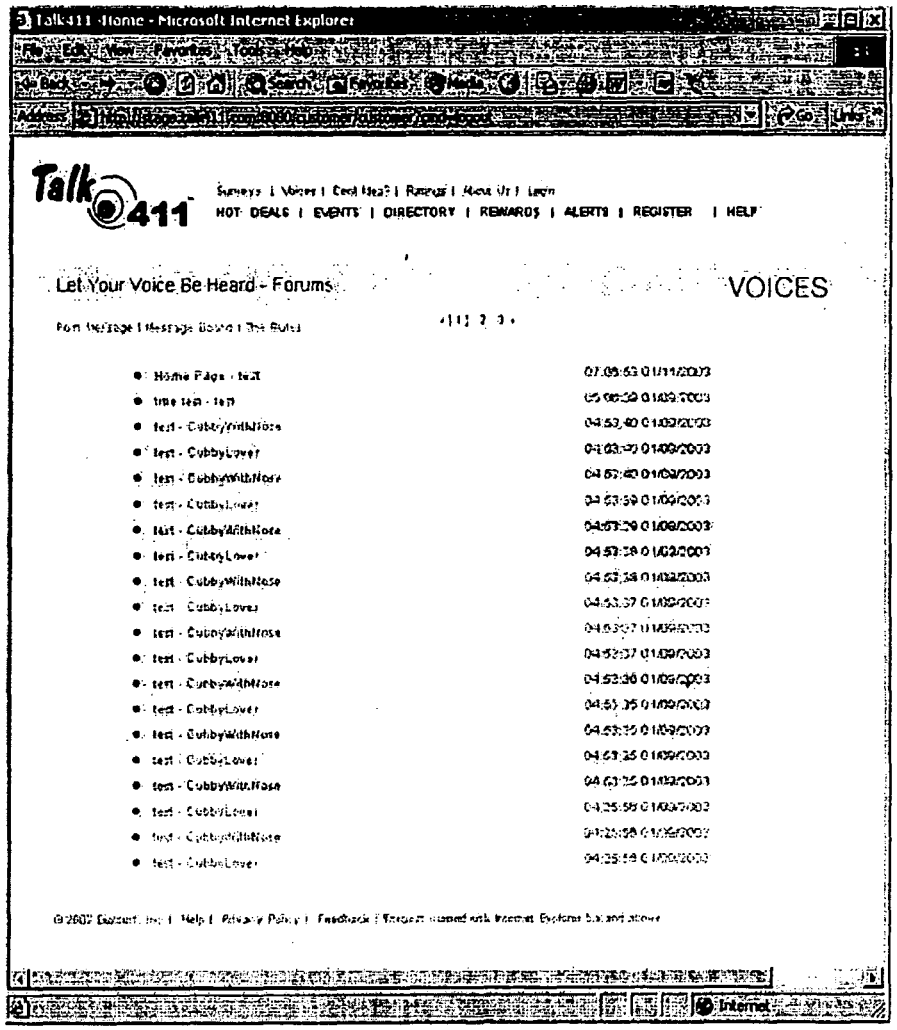
FIG. 23 is a diagrammatic illustration showing an exemplary Internet web page according to invention for a Voices page.

The administrator is advantageously able to review the flagged, offensive message in the Voices section of the service and delete them (See FIG. 23).

Generate Premium Discount Vouchers

The administrator is advantageously able to create and publish custom packages that may be browsed and purchased by the customer. Packages can have 1 or more merchant discount vouchers. Packages have a name, a description, a retail price, a purchase price. The administrator may also specify discounts for volume purchases.

Consumer Dialogs

Various customer dialogs are provided for and incorporate some or all of the features listed below:
  Customers are able to skip the special they are listening to and go on to the next one.
  Customers are able to say, "Back" and go to the previous dialog.
  Customers are able to connect to the merchant when they are listening to the specials.
  If we cannot get the user for verification, for example if it goes to an answering machine, we should try again up to three (or some other predetermined number of) times.
  Call in and listen to your recent alerts
  When requesting an alert, browse merchants by category.
  Cosmetic changes to provide a better experience. For example, use a male and female voice for saying menus. The menu items are spoken by the male voice; the rest of the prompt is spoken by the female voice.
  Customer can select the language (such as Spanish, Vietnamese, English, or any other language or dialect) of the dialogs to interact with.
  Customer can select the voice of the dialogs, such as a young male or a mature female voice.
  Customer can select a famous voice to interact with, such as a public figure or a famous actor or actress.
  Provide context sensitive help
  Provide Survey dialogs
  When customers browse deals, they should advantageously hear a brief value proposition (message header) first. If they want more information they can hear the whole message.
  The customer can find out the address and store locations for businesses. They should advantageously be able to find merchants based on the classification of merchants such as restaurants in downtown San Jose.
  The system should advantageously note the number of customers who connect to a merchant after an alert. (Regular as well as aggregate alerts)

Merchant Dialogs

Various merchant dialogs are provided for and incorporate some or all of the features listed below:
  The dialogs for recording the sale message may optionally include a recorded message header for the alert.
  Dialogs for recording survey questions and answers. This may be incorporated into the dialogs for recording future specials and invitations.

Directory Information Over the Telephone or Other Voice Communication Device

Customers registered at hotels or other locations should advantageously be allowed to search the directory for businesses, get more information on businesses, be able to connect to them and view their specials. Talk411 allows this only for calls from hotel numbers that are registered with Talk411. All others will have to login to see the deals of merchants.

Registering with Search Engines

The Talk411 web site is advantageously registered with various search engines so that it may more readily be located in a user Internet search.

Personalization for Consumers (Sometimes Referred to as Customers)

The Talk411 services can be personalized and customized based on individual preferences, such as:
  Create a "buddy" list of friends and family with their contact information including but not limited to email and phone numbers. This will allow the customers to forward Alerts and other messages they may receive from Talk411 to their buddy list conveniently on the phone or on the web.
  Create a personal "preferred business directory" where the customer can select their favorite merchants/businesses that they would like to quickly find on the phone or on the web, so that they can call Talk411, say the name of the business, find their specials (deals, promotions), phone number and contact information, and also get connected to that business' phone number.

Create a personal "alarm list" where the customer can select a day, time and type or record a alarm message to receive at the requested time and date. Customer has a choice of receiving the alarm by email, phone call (voice message), or an alternative means of messaging.

Create a personal voice message (such as a reminder, invitation, greeting, etc.) by calling Talk411 or at the Talk411 web site, and schedule for delivery to a person or someone in the buddy list.

Specify a category of goods, or a specific item from a business and request an Alert (via email, phone or other type of messaging) when that item is available, goes on sale, or gets reduced down to a specific price.

Personalized Instant Web and Phone Surveys, Invitations and Event Scheduling

Talk411 users (customers) can call Talk411, or at the Talk411 web site, create an event by inputting the name, description, location, date and time of the event, input the email and phone numbers of the people they want to invite and send an interactive invitation message, where the recipients of the message can RSVP for the event.

The customer can create survey type questions (not to exceed a predetermined limit by the Administrator) and multiple choice answers for the recipients to select from. These questions can be such as, "please select your preferred location for this dinner event", or "should we invite Joe as well?". These questions can be added by the customer to the event invitation message and sent along with the invitation.

One of such questions can be the date and time they are available with multiple choice answers. Alternatively the recipient can be provided with the ability to leave a short (predetermined by the Administrator or the customer, depending on who pays for the time) message to the sender.

Then the results of the questions get compiled and made available to the customer (sender) and based on customer's choice all of the people on the initial message list can be notified (phone or email) with the results, such as "the dinner meeting will be held at ABC restaurant at 10 am on January $12^{th}$, your reservation is confirmed. If you want to cancel your reservation, please say cancel now".

Alternatively, a customer can quickly poll or survey a friend/family list (can be the buddy list) instantly using the phone or html email. Customer creates the survey by calling Talk411 or at the Talk web site by typing or recording the questions and possible multiple choice answers. The questions can be anything, such as "what do you think I should wear to my date with Joe tonight? Red, White, Black?" Then the recipients receive a personal message from the sender asking them to take this short survey. The recipients follow the questions and select answers. Sender can find out the results at the Talk411 web site or by calling its toll free phone number.

Group Coordination and Scheduling

A customer can set up a group and provide access privileges to a group of friends, where each one of them select preferences from a list created by the customer. These can be anything, such as preferred restaurants, sport activities, places to stay, etc. Results of collective preferences as well as the individual preferences can be viewed by the group members, so that they can coordinate different activities with the group or individuals members of the group. All of the interactions can be done on the phone or on the web.

The surveys, invitation and scheduling services explained above are provided to all of the individuals in the group.

Sponsorship and Promotions by Merchants to Users of Personal and Group Surveys, Invitations and Scheduling Based on individual preferences of activities and merchants/businesses as a part of the personalization process during registration or prior to usage of services such as the surveys (See FIG. 17) and invitations, customers can choose to send a limited number (set by the Administrator) of promotional or sponsorship messages before, during or after the message they create and send.

In one embodiment, the customer can be rewarded with loyalty points or other type of rewards by the benefiting merchant or Talk411 for sending a promotional message along with the survey, invitation or scheduling message (or other messages that they may be able to send).

Alternatively merchants may offer special group discounts and deals to the created groups in Talk411 in a "group discounts" section of the Talk411 service. Group creators can sign up for the merchants they like, so that the members of the group can attach that merchant's promotional messages to the messages sent between the group members. In one embodiment, the group may get rewarded by the selected merchant with loyalty points or other attractive rewards that may be used, shared or redeemed by the group or the individuals in the group.

Tracking and Approval of Reward Redemptions

Figure 18:
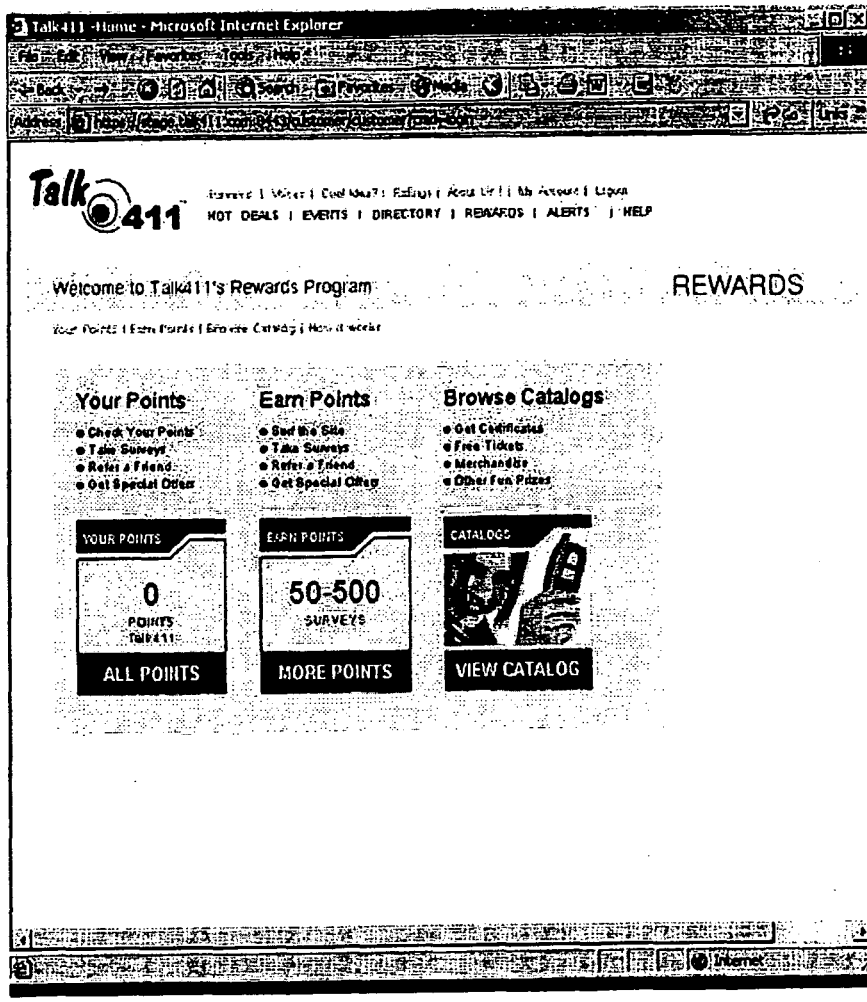
FIG. 18 is a diagrammatic illustration showing an exemplary Internet web page according to invention for a Rewards page.

One potential problem when a customer wants to redeem a loyalty reward (See FIG. 18) or a Talk411 discount (or coupon) from a merchant, the customer service person, or the server may not have the authority for granting approval. In this case a manager or the business owner may have to approve the transaction, which may not be possible because the manager/owner may not be at the location at that moment.

In order to facilitate an easier approval process, owner/manager can provide their personal phone number to Talk411. When an approval is necessary, the server or the service representative can call Talk411 and request approval after identifying themselves with an employee number (or other possible identifier). Owner/manager gets a call requesting an approval, approves the transaction and hangs up. Talk411 tells the server that the transaction is approved and gives a reference code. If the owner/merchant does not want to bother with individual approvals, but wants to control the process, he can specify the approved number ahead of time so that Talk411 gives an approval code without calling the owner. When the approvals run out, then Talk411 will call owner to get additional pre-approvals.

Merchant owner/manager can visit the Talk411 merchant site and check the approvals and servers who have asked for approvals at any time. This kind of auditing capability helps him find out whether the approval requests are being abused or not by the employees.

Additional embodiments of the invention related to a system and method for voice accessed information system are described in the attached APPENDIX which in part describes additional features of a Talk411 system implementation and the associated method. This APPENDIX is directly incorporated into this description or incorporated by reference in its entirety.

Additional Description

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be to defined by the claims appended hereto and their equivalents. All publications and patent applications cited in this specification are herein incorporated by reference as if each individual publication or patent application were specifically and individually indicated to be incorporated by reference.

We claim:

1. A method, comprising:
receiving, via a communication network, an audio signal from a user, wherein the audio signal includes a command;
recognizing the command;
retrieving merchant information from a database based on the recognized command, wherein the merchant information comprises merchant identity information and at least one good or service associated with the merchant;
generating an audio representation of the merchant information; and
sending the audio representation of the merchant information to the user via the communication network.

2. The method of claim 1, wherein recognizing the command comprises converting the audio signal to text and extracting the command from the converted text.

3. The method of claim 1, wherein the merchant information includes a promotional offer associated with the good or service.

4. The method of claim 1, wherein the merchant information includes a rating of the good or service.

5. The method of claim 1, further comprising:
converting the received audio signal to text.

6. The method of claim 5, wherein recognizing the command comprises extracting the command from the converted text.

7. The method of claim 1, wherein generating the audio representation of the merchant information comprises performing a text-to-speech conversion on the merchant information.

8. The method of claim 1, further comprising:
sending an audio prompt via the communication network requesting additional input from the user.

9. The method of claim 1, wherein the communication network comprises a telephone network.

10. The method of claim 1, wherein retrieving merchant information comprises retrieving information relating to a plurality of merchants.

11. A system, comprising:
a network interface coupled to a communication network; and
a controller coupled to the network interface configured to:
receive, via the communication network, an audio signal from a user, wherein the audio signal includes a command;
recognize the command;
retrieve merchant information from a database based on the recognized command, wherein the merchant information comprises merchant identity information and at least one good or service associated with the merchant;
generate an audio representation of the merchant information; and
send the audio representation of the merchant information to the user via the communication network.

12. The system of claim 11, wherein the controller is configured to recognize the command by converting the audio signal to text and extracting the command from the converted text.

13. The system of claim 11, wherein the merchant information includes a promotional offer associated with the good or service.

14. The system of claim 11, wherein the merchant information includes a rating of the good or service.

15. The system of claim 11, wherein the controller is further configured to convert the received audio signal to text.

16. The system of claim 15, wherein the controller is configured to recognize the command by extracting the command from the converted text.

17. The system of claim 11, wherein generating the audio representation of the merchant information comprises performing a text-to-speech conversion on the merchant information.

18. The system of claim 11, wherein the controller is further configured to cause the network interface to send an audio prompt via the communication network requesting additional input from the user.

19. The system of claim 11, wherein the controller is configured to retrieve merchant information by retrieving information relating to a plurality of merchants.

* * * * *